United States Patent
Freda et al.

(10) Patent No.: US 12,245,322 B2
(45) Date of Patent: Mar. 4, 2025

(54) METHODS, ARCHITECTURES, APPARATUSES AND SYSTEMS FOR PERFORMING DISCONTINUOUS RECEPTION ON SIDELINK

(71) Applicant: INTERDIGITAL PATENT HOLDINGS, INC., Wilmington, DE (US)

(72) Inventors: Martino Freda, Laval (CA); Tuong Hoang, Montreal (CA); Tao Deng, New York, NY (US); Moon Il Lee, Melville, NY (US); Paul Marinier, Brossard (CA)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 0 days.

(21) Appl. No.: 18/747,229

(22) Filed: Jun. 18, 2024

(65) Prior Publication Data
US 2024/0414809 A1   Dec. 12, 2024

Related U.S. Application Data

(63) Continuation of application No. 18/280,736, filed as application No. PCT/US2022/019498 on Mar. 9, 2022.

(Continued)

(51) Int. Cl.
*H04W 76/28* (2018.01)
*H04W 76/23* (2018.01)

(52) U.S. Cl.
CPC ........... *H04W 76/28* (2018.02); *H04W 76/23* (2018.02)

(58) Field of Classification Search
CPC .............................. H04W 76/28; H04W 76/23
See application file for complete search history.

(56) References Cited

U.S. PATENT DOCUMENTS

2020/0275474 A1   8/2020  Chen
2021/0059004 A1   2/2021  Wu et al.
(Continued)

OTHER PUBLICATIONS

"3rd Generation Partnership Project (3GPP); Technical Specification Group Services and System Aspects; Enhancement of 3GPP support for V2X scenarios, Stage 1 (Release 15)", 3GPP TS 22.186 V15.2.0, Sep. 2017, 16 pages.

(Continued)

*Primary Examiner* — Will W Lin
(74) *Attorney, Agent, or Firm* — Volpe Koenig

(57) ABSTRACT

The disclosure pertains to methods and apparatus using V2X enhancements to perform discontinuous reception. In an embodiment, a method implemented by a first WTRU, for a device-to-device (D2D) communication between the first WTRU and a second WTRU, the method may include any of comprising receiving, from the second WTRU, D2D control information comprising: (1) first information indicating one or more first transmission resources reserved for transmission of the D2D communication and (2) second information indicating if at least one second transmission resource is reserved for retransmission of the D2D communication; determining a sleeping period for the first WTRU that ends prior to a reception time of the retransmission of the D2D communication, wherein the sleeping period is based on the second information; and receiving the retransmission of the D2D communication, after an end of the determined sleeping period.

15 Claims, 13 Drawing Sheets

Related U.S. Application Data

(60) Provisional application No. 63/159,792, filed on Mar. 11, 2021, provisional application No. 63/185,747, filed on May 7, 2021.

(56) References Cited

U.S. PATENT DOCUMENTS

| | | | | |
|---|---|---|---|---|
| 2023/0164768 A1* | 5/2023 | Park | ............... | H04W 76/28 370/329 |
| 2023/0180342 A1* | 6/2023 | Shin | ............... | H04W 4/70 370/329 |
| 2023/0276526 A1* | 8/2023 | Shin | ............... | H04W 72/02 370/329 |
| 2023/0371005 A1* | 11/2023 | Cai | ............... | H04W 72/02 |
| 2023/0371119 A1* | 11/2023 | Park | ............... | H04W 72/563 |

OTHER PUBLICATIONS

"3rd Generation Partnership Project (3GPP); Technical Specification Group Services and System Aspects; Study on enhancement of 3GPP Support for 5G V2X Services (Release 15)", 3GPP TR 22.886 V15.1.0, Mar. 2017, 58 pages.

"3rd Generation Partnership Project (3GPP); Technical Specification Group Radio Access Network; Evolved Universal Terrestrial Radio Access (E-UTRA); Physical layer procedures (Release 14)", 3GPP TS 36.213 V14.4.0, Sep. 2017, 461 pages.

Fujitsu, "Sidelink DRX for Power Saving", 3GPP Tdoc R2-2009133, 3GPP TSG RAN WG2 Meeting #112-E, eMeeting, Nov. 2, 2020, 16 pages.

"3rd Generation Partnership Project (3GPP); Technical Specification Group Services and System Aspects; Study on architecture enhancements for EPS and 5G System to support advanced V2X services (Release 16)", 3GPP TR 23.786 V0.8.0, Aug. 2018, 83 pages.

"3rd Generation Partnership Project (3GPP); Technical Specification Group Services and System Aspects; System architecture for the 5G System (5GS); Stage 2 (Release 16)," 3GPP TS 23.501 V16.6.0, Sep. 2020, 447 pages.

"3rd Generation Partnership Project (3GPP); Technical Specification Group Services and System Aspects; Proximity-based services (ProSe); Stage 2 (Release 15)", 3GPP TS 23.303 V15.1.0, Jun. 2018, 130 pages.

"3rd Generation Partnership Project; Technical Specification Group Services and System Aspects; Architecture enhancements for V2X services (Release 14)", 3GPP TS 23.285 V14.2.0, Mar. 2017, 35 pages.

LG Electronics Inc., "Discussion on Sidelink DRX", 3GPP TSG-RAN WG2 Meeting #112 electronic, R2-2008943, Online, Nov. 2-Nov. 13, 2020, 6 pages.

Third Generation Partnership Project, "Technical Specification Group Radio Access Network; NR; Medium Access Control (MAC) protocol specification (Release 16)," 3GPP TS 38.321 V16.3.0 (Dec. 2020), 156 pages.

* cited by examiner

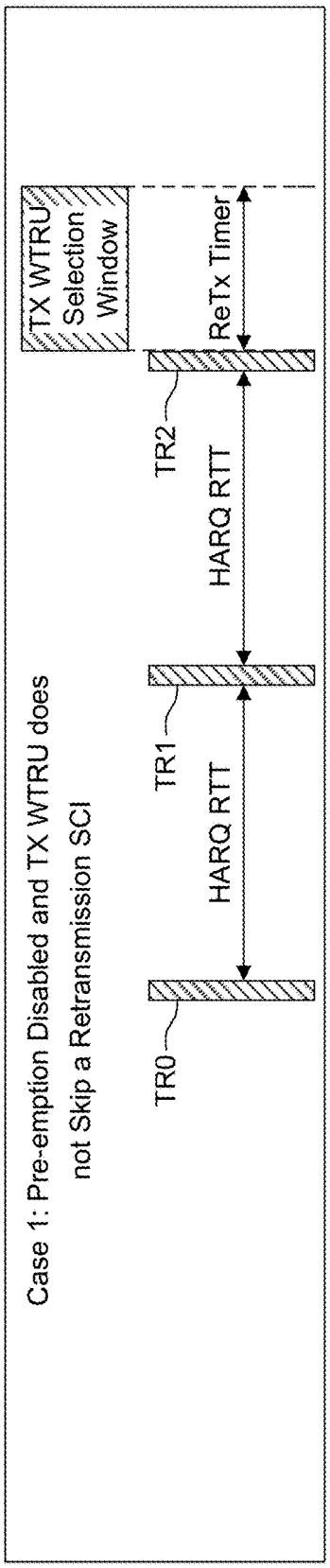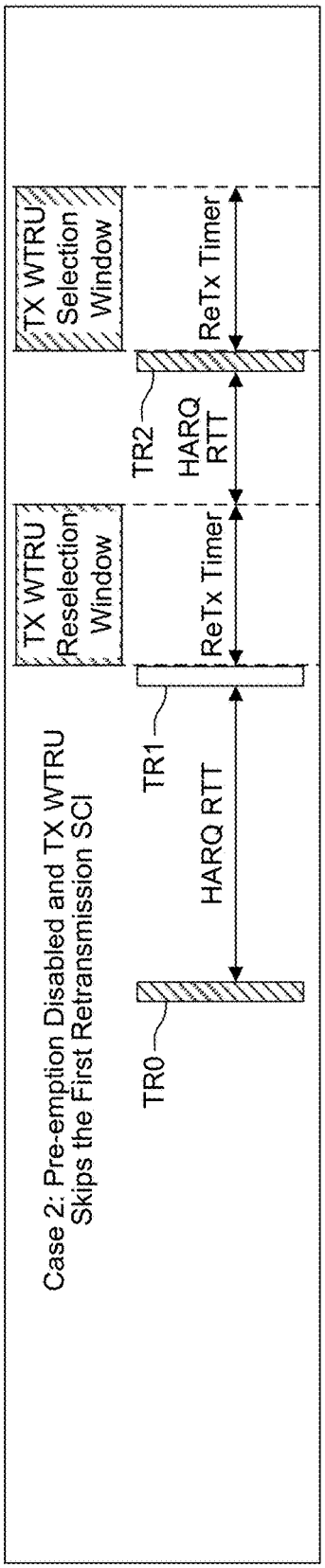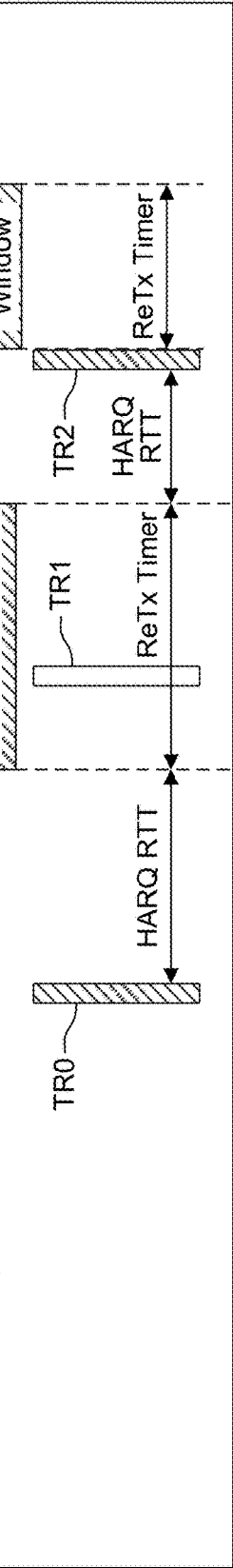

METHODS, ARCHITECTURES, APPARATUSES AND SYSTEMS FOR PERFORMING DISCONTINUOUS RECEPTION ON SIDELINK

CROSS-REFERENCE TO RELATED APPLICATIONS

This application is a Continuation of U.S. Non-Provisional application Ser. No. 18/280,736, filed Sep. 7, 2023, which is a U.S. National Stage Application under 35 U.S.C. 371 of International Patent Application No. PCT/US2022/019498, filed Mar. 9, 2022, which claims the benefit of U.S. Provisional Patent Application Nos. (i) 63/159,792 filed Mar. 11, 2021, and (ii) 63/185,747 filed May 7, 2021; all of which are incorporated herein by reference.

FIELD

Embodiments disclosed herein generally relate to wireless communications and, for example to methods, apparatus and systems using V2X enhancements to perform discontinuous reception (DRX).

BACKGROUND 5G specifications include a provision for DRX to save energy in WTRUs. The main purpose of DRX is to lower battery consumption in a case where (e.g., when) there is no uplink or downlink data to process by a wireless transmit/receive unit (WTRU). As such, the WTRU may enter a sleep mode where the RF interfaces are in low power or off mode. When traffic relevant to the WTRU is expected the mobile unit may power up to process messages.

Vehicular communication is a mode of communication whereby WTRUs can communicate with each other directly. There are two scenarios for Vehicle to Everything (V2X) operations:
  (a) In-coverage scenario, where WTRUs receive assistance from the network to start transmitting and receiving V2X messages and (b) Out of coverage scenario, where WTRUs use some pre-configured parameters to start transmitting and receiving V2X messages.

V2X communication is supported in Release-14 LTE and was inspired from the previous work on device-to-device (D2D) communications. V2X communication services can consist of the four different types:
  (i) V2V (Vehicle to Vehicle): Vehicular WTRUs can communicate with each other directly.
  (ii) V2I (Vehicle to Infrastructure): Vehicular WTRUs can communicate with roadside Units/eNode B (RSUs/eNB).
  (iii) V2N (Vehicle to Network): Vehicular WTRUs can communicate with core network.
  (iv) V2P (Vehicle to Pedestrian): Vehicular WTRUs can communicate with WTRUs with special conditions e.g., low battery capacity.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures and the detailed description are not to be considered limiting, and other equally effective examples are possible and likely. Furthermore, like reference numerals ("ref.") in the Figures indicate like elements, and wherein:

FIG. 4A, 4B, 4C illustrate examples of a timing diagrams for a hybrid automatic repeat request (HARQ) round trip time (RTT) timer and retransmission timer;

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein. Although various embodiments are described and/or claimed herein in which an apparatus, system, device, etc. and/or any element thereof carries out an operation, process, algorithm, function, etc. and/or any portion thereof, it is to be understood that any embodiments described and/or claimed herein assume that any apparatus, system, device, etc. and/or any element thereof is configured to carry out any operation, process, algorithm, function, etc. and/or any portion thereof.

Example Communications System

The methods, apparatuses and systems provided herein are well-suited for communications involving both wired and wireless networks. An overview of various types of wireless devices and infrastructure is provided with respect to FIGS. 1A-1D, where various elements of the network may utilize, perform, be arranged in accordance with and/or be adapted and/or configured for the methods, apparatuses and systems provided herein.

Figure 1A:
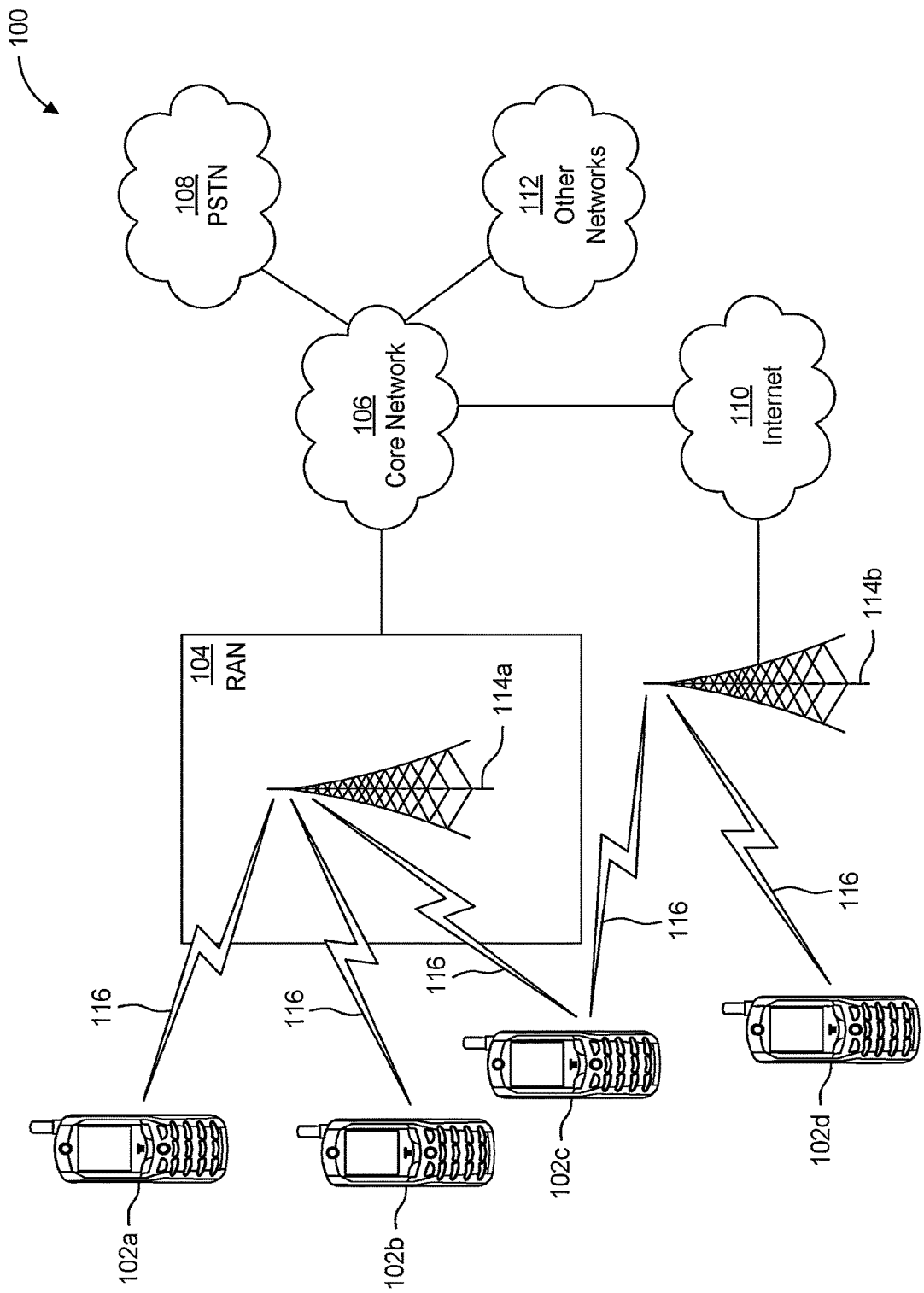
FIG. 1A is a system diagram illustrating an example communications system in which one or more disclosed embodiments may be implemented.

FIG. 1A is a system diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail (ZT) unique-word (UW) discreet Fourier transform (DFT) spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include (or be) a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d, e.g., to facilitate access to one or more communication networks, such as the CN 106/115, the Internet 110, and/or the networks 112. By way of example, the base stations 114a, 114b may be any of a base transceiver station (BTS), a Node-B (NB), an eNode-B (eNB), a Home Node-B (HNB), a Home eNode-B (HeNB), a gNode-B (gNB), a NR Node-B (NR NB), a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in an embodiment, the base station 114a may include three transceivers, i.e., one for each sector of the cell. In an embodiment, the base station 114a may employ multiple-input multiple output (MIMO) technology and may utilize multiple transceivers for each or any sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In an embodiment, the base station 114a and the WTRUs 102a, 102b, 102c may implement radio technologies such as IEEE 802.11 (i.e., Wireless Fidelity (Wi-Fi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node-B, Home eNode-B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In an embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In an embodiment, the base station 114b and the WTRUs 102c, 102d may utilize a cellular-based RAT (e.g., WCDMA, CDMA2000, GSM, LTE, LTE-A, LTE-A Pro, NR, etc.) to establish any of a small cell, picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing an NR radio technology, the CN 106/115 may also be in communication with another RAN (not shown) employing any of a GSM, UMTS, CDMA 2000, WiMAX, E-UTRA, or Wi-Fi radio technology.

The CN 106/115 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/114 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
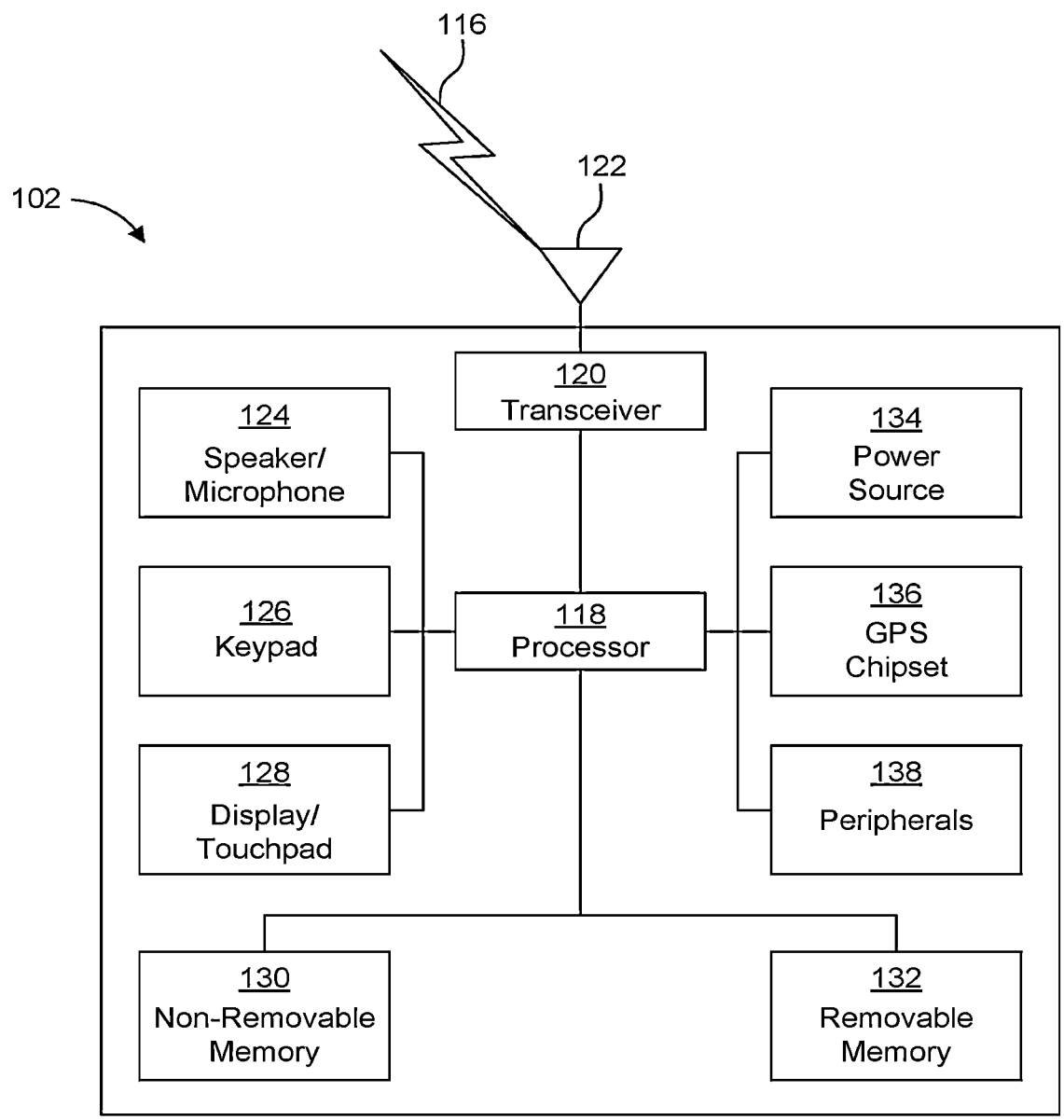
FIG. 1B is a system diagram illustrating an example WTRU that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other elements/peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together, e.g., in an electronic package or chip.

The transmit/receive element 122 may be configured to transmit signals to, or receive signals from, a base station (e.g., the base station 114a) over the air interface 116. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In an embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. For example, the WTRU 102 may employ MIMO technology. Thus, in an embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other elements/peripherals 138, which may include one or more software and/or hardware modules/units that provide additional features, functionality and/or wired or wireless connectivity. For example, the elements/peripherals 138 may include an accelerometer, an e-compass, a satellite transceiver, a digital camera (e.g., for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a virtual reality and/or augmented reality (VR/AR) device, an activity tracker, and the like. The elements/peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the uplink (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the uplink (e.g., for transmission) or the downlink (e.g., for reception)).

Figure 1C:
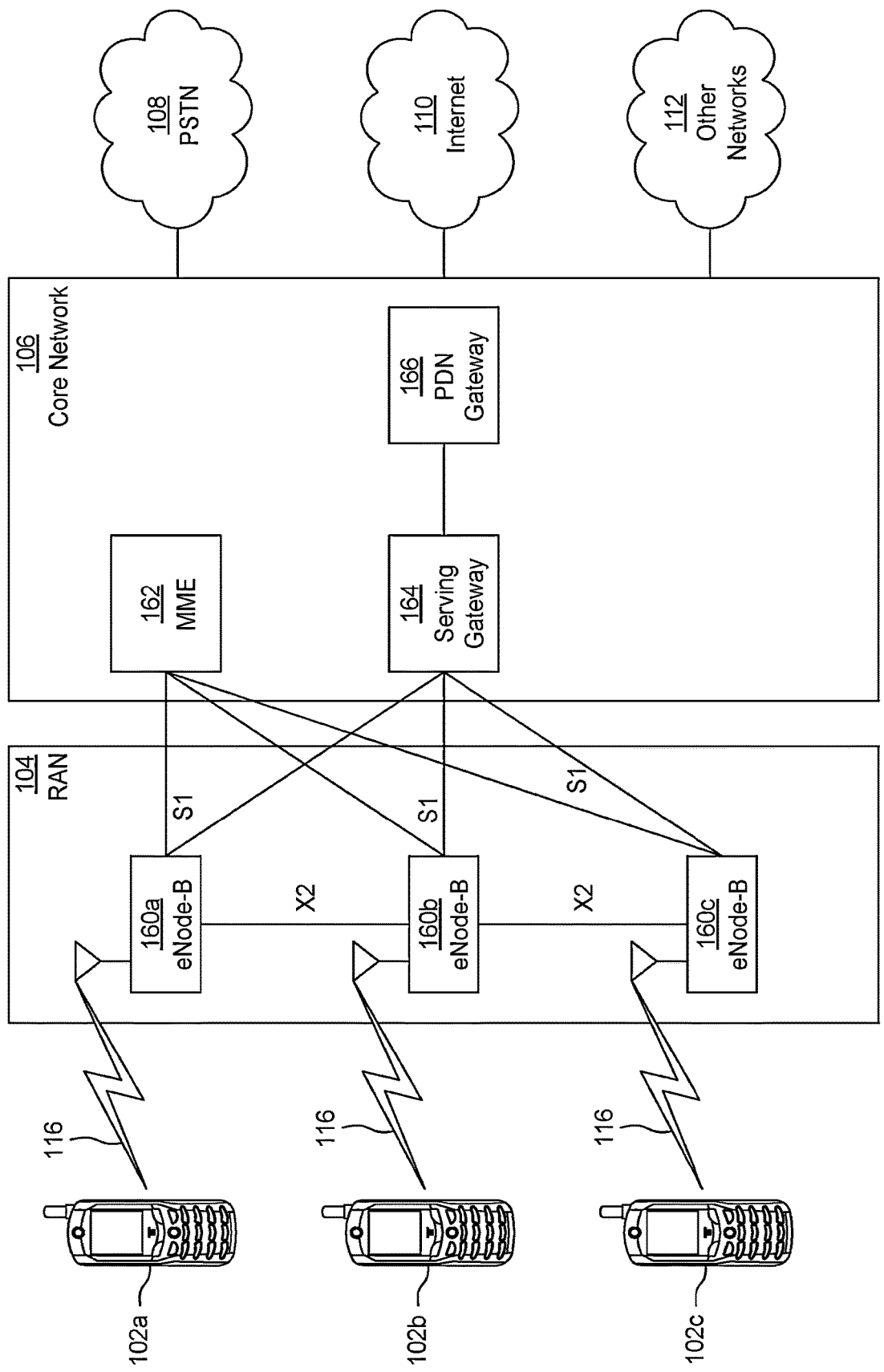
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, and 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink (UL) and/or downlink (DL), and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While each of the foregoing elements are depicted as part of the CN 106, it will be appreciated that any one of these elements may be owned and/or operated by an entity other than the CN operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode-Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode-B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in infrastructure basic service set (BSS) mode may have an access point (AP) for the BSS and one or more stations (STAs) associated with the AP. The AP may have an access or an interface to a distribution system (DS) or another type of wired/wireless network that carries traffic into and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier sense multiple access with collision avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High throughput (HT) STAs may use a 40 MHz wide channel for communication, for example, via a combination of the primary 20 MHz channel with an adjacent or nonadjacent 20 MHz channel to form a 40 MHZ wide channel.

Very high throughput (VHT) STAs may support 20 MHZ, 40 MHZ, 80 MHZ, and/or 160 MHz wide channels. The 40 MHZ, and/or 80 MHZ, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration.

For the 80+80 configuration, the data, after channel encoding, may be passed through a segment parser that may divide the data into two streams. Inverse fast fourier transform (IFFT) processing, and time domain processing, may be done on each stream separately. The streams may be mapped on to the two 80 MHz channels, and the data may be transmitted by a transmitting STA. At the receiver of the receiving STA, the above-described operation for the 80+80 configuration may be reversed, and the combined data may be sent to a medium access control (MAC) layer, entity, etc.

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV white space (TVWS) spectrum, and 802.11ah supports 1 MHZ, 2 MHZ, 4 MHZ, 8 MHZ, and 16 MHz bandwidths using non-TVWS spectrum. According to a representative embodiment, 802.11ah may support meter type control/machine-type communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHZ mode, even if the AP, and other STAs in the BSS support 2 MHZ, 4 MHZ, 8 MHZ, 16 MHZ, and/or other channel bandwidth operating modes. Carrier sensing and/or network allocation vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHZ to 928 MHz. In Korea, the available frequency bands are from 917.5 MHz to 923.5 MHZ. In Japan, the available frequency bands are from 916.5 MHz to 927.5 MHz. The total bandwidth available for 802.11ah is 6 MHz to 26 MHZ depending on the country code.

Figure 1D:
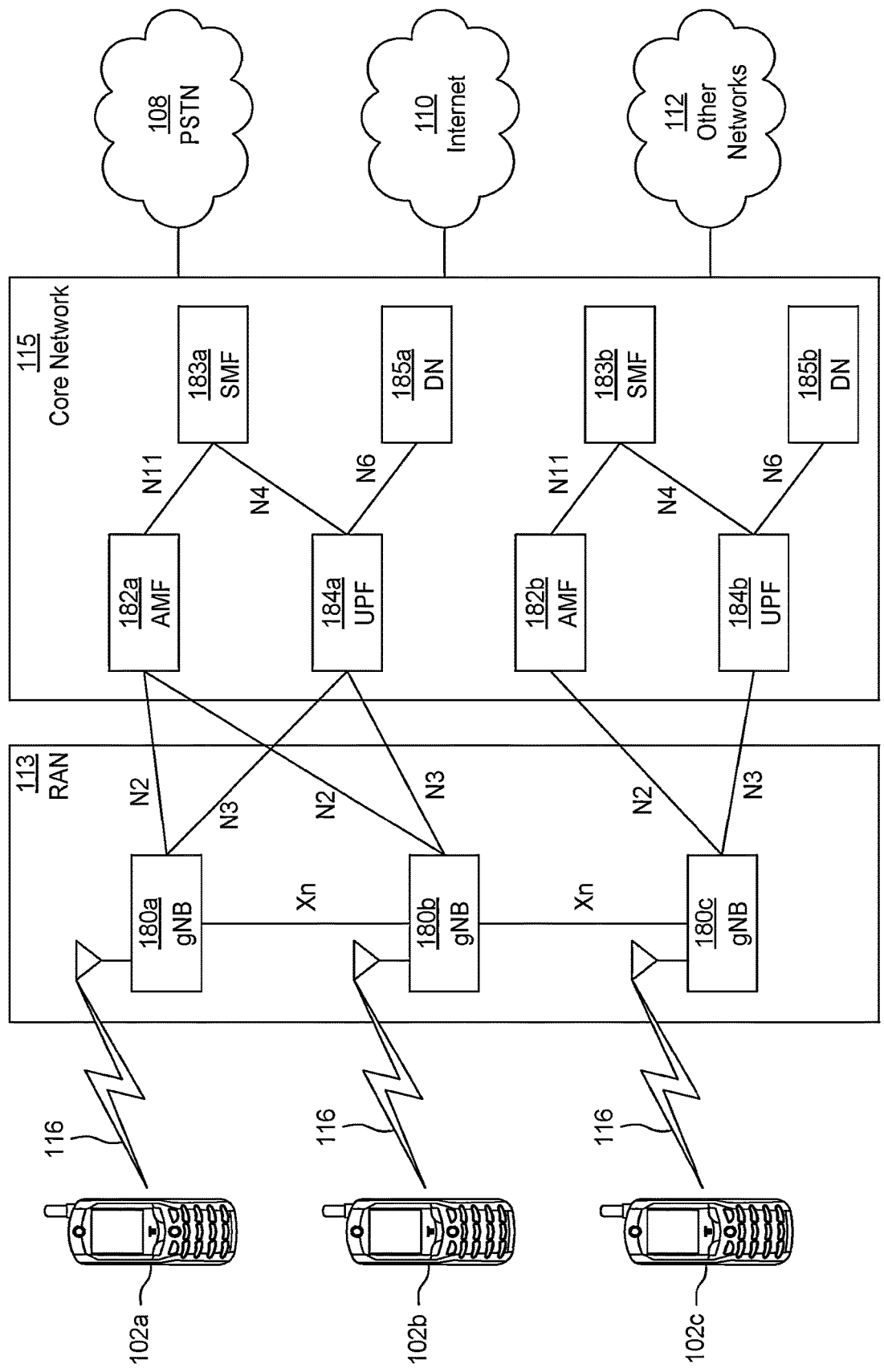
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In an embodiment, the gNBs 180a, 180b, 180c may implement MIMO technology. For example, gNBs 180a, 180b may utilize beamforming to transmit signals to and/or receive signals from the WTRUs 102a, 102b, 102c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., including a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards user plane functions (UPFs) 184a, 184b, routing of control plane information towards access and mobility management functions (AMFs) 182a, 182b, and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one session management function (SMF) 183a, 183b, and at least one Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of NAS signaling, mobility management, and the like. Network slicing may be used by the AMF 182a, 182b, e.g., to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and/or the like. The AMF 182 may provide a control plane function for switching between the RAN 113 and other RANs (not shown) that employ other radio technologies, such as LTE, LTE-A, LTE-A Pro, and/or non-3GPP access technologies such as Wi-Fi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, e.g., to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In an embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to any of: WTRUs 102a-d, base stations 114a-b, eNode-Bs 160a-c, MME 162, SGW 164, PGW 166, gNBs 180a-c, AMFs 182a-b, UPFs 184a-b, SMFs 183a-b, DNs 185a-b, and/or any other element(s)/device(s) described herein, may be performed by one or more emulation elements/devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Examples provided herein do not limit applicability of the subject matter to other wireless technologies, e.g., using the same or different principles as may be applicable.

As explained herein, a WTRU may be an example of a UE. Hence the terms UE and WTRU may be used in equal scope herein.

As used herein, the term WTRU is further used as a generic term to identify a device in which one or multiple V2X Application(s) is/are running. V2X application server (V2X AS) may be located in the network and may interface with V2X applications installed on the WTRUs. V2X control function (CF) may handle V2X devices' authorization and provisioning. This may, for example, include V2X policy and/or parameters configuration towards the WTRU. V2XCF functionality may be handled at the PCF. V2X WTRU-to-WTRU communication may be based on two modes of operation: over Uu reference point and over PC5 reference point.

The V2X communication over PC5 reference point may be a type of ProSe Communication (e.g., D2D communication). One-to-one ProSe direct communication may be realized by establishing a secure layer-2 link over PC5 between two WTRUs, often referred to as a unicast communication (e.g., the communication may involve 2 peers).

Figure 2:
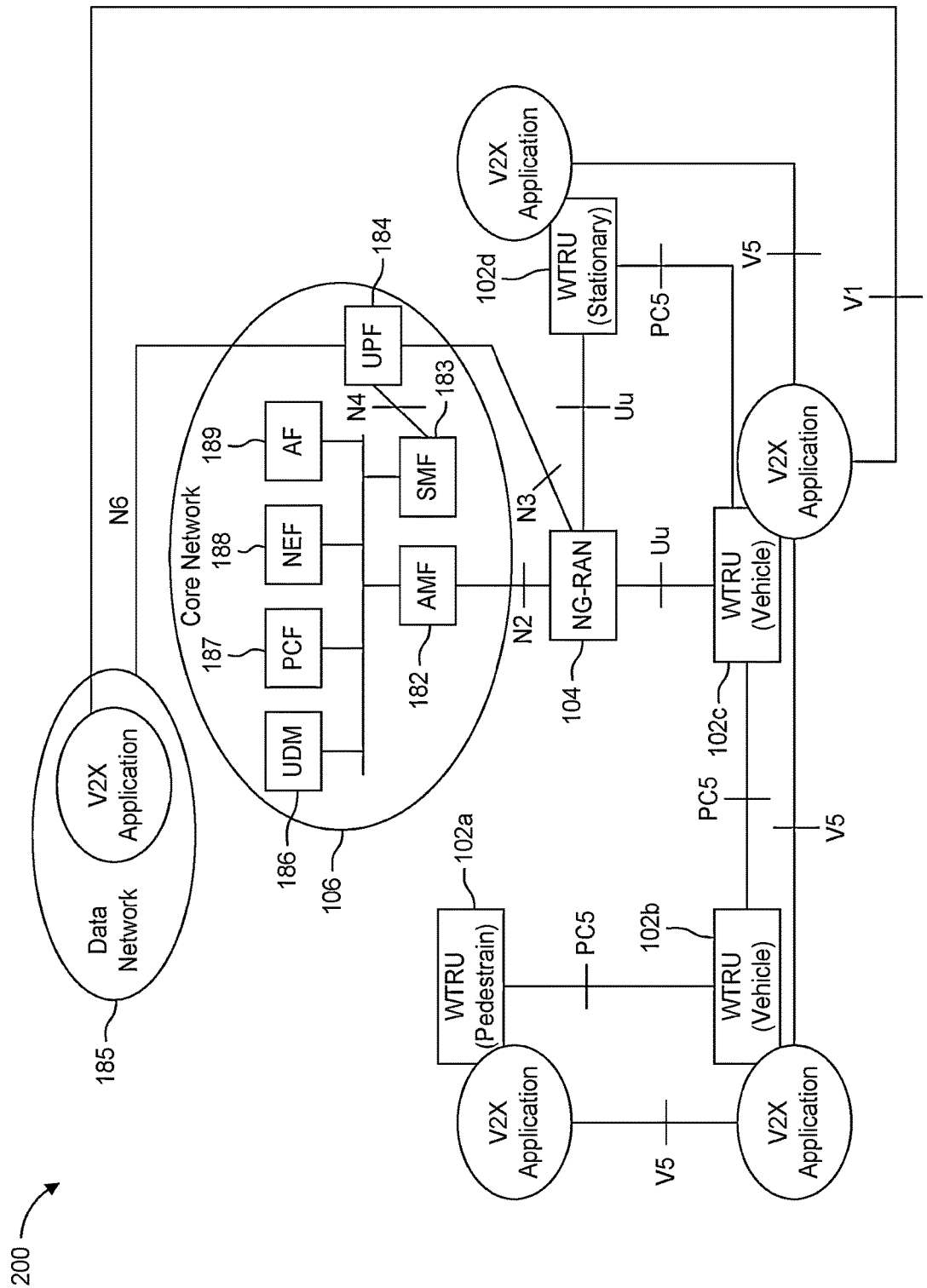
FIG. 2 illustrates a non-roaming 5G System architecture for PC5 and Uu based V2X communication.

FIG. 2 illustrates a Non-roaming 5G System architecture for PC5 and Uu based V2X communication. As seen in FIG. 2, some examples of V2X WTRU 102 may be a Vehicle WTRU (WTRU 102b and WTRU 102c) or Pedestrian WTRU (WTRU 102a). The V2X communication may also happen between two Pedestrian WTRUs. The V2X communication may also happen between mobile WTRUs 102a, 102b and/or 102c and fixed/stationary WTRUs 102c (e.g., an Road Side Unit (RSU) or other fixed device). The communication between WTRU 102b or 102c (Vehicle) and WTRU 102a (Pedestrian) may be referred to as V2P communication whereas the communication between WTRU 102b (Vehicle) and WTRU 102c (Vehicle) may be called V2V communications. As depicted in FIG. 2, both V2V and V2P communications may happen over PC5 interface and the characteristics, such as message frequency, power, etc., of V2V communication may be different from V2P type communication.

Referring to FIG. 2, the V2X communication network 200 may include a DN 185 executing/running one or more V2X applications, a first vehicle (e.g., a vehicle WTRU 102b) executing/running one or more V2X applications, a second vehicle (e.g., a vehicle WTRU 102c) executing/running one or more V2X applications, a pedestrian (e.g., a pedestrian/V2P WTRU 102a) executing/running one or more V2X applications, a stationary/fixed device (e.g., a stationary WTRU 102d) executing/running one or more V2X applications, a NG-RAN 104 and a CN 106. The CN 106 may include an AMF 182, an SMF 183, a UPF 184, a DN 185, a unified data management (UDM) 186 that may be paired with a user data repository (UDR, not shown), a policy and control function (PCF) 187, a network exposure function (NEF) 188, and/or an application function (AF) 189. The WTRUs 102 (e.g., Vehicle WTRU 102b, Vehicle WTRU 102c, Pedestrian WTRU 102a and/or Stationary WTRU 102d) may communicate using a PC5 interface (e.g., PC5 communications). The V2X applications executing on the WTRUs 102 (e.g., Vehicle WTRU 102b, Vehicle WTRU 102c, Pedestrian WTRU 102a and/or Stationary WTRU 102d) may communicate using a V5 interface. Vehicle WTRU 102b and Stationary WTRU 102d may communicate with the NG-RAN 104 using a Uu interface. The NG-RAN 104 may communicate with the AMF 182 of the CN 106 using a N2 interface and with the UPF 184 of the CN 106 using a N3 interface. The DN 185 may be internal to the CN 106 or interface with the NG-RAN 104 using an N6 interface. The UPF 184 and the SMF may communicate using a N4 interface.

The V2P WTRU 102a supporting V2P applications transmits messages including or containing V2P application information. The V2P application information may be transmitted either by a WTRU supporting V2X application in a vehicle, such as a warning to a pedestrian, or by a WTRU supporting V2X application associated with a vulnerable road user, such as a warning to a vehicle. 3GPP transport of messages including/containing V2P application information may include the transport between WTRUs 102 directly and/or, for example, due to the limited direct communication range, the transport between WTRUs via infrastructure supporting V2X communication, e.g., RSU, application server, etc. As described herein and based on the architecture in FIG. 2, the vehicle type of WTRU 102b/102c and pedestrian type of WTRU 102a may be supported by V2X. Other functionality specific for the pedestrian type of WTRUs 102a carried by pedestrian users, cyclists, etc. may also be supported by V2X. Special resource selection mechanism (e.g., partial sensing or random selection) for the pedestrian type of WTRU 102a may be utilized in PC5 communications. Generally, there is no optimization for the pedestrian type of WTRUs, 102a which has power and computation limitations compared to Vehicle WTRUs 102b/102c. There is a desire to have support of V2X use for Vulnerable Road Users (VRU), and therefore provide enhancement for related aspects, e.g., power saving, etc.

V2X Resource Allocation in LTE

LTE defines two modes of operation in V2X communication. Mode 3, where the network gives the WTRU a scheduling assignment for V2X sidelink (SL) transmission. Mode 4, where the WTRU autonomously select the resources from a configured/pre-configured resource pool. Furthermore, V2X LTE defines two categories of resource pools, receiving pools which are monitored for receiving V2X transmission, and/or V2X transmitting pools which are used by WTRUs to select the transmission resource in Mode 4. Transmitting pools are not used by WTRUs configured in Mode 3. A resource pool defines the subset of available subframes and/or resource blocks for either sidelink transmission or reception. Sidelink communication is a half-duplex scheme and/or a WTRU can be configured with multiple transmit resource pools and/or multiple receive resource pools.

In LTE, the resource pools are semi-statically signaled to WTRUs via radio resource control (RRC) signaling. In Mode 4, the WTRU uses sensing before selecting a resource from the RRC configured transmitting pool. LTE V2X does not support dynamic resource pools reconfiguration; pool configuration may (e.g., only) be carried via system information block (SIB) and/or dedicated RRC signaling. As used herein for NR V2X using DRX, a resource pool may include the set of resources used in V2X communication. The receive (RX) resource pool defines the resources that a WTRU should monitor. The transmit (TX) resource pool defines the resources that a WTRU can use to transmit. Not all resources in sidelink can be used for TX or RX. Herein, a RX resource pool may also be termed a RX pool and/or a TX resource pool may also be termed a TX pool.

NR V2X Access Technology

Third Generation Partnership Project (3GPP) includes the next generation of wireless systems, called NR. NR systems is expected to support a number of use cases such as enhanced Mobile Broadband (eMBB), ultra-high reliability and/or low latency communications (URLLC).

3GPP may support enhanced V2X (eV2X) communication in NR systems. eV2X in NR is expected to support new services for both safety and/or non-safety scenarios e.g., sensor sharing, automated driving, vehicle platooning, remote driving. Different eV2X services require different performance requirements and/or for some scenarios, 3 ms latency may be required.

NR V2X may supports two modes of operations, Mode 1 and/or Mode 2. Mode 1 is based on LTE V2X Mode 3 operation. For example, the network may schedule a SL resource via downlink (DL) downlink control information (DCI) signaling and/or a WTRU may apply the received resource reservation for SL transmission. Mode 2 may use LTE Mode 4 as a baseline for semi-persistent scheduling. In Mode 4, the WTRU may autonomously select and/or reserve the resources from a configured resource pool. In an example, the configured resource pool may be a preconfigured resource pool. An autonomous resource reservation may be based on WTRU sensing to identify available candidate resources.

New Use Cases for NR V2X

NR V2X is expected to support new use cases, as defined in 3GPP standards. In particular, the following use cases are to be supported:

Vehicle Platooning. Vehicle Platooning enables the vehicles to dynamically form a group travelling together. All the vehicles in the platoon receive periodic data from the leading vehicle, in order to carry on platoon operations. This information allows the distance between vehicles to become extremely small, e.g., the gap distance translated to time can be very low (sub second). Platooning applications may allow the vehicles following to be autonomously driven.

Advanced Driving. Advanced Driving enables semi-automated or fully-automated driving. Longer inter-vehicle distance is assumed. Each vehicle and/or RSU shares data obtained from its local sensors with vehicles in proximity, thus allowing vehicles to coordinate their trajectories or maneuvers. In addition, each vehicle shares its driving intention with vehicles in proximity. The benefits of this use case group are safer traveling, collision avoidance, and/or improved traffic efficiency.

Extended Sensors. Extended Sensors enables the exchange of raw or processed data gathered through local sensors or live video data among vehicles, RSUs, devices of pedestrians and/or V2X application servers. The vehicles can enhance the perception of their environment beyond what their own sensors can detect and/or have a more holistic view of the local situation.

Remote Driving. Remote Driving enables a remote driver or a V2X application to operate a remote vehicle for those passengers who cannot drive themselves or a remote vehicle located in dangerous environments. For a case where variation is limited and/or routes are predictable, such as public transportation, driving based on cloud computing can be used. In addition, access to cloud-based back-end service platform can be considered for this use case group.

QoS for NR V2X

A QoS model is used for NR V2X in by 3GPP. In Rel-14 V2X as documented in TS 23.285, the QoS over PC5 is supported with the ProSe per-packet priority (PPPP). Application layer is allowed to mark the packets with the PPPP, which indicates the required QoS level. Certain enhancements were added, e.g., by allowing deriving of packet delay budget (PDB) from the PPPP.

The new QoS requirements for NR V2X are captured, for example, in TS 22.186. The new performances key performance indicators (KPIs) were specified with the following parameters:

Payload (Bytes);
Transmission rate (Message/Sec);
Maximum end-to-end latency (ms);
Reliability (%);
Data rate (Mbps);
Minimum required communication range (meters).

Note that the same set of service requirements may apply to both PC5 based V2X communication and/or Uu based V2X communication. These QoS characteristics could be well represented with 5G QoS indicator (5QI) defined in TS 23.501.

One possibility is to have a unified QoS model for PC5 and/or Uu, e.g., also use 5QIs for V2X communication over PC5, such that the application layer can have a consistent way of indicating QoS requirements regardless of the link used.

Considering the 5GS V2X capable WTRUs, there are three different types of traffic: broadcast, multicast, and/or unicast. For unicast type of traffic, the same QoS Model as that of Uu can be utilized, e.g., each of the unicast link could be treated as a bearer, and/or QoS flows could be associated with it. All the QoS characteristics defined in 5QI and/or the additional parameter of data rate could apply. In addition, the minimum (e.g., required) communication range could be treated as an additional parameter specifically for PC5 use. A similar consideration applies to multicast traffic, as it can be treated as a special case of unicast, e.g., with multiple defined receivers of the traffic.

For broadcast traffic, there is no bearer concept. Therefore, each of the message may have different characteristics according to the application requirements. The 5QI should then be used in the similar manner as that of the PPPP/ProSe per-packet reliability (PPPR), e.g., to be tagged with each of the packet. 5QI is able to represent all the characteristics needed for the PC5 broadcast operation, e.g., latency, priority, reliability, etc. A group of V2X broadcast specific 5QIs (e.g., VQIs) could be defined for PC5 use.

The PC5 QoS parameters are negotiated at the establishment of one-to-one communication procedure, so the one-to-one communication establishment procedure, for example defined in TS 23.303, is enhanced to support PC5 QoS parameters negotiation between two WTRUs. After the PC5 QoS parameters negotiation procedure, the same QoS is used in both directions.

Figure 3:
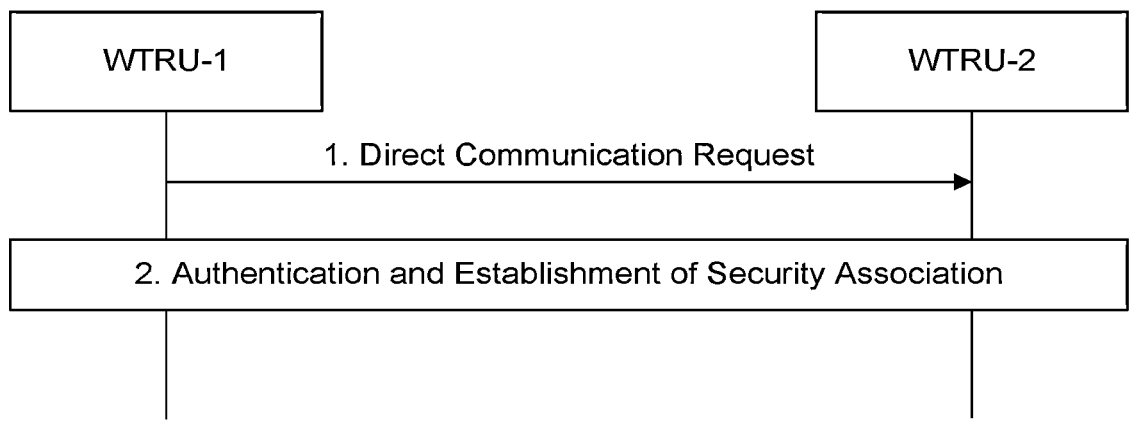
FIG. 3 depicts an example establishment of a secure Layer-2 Link over PC5.

WTRUs engaged in one-to-one communication (e.g., D2D communication) negotiate PC5 QoS parameters during the link establishment procedure as depicted in FIG. 3. Message 1 is a Direct Communication Request (DCR) message and message 2 is an Authentication and Establishment of security association message. At message 1, UE-1 (e.g., WTRU-1) sends a Direct Communication Request message to UE-2 (e.g., WTRU-2) in order to trigger mutual authentication. This message includes the requested PC5 QoS parameters. At message 2, UE-2 (e.g., WTRU-2) initiates the procedure for mutual authentication. The UE-2 (e.g., WTRU-2) includes the accepted PC5 QoS parameters in a response message.

DRX in NR Uu

CONNECTED mode DRX is specified for power savings in NR Uu for WTRU in RRC_CONNECTED. DRX is based on a configured schedule of wake-up times at the WTRU. If the WTRU receives physical downlink control channel (PDCCH) scheduling during its wakeup time, it remains awake for a certain time until no further scheduling is received. The WTRU can be configured with any of the following example parameters:
  drx-onDuration Timer: the duration at the beginning of a DRX cycle;
  drx-SlotOffset: the delay before starting the drx-onDuration Timer;
  drx-Inactivity Timer: the duration after the PDCCH occasion in which a PDCCH indicates a new UL or DL transmission for the MAC entity;
  drx-RetransmissionTimerDL (per DL Hybrid Hybrid ARQ, HARQ process except for the broadcast process): the maximum duration until a DL retransmission is received;
  drx-RetransmissionTimerUL (per UL HARQ process): the maximum duration until a grant for UL retransmission is received;
  drx-LongCycleStartOffset: the long DRX cycle and/or drx-StartOffset which defines the subframe where the Long and Short DRX Cycle starts;
  drx-ShortCycle (optional): the short DRX cycle;
  drx-ShortCycle Timer (optional): the duration the WTRU shall follow the Short DRX cycle;
  drx-HARQ-RTT-TimerDL (per DL HARQ process except for the broadcast process): the minimum duration before a DL assignment for HARQ retransmission is expected by the MAC entity;
  drx-HARQ-RTT-TimerUL (per UL HARQ process): the minimum duration before a UL HARQ retransmission grant is expected by the MAC entity.

A WTRU configured with DRX will then determine its active time (the time when the WTRU actively monitors PDCCH) based on any of:
  In a case where (e.g., when) a DRX cycle is configured, the Active Time includes the time while:
    drx-onDuration Timer or drx-Inactivity Timer or drx-Retransmission TimerDL or drx-Retransmission TimerUL or ra-ContentionResolutionTimer (for example, as described in subclause 5.1.5 of Rel. 14) is running; or
    a Scheduling Request is sent on physical uplink control channel (PUCCH) and is pending (for example, as described in subclause 5.4.4 of Rel. 14); and/or
    a PDCCH indicating a new transmission addressed to the cell radio network temporary identifier (C-RNTI) of the MAC entity has not been received after successful reception of a Random Access Response for the preamble not selected by the MAC entity (for example, as described in subclause 5.1.4 of Rel. 14).

Partial Sensing and/or Random Selection in LTE V2X

Another power savings mechanism that was introduced in LTE V2X (for use by pedestrian WTRUs) was the aspect of partial sensing. With partial sensing, the WTRU may be configured by upper layers with a minimum number of candidate subframes in the resource selection window [T1, T2], where the specific subframes are selected by WTRU implementation. The WTRU may perform sensing (e.g., only) on subframes in the sensing window which are an integer number of reservation periods from the candidate subframes, thus reducing the amount of resources the WTRU needs to perform sensing on in the sensing window.

Another possibility for pedestrian WTRUs is to perform random selection on the resource pool. If a resource pool is configured for random selection, the WTRU can perform selection of resources without considering any sensing results during the sensing procedure.

In SL communication, there are a number of differences with Uu scheduling which may create problems with the approach of DRX concept implemented by Uu:
  signaling control information (SCI)-based indication of retransmissions is used. Specifically, in SL, a single SCI may indicate resources for an additional transmission and/or further retransmissions for the HARQ process, where the transmission and/or the retransmissions can be non-contiguous in time. Running of the HARQ RTT timer and/or retransmission timer may (e.g., need to) take such SCI indications into account.
  Transmissions may have HARQ enabled or disabled, in which case, the timeline of the HARQ feedback is different. For HARQ enabled transmissions, the RX WTRU (e.g., WTRU 102) may transmit physical sidelink feedback channel (PSFCH) (as in Uu). For HARQ disabled transmissions, the RX WTRU (e.g., WTRU 102) may not transmit HARQ feedback on PSFCH. This may affect the definition of the timers for a HARQ process.
  Specifically, in Uu, HARQ RTT may be started in the symbol/slot at the end of the transmission which carries the DL HARQ feedback. However, in sidelink, the WTRU may not (e.g., always) transmit PSFCH for different reasons (for example, HARQ disable, UL/SL prioritization).

Depending on whether mode 1 or mode 2 is used, the minimum microsleep/DRX time may be different.

Although SCI may indicate the planned retransmission times for a HARQ process, events at the TX WTRU (e.g., WTRU 102) may cause a change in these times. Specifically, the TX WTRU (e.g., WTRU 102) may perform pre-emption of retransmission resources, for example, due to transmissions by higher priority WTRUs. Specifically, the TX WTRU (e.g., WTRU 102) may perform reselection, for example, due to prioritization of UL over SL. Specifically, the TX WTRU (e.g., WTRU 102) may not indicate (e.g., transmit a signal indicating) all of the retransmission resources immediately (in SCI), for example, due to channel busy ratio (CBR).

Methods for Sidelink DRX Timers

1. Methods for Defining Active Time for SL Retransmissions

A (e.g., TX or RX) WTRU may have mechanisms to determine the period of microsleep/DRX following a transmission or retransmission, for example with respect to a HARQ process, which depend on SL characteristics. This may be modeled as using a HARQ RTT timer (similar to Uu) whereby the start of such timer represents the start of a potential microsleep/DRX opportunity (whereby the WTRU does not monitor PSCCH operating with (e.g., assuming) no other timers defining activity—e.g., inactivity timer, retransmission timer, etc.—are running). The HARQ RTT timer may be configured for each SL HARQ process. The microsleep/DRX opportunity may end in a case where (e.g., when) the HARQ RTT timer expires and/or the retransmission timer (or a similar timer representing activity) is started. Alternatively, the WTRU may be configured with an explicit time period or set of resources (e.g., a set of slots relative to a SL event) for microsleep/DRX and/or an explicit time period, or set of resources (e.g., a set of slot relative to a SL event) where it should be active, for example for each SL HARQ process. Each of the following embodiments may be applicable to either alternative. Furthermore, "HARQ RTT timer" and/or "HARQ RTT time" are used interchangeably to represent the microsleep/DRX time for a HARQ process, regardless of whether this time is explicitly implemented with the use of a timer (as in Uu). Furthermore, HARQ RTT time/timer refers to the SL HARQ RTT timer in this disclosure.

1.1 Determining the Starting Time of HARQ RTT Timer

A RX WTRU (e.g., WTRU 102) may start a HARQ RTT timer at some time instant (e.g., the slot following, or a number of specified slots following) relative to any of:
- the reception of SCI and/or data for that HARQ process;
- the time of decoding of the MAC PDU associated with a HARQ process;
- at or following the time of a planned retransmission by the TX WTRU (e.g., WTRU 102), for example indicated in a previous SCI;
- determination of the decoding result (ACK or NACK) associated with the reception;
- transmission of the HARQ feedback associated with the received data;
- a (pre) configured or pre-define time following the reception of SCI and/or data for that HARQ process;
  - such (pre) configured or pre-defined time may be defined based on minimum WTRU capability, for example; and/or
- not start the HARQ RTT timer at all, and/or for example directly start the retransmission timer for the HARQ process.

a) RX WTRU (e.g., WTRU 102) May Determine to Start the HARQ-RTT at Different Times Depending on SL Characteristics A (e.g., RX) WTRU (e.g., WTRU 102) may determine when to start the HARQ RTT (timer) differently depending on a SL characteristic or condition. Specifically, the (e.g., RX) WTRU (e.g., WTRU 102) may start HARQ RTT timer at one instant under a first characteristic/condition, and/or may start HARQ RTT timer at another instant under a second characteristic/condition, where the time instances may be any of those indicated above. The conditions may be related to any of:
- whether SL HARQ feedback is enabled/disabled for a particular transmission/retransmission for the HARQ process;
- the cast type associated with the transmission:
  - for example, a (e.g., RX) WTRU (e.g., WTRU 102) may start HARQ RTT timer at a first time instant in a case where (e.g., when) the transmission is associated with unicast, and/or may start HARQ RTT timer at a second instant in a case where (e.g., when) the transmission is associated with groupcast;
- a QoS related parameter associated with the transmission (e.g., priority, MCR):
  - for example, a (e.g., RX) WTRU (e.g., WTRU 102) may start HARQ RTT timer at a first time instant if the priority associated with the transmission is above a threshold, and/or may start it at a second time instant otherwise;
- the value of the CBR:
  - for example, a (e.g., RX) WTRU (e.g., WTRU 102) may start HARQ RTT timer at a first time instant of the measured CBR is above a threshold, and/or may start it at a second time instant otherwise; and/or
- indication/information by a peer WTRU, as described herein:
  - for example, a (e.g., RX) WTRU (e.g., WTRU 102) may receive a DRX mode indication, or other information about the DRX in either PC5-RRC (e.g., semi-statically) or in SCI/MAC CE (dynamically) and/or may change the start time of the HARQ RTT timer based on this information;
  - for example, a (e.g., RX) WTRU (e.g., WTRU 102) may receive a DRX mode for different transmission types (e.g., the SL characteristics mentioned above) and/or may apply the HARQ RTT start time for each transmission type indicated by the peer WTRU.

Without loss of generality, the above conditions may also be applicable to determining when to start the HARQ RTT timer as well as whether or not to start the HARQ RTT timer.

According to embodiments, a (e.g., RX) WTRU (e.g., WTRU 102) may determine whether HARQ is enabled/disabled for a received PDU. The (e.g., RX) WTRU (e.g., WTRU 102) may determine the HARQ RTT starting point depending on the HARQ enabled/disabled property of the received PDU. If HARQ is enabled, the (e.g., RX) WTRU (e.g., WTRU 102) may start the HARQ RTT timer at the first symbol/slot following its transmission of the PSFCH containing the HARQ feedback for the transmission. If HARQ is disabled, the (e.g., RX) WTRU (e.g., WTRU 102) may start the HARQ RTT timer at the first symbol/slot following reception of the SCI or at the first symbol/slot following reception of the PSSCH corresponding to the received PDU for that HARQ process. According to embodiments, the (e.g., RX) WTRU (e.g., WTRU 102) may start the HARQ RTT timer at a pre-define time following reception of the SCI in this case, where such pre-define time corresponds to a minimum requirement defined for a (e.g., RX) WTRU (e.g., WTRU 102). A (e.g., RX) WTRU (e.g., WTRU 102) may further use different values of the HARQ RTT timer for each of the two scenarios. The start times of HARQ RTT may correspond to any of the times described above.

According to embodiments, a (e.g., RX) WTRU (e.g., WTRU 102) may start the HARQ RTT at the time instant associated with a retransmission resource under certain conditions. In other conditions, the (e.g., RX) WTRU (e.g., WTRU 102) may not start the HARQ RTT and/or may start a retransmission timer instead at such time instance. For example, the RX WTRU (e.g., WTRU 102) may start the HARQ RTT timer in the slot following the retransmission resource indicated by a previous SCI if any or a combination of the conditions in this and/or other clauses is met. For example, a RX WTRU (e.g., WTRU 102) may start HARQ RTT timer in slot following the planned retransmission resource indicated in SCI if the RX WTRU (e.g., WTRU 102) receives an indication to do so by the TX WTRU (e.g., WTRU 102) (e.g., mode 1 transmission), or if pre-emption/re-evaluation is disabled.

b) (e.g., RX) WTRU (e.g., WTRU 102) May Start a HARQ-RTT Timer (or Similar) in a Case where (e.g. when) it Performs UL/SL Transmission on a PSFCH Slot According to embodiments, a (e.g., RX) WTRU (e.g., WTRU 102) may start a HARQ-RTT associated with a HARQ process for reception in case a (e.g., TX) WTRU (e.g., WTRU 102) performs transmission (UL transmission or SL transmission), for example at a time instance where the (e.g., TX) WTRU (e.g., WTRU 102) may (e.g., be expected to) transmit on PSFCH. For example, if a (e.g., TX) WTRU (e.g., WTRU 102) prioritizes UL transmission over SL transmission of HARQ feedback on PSFCH (e.g., skips PSFCH transmission), the (e.g., RX) WTRU (e.g., WTRU 102) may start a HARQ RTT timer for the HARQ process (es) in which HARQ feedback was supposed to be transmitted on the skipped PSFCH. The (e.g., RX) WTRU (e.g., WTRU 102) may start the HARQ RTT timer at any of:

the symbol/slot following the (last) symbol/slot of the PSFCH;

the symbol/slot following the last symbol/slot of transmission of UL/SL which was prioritized over PSFCH transmission; and/or the symbol/slot following the symbol/slot in which the (e.g., TX) WTRU (e.g., WTRU 102) received the UL grant for UL transmission.

1.2 Determining the Starting Time of the Retransmission Timer a) A RX WTRU (e.g., WTRU 102) May be Configured with Different Time Instances for Starting a Retransmission Timer for a SL HARQ Process A (e.g., RX) WTRU (e.g., WTRU 102) may start a retransmission timer for a SL HARQ process at different times depending on SL characteristics. A (e.g., RX) WTRU (e.g., WTRU 102) may select any of the following times for starting a retransmission timer following (failed) reception of a HARQ process:

after (e.g., upon) expiry of a HARQ RTT time(r);

at, or some time prior to, the time resource indicated in the SCI sent along with the (failed) reception;

the slot following (or a number of slots following) the slot indicated in the SCI sent along with the (failed) reception;

at, some time prior to, or some time following the last retransmission resource received in SCI for a specific HARQ process; and/or not start the retransmission timer at all.

b) [RX WTRU (e.g., WTRU 102) Determines Whether/When to Start a HARQ Process Retransmission Timer Based on SCI]

A RX WTRU (e.g., WTRU 102) may set a retransmission timer for a specific initial transmission/retransmission of a HARQ process. According to embodiments, a RX WTRU (e.g., WTRU 102) may determine whether to start a retransmission timer and/or the starting time of the retransmission timer for a HARQ process (from those given above) based on any of:

Whether the SCI received for a HARQ process indicates a retransmission resource:

For example, the (e.g., RX) WTRU (e.g., WTRU 102) may start a retransmission timer (e.g., for example following some HARQ RTT time) in a case where (e.g., when) the SCI does not reserve resources for subsequent retransmissions. If the SCI reserves resources for a subsequent retransmission, the (e.g., RX) WTRU (e.g., WTRU 102) may not start the retransmission timer following reception of the current SCI (and may start it (e.g., only) after the subsequent SCI reception for the same HARQ process).

Whether the (e.g., RX) WTRU (e.g., WTRU 102) is expecting additional retransmission resources (following the currently received transmission/retransmission resource) for the specific HARQ process:

For example, the (e.g., RX) WTRU (e.g., WTRU 102) may start a retransmission timer (e.g., for example following some HARQ RTT time) in a case where (e.g., when) the current SCI/data reception for a particular HARQ process corresponds to the last (e.g., expected) retransmission for the HARQ process (as reserved using SCI indicated retransmission resources). If the SCI does not correspond to the last retransmission resource, the (e.g., RX) WTRU (e.g., WTRU 102) may not start the retransmission timer following reception of the SCI.

For example, the (e.g., RX) WTRU (e.g., WTRU 102) may determine whether or not to start a HARQ RTT timer depending on whether the SCI indicates an additional retransmission resource or not. Specifically, if the SCI indicates an additional retransmission resource, the UE may start the HARQ RTT timer at a time instance described herein. Alternatively, if the SCI does not indicate an additional retransmission resource, the UE may not start a HARQ RTT timer for the HARQ process.

Whether the (e.g., RX) WTRU (e.g., WTRU 102) successfully receives an SCI at a reserved time instant indicated by a previous SCI for the same HARQ process:
  For example, the (e.g., RX) WTRU (e.g., WTRU 102) may start a retransmission timer (e.g., in the slot following the time instant indicated by a previous SCI for the HARQ process) if the (e.g., RX) WTRU (e.g., WTRU 102) does not decode SCI in the slot where the (e.g., RX) WTRU (e.g., WTRU 102) expects a retransmission. Otherwise, if the (e.g., RX) WTRU (e.g., WTRU 102) receives SCI for the HARQ process in the slot where the (e.g., RX) WTRU (e.g., WTRU 102) is expecting a retransmission (based on a previous SCI), the (e.g., RX) WTRU (e.g., WTRU 102) may not start the retransmission timer. Alternatively, the (e.g., RX) WTRU (e.g., WTRU 102) may always start the retransmission timer in the slot in which the (e.g., RX) WTRU (e.g., WTRU 102) is expected a retransmission and/or may (e.g., immediately) stop the retransmission timer if an SCI is received, or continue to run the retransmission timer as long as the SCI is not received.

Whether the PDU for the HARQ process was successfully decoded or not:
  For example, a (e.g., RX) WTRU (e.g., WTRU 102) may start a retransmission timer (in any of the other cases associated with this clause) as long as the (e.g., RX) WTRU (e.g., WTRU 102) did not successfully decode the PDU associated with the HARQ process (e.g., in the previously received transmission/SCI):
    Specifically, successfully decoded here entails that the SCI was received, and/or the HARQ process ID and/or NDI indicate the received transmission is a retransmission associated with a currently allocated HARQ process at the (e.g., RX) WTRU (e.g., WTRU 102).

Whether the HARQ RTT timer expires (or is stopped) before or after the next planned retransmission:
  Specifically, a (e.g., RX) WTRU (e.g., WTRU 102) may start the retransmission timer at the earliest of the expiry of the HARQ RTT timer and/or the retransmission timer. For example, a (e.g., RX) WTRU (e.g., WTRU 102) may start the retransmission timer in a case where (e.g., when) the HARQ RTT timer expires, if the HARQ RTT timer expires prior to the next planned retransmission. Otherwise, the (e.g., RX) WTRU (e.g., WTRU 102) starts the retransmission timer at (or right after) the next planned retransmission indicated in SCI.

Whether pre-emption is configured/allowed by the TX WTRU (e.g., WTRU 102):
  For example, if the TX WTRU (e.g., WTRU 102) is allowed to reselect retransmission resources due to pre-emption, the TX WTRU (e.g., WTRU 102) may start the retransmission timer following the expiry of the HARQ RTT timer. On the other hand, if the TX WTRU (e.g., WTRU 102) is not allowed to perform pre-emption, the TX WTRU (e.g., WTRU 102) may start the retransmission timer at or on the slot following the next planned retransmission indicated in SCI.

Whether the TX WTRU (e.g., WTRU 102) is configured with mode 1 or mode 2:
  For example, the TX WTRU (e.g., WTRU 102) may always start the retransmission timer at (or at the slot after) the next planed retransmission indicated in SCI, if one is provided, in a case where (e.g., when) the TX WTRU (e.g., WTRU 102) is configured in mode 1. Otherwise (e.g., for mode 2, or for mode 1 in which a subsequent retransmission resource was not provided in SCI), the TX WTRU (e.g., WTRU 102) may start the retransmission timer following expiry of the HARQ RTT timer.

Whether a HARQ RTT timer was started/running or not for the HARQ process:
  For example, the TX WTRU (e.g., WTRU 102) may start the retransmission timer following the expiry of the corresponding HARQ RTT timer, if a HARQ RTT timer is running for the corresponding HARQ process. Otherwise, the TX WTRU (e.g., WTRU 102) may start the retransmission timer at the next scheduled retransmission indicated SCI, or may not start the retransmission timer at all for this specific HARQ process.
  For example, the TX WTRU (e.g., WTRU 102) may start the retransmission timer at expiry of the HARQ RTT timer, if a HARQ RTT timer is started. Otherwise, the TX WTRU (e.g., WTRU 102) may start the retransmission timer at another time instance indicated herein (e.g., reception of SCI, transmission of PSFCH, expected time of SCI reception based on previous SCI retransmission resource indication, etc.) if the HARQ RTT timer is not started (e.g., based on rules for whether to start or not the HARQ RTT timer described herein).

Indication from the TX WTRU (e.g., WTRU 102) about whether additional retransmission resources can be expected, or PDB not exceeded:
  Specifically, the TX WTRU (e.g., WTRU 102) may provide an indication (e.g., within a specific retransmission resource, such as via an indication in SCI, MAC CE, or in the MAC PDU header) about whether additional retransmission resources should be expected or not. Specifically, the TX WTRU (e.g., WTRU 102) may indicate that no additional retransmission resources are expected to the RX WTRU (e.g., WTRU 102) in a case where (e.g., when) the TX WTRU (e.g., WTRU 102) reaches the maximum number of retransmission resources. Such indication may be provided in the SCI associated with the last retransmission resource, or a previous SCI indicating retransmission resources. Specifically, the TX WTRU (e.g., WTRU 102) may indicate that no additional retransmission resources are expected to the RX WTRU (e.g., WTRU 102) in a case where (e.g., when) the TX WTRU (e.g., WTRU 102) is unable to find an additional resource (via resource selection) following the last retransmission resource which falls in the PDB of the packet. The RX WTRU (e.g., WTRU 102) may start a HARQ RTT and/or retransmission timer if the indication from the TX WTRU (e.g., WTRU 102) indicates that additional retransmission resources are expected. Alternatively, the RX WTRU (e.g., WTRU 102) may not start the HARQ RTT and/or retransmission timer for the HARQ process if the indication from the TX WTRU (e.g., WTRU 102) indicates that a retransmission will not be sent for the HARQ process.

Specifically, such indication may be either an indication that additional retransmissions are expected, or an indication that additional retransmissions are not expected.

For example, the RX WTRU (e.g., WTRU 102) may start a retransmission timer following failed decoding for a HARQ process if the TX WTRU (e.g., WTRU 102) indicated that the RX WTRU (e.g., WTRU 102) can expect additional retransmission resources. Otherwise, the RX WTRU (e.g., WTRU 102) may not start a retransmission timer.

Indication from the TX WTRU (e.g., WTRU 102) about whether the TX WTRU (e.g., WTRU 102) is expecting to perform reselection (e.g., following prioritization of UL by the TX WTRU (e.g., WTRU 102) which cases missed TX transmission by the TX WTRU (e.g., WTRU 102))—as described further herein:

Specifically, the TX WTRU (e.g., WTRU 102) may inform the RX WTRU (e.g., WTRU 102) whether the TX WTRU (e.g., WTRU 102) intends to perform reselection as a result of missed transmission in a reserved retransmission resource. The RX WTRU (e.g., WTRU 102) may start a retransmission timer if such reselection is planned, or if the missed transmission was the last reserved retransmission (in any previous SCI). Otherwise, the RX WTRU (e.g., WTRU 102) may not start the retransmission timer, and/or again start the HARQ RTT timer.

Whether the expected PDB for a PDU was exceeded at a given time:

For example, the TX WTRU (e.g., WTRU 102) may provide an expected PDB for a PDU (e.g., in an initial transmission/retransmission). For example, a RX WTRU (e.g., WTRU 102) may be configured with a mapping of priority and/or maximum PDB (for example with respect to the time of initial SCI reception of the initial transmission of the SCI. The (e.g., RX) WTRU (e.g., WTRU 102) may start the retransmission timer as long as the maximum PDB associated with the PDU is not exceeded.

Whether the retransmission resource associated with the SCI transmission was the last known retransmission resource reserved by the TX WTRU (e.g., WTRU 102) for the HARQ process by a previous SCI:

For example, the (e.g., RX) WTRU (e.g., WTRU 102) may use a first (pre) configured value of the retransmission timer if there are additional reserved retransmission resources, and/or may use a second value of the retransmission timer if there are no more reserved retransmission resources for the HARQ process from previous SCI transmissions.

For example, the (e.g., RX) WTRU (e.g., WTRU 102) may start a retransmission timer if the SCI was not decoded at a retransmission resource, and/or the retransmission resource was the last indicated/known retransmission resource reserved by a previous SCI. Otherwise, the (e.g., RX) WTRU (e.g., WTRU 102) may start a HARQ RTT timer instead (e.g., the RX WTRU (e.g., WTRU 102) expects additional retransmissions (e.g., only) at the next indicated location of the SCI).

Based on the number of retransmissions performed by the TX WTRU (e.g., WTRU 102) to that point for the specific HARQ process, for example compared with a maximum number which could depend on CBR/priority:

For example, the (e.g., RX) WTRU (e.g., WTRU 102) may start a retransmission timer and/or HARQ RTT timer if the number of retransmissions performed for the PDU is below a configured maximum. Otherwise, the (e.g., RX) WTRU (e.g., WTRU 102) may not start the retransmission timer and/or HARQ RTT timer for that HARQ process.

Based on a planned reception time of an SCI/data which the RX WTRU (e.g., WTRU 102) does not receive:

For example, a RX WTRU (e.g., WTRU 102) may perform/prioritize UL transmission or reception at the time corresponding to a planned retransmission by a peer (e.g., TX) WTRU (e.g., WTRU 102) indicated by a previous SCI, and/or may not be able to receive retransmission. For example, a RX WTRU (e.g., WTRU 102) may perform sidelink transmission at the time corresponding to a planned retransmission by a peer (e.g., TX) WTRU (e.g., WTRU 102) indicated by a previous SCI, and/or may not be able to receive the retransmission due to half duplex. In either case, the (e.g., RX) WTRU (e.g., WTRU 102) may start the retransmission timer at or some time following the time of the planned retransmission.

Based on the QoS of the PDU.

Based on the cast type of the transmission (for example in combination with an indication):

For example, for a unicast HARQ process, the WTRU may determine whether to start a HARQ RTT timer following an SCI transmission (for example where such SCI transmission does not indicate a retransmission resource) based on an indication (e.g., from the TX WTRU (e.g., WTRU 102). The TX WTRU (e.g., WTRU 102) may set such indication based on whether PUCCH is configured at the TX WTRU (e.g., WTRU 102). Specifically, if PUCCH is configured, the RX WTRU (e.g., WTRU 102) may start the HARQ RTT timer and/or if PUCCH is not configured, the RX WTRU (e.g., WTRU 102) may not start the HARQ RTT timer. On the other hand, for groupcast and/or broadcast, the RX WTRU (e.g., WTRU 102) may not start the HARQ RTT timer (again, for example for SCI transmission where such SCI does not indicate a retransmission resource).

The above conditions can also be applicable to determining when to start the retransmission timer as well, and/or whether or not to start the retransmission timer. Without loss of generality, the above conditions may also be applicable to when to start or whether to start the HARQ RTT timer.

In example embodiment, a (e.g., RX) WTRU (e.g., WTRU 102) may determine whether to start a retransmission based on successful reception of an SCI for retransmission, for example at the planned/expected reception time indicated by a previous SCI. Specifically, a (e.g., RX) WTRU (e.g., WTRU 102) may receive a first SCI (e.g., at time T1) indicating a retransmission resource at time T2. A (e.g., RX) WTRU (e.g., WTRU 102) may further perform microsleep/DRX for a SL HARQ process up to the time instance indicated by the first SCI (e.g., T2). A (e.g., RX) WTRU (e.g., WTRU 102) may determine whether to start a retransmission timer for a HARQ process based on whether the (e.g., RX) WTRU (e.g., WTRU 102) successfully received an SCI, for example indicating the same HARQ process ID, in the time instance T2. For example, if the (e.g., RX) WTRU (e.g., WTRU 102) monitors SCI at T2 and/or does not receive SCI, the (e.g., RX) WTRU (e.g., WTRU 102) may start the retransmission timer for that HARQ process. On the other hand, if the (e.g., RX) WTRU (e.g., WTRU 102) monitors SCI at T2 and/or receives SCI associated with the HARQ process, the (e.g., RX) WTRU (e.g., WTRU 102) may not start the retransmission timer for that HARQ process.

c) RX WTRU (e.g., WTRU 102) Determines Whether/When to Start a HARQ Process Retransmission Timer if it does not Decode SCI Whether the (e.g., RX) WTRU (e.g., WTRU 102) starts the retransmission timer in the above embodiments may further depend on whether the (e.g., RX) WTRU (e.g., WTRU 102) was monitoring SCI at time T2. Specifically, a (e.g., RX) WTRU (e.g., WTRU 102) may skip monitoring SCI due to half-duplex issue (e.g., it performs transmission at the same time instance) or UL/SL prioritization (e.g., it performs UL transmission instead of SCI monitoring). In such case, a (e.g., RX) WTRU (e.g., WTRU 102) may always start the retransmission timer at T2 if it did not decode SCI. Alternatively, the (e.g., RX) WTRU (e.g., WTRU 102) may not start the retransmission timer and/or may start the HARQ RTT timer for that HARQ process again. Specifically, the (e.g., RX) WTRU (e.g., WTRU 102) may perform microsleep/DRX until the next planned retransmission, or based on the configuration of the HARQ RTT timer, depending on conditions described herein. For example:

Under a first condition the (e.g., RX) WTRU (e.g., WTRU 102) may start the HARQ RTT timer;
Under a second condition, the (e.g., RX) WTRU (e.g., WTRU 102) may start the retransmission timer.

The first and second condition may be a combination (and/or) of any of the following conditions:
The TX WTRU (e.g., WTRU 102) is operating in mode 1.
The TX WTRU (e.g., WTRU 102) is operating in mode 2.
Pre-emption is disabled.
The SCI which was missed corresponds to the last retransmission resource indicated by a previous SCI.
The SCI which was missed does not correspond to the last retransmission resource indicated by a previous SCI.
The CBR is above/below a threshold.
The priority of the transmission is above/below a threshold.
A behavior indicated by the TX WTRU (e.g., WTRU 102) (e.g., the TX WTRU (e.g., WTRU 102) could indicate whether the RX WTRU (e.g., WTRU 102) should start HARQ RTT timer or start retransmission timer):
For example, the TX WTRU (e.g., WTRU 102) may determine, based on the operating mode, whether pre-emption is disabled and/or provide this information to the RX WTRU (e.g., WTRU 102).

For example, if the (e.g., RX) WTRU (e.g., WTRU 102) misses a planned SCI retransmission (e.g., for example following expiry of the HARQ RTT timer), the (e.g., RX) WTRU (e.g., WTRU 102) may start the retransmission timer if the TX WTRU (e.g., WTRU 102) uses mode 2 and/or preemption is enabled, or if missed SCI/retransmission was the last retransmission indicated by the previous SCI. Otherwise (e.g., if the TX WTRU (e.g., WTRU 102) uses mode 1, or the TX WTRU (e.g., WTRU 102) uses mode 2 with pre-emption disabled, and/or in either case, the missed SCI is not the last retransmission), the (e.g., RX) WTRU (e.g., WTRU 102) may start the HARQ RTT timer.

1.3 Determining the Value/Duration of the HARQ RTT Time/Timer or Retransmission Time/Timer at the RX WTRU (e.g., WTRU 102)

a) Active Time May be a Combination of Planned Reception Resources (Indicated by SCI) for Retransmissions and/or Time in which a Timer (e.g., Retransmission Timer) is Running According to embodiments, the value of the HARQ RTT Timer or retransmission timer can be determined by the TX WTRU (e.g., WTRU 102), the RX WTRU (e.g., WTRU 102), or a combination of the TX WTRU (e.g., WTRU 102) and/or RX WTRU (e.g., WTRU 102). Specifically, the TX WTRU (e.g., WTRU 102) can use conditions known at the TX WTRU (e.g., WTRU 102) to determine the value of timer and/or send it to the RX WTRU (e.g., WTRU 102). Alternatively, the RX WTRU (e.g., WTRU 102) can use conditions known at the RX WTRU (e.g., WTRU 102) and/or conditions informed by the TX WTRU (e.g., WTRU 102) to the RX WTRU (e.g., WTRU 102) to determine the value of the timer. Finally, a portion of the timer can be determined by the TX WTRU (e.g., WTRU 102) and/or sent to the RX WTRU (e.g., WTRU 102), and/or another portion of the timer can be determined by the RX WTRU (e.g., WTRU 102).

According to embodiments, a (e.g., RX) WTRU (e.g., WTRU 102) may define its active time (e.g., the time in which the (e.g., RX) WTRU (e.g., WTRU 102) may (e.g., be required to) monitor PSCCH) based on the combination of any planned reception resources for retransmissions indicated by SCI whereby the HARQ process associated with that SCI has not been successfully decoded, and/or the status of any of a number of timers. Specifically, a (e.g., RX) WTRU (e.g., WTRU 102) may be active if any of the SL inactivity timer(s), SL on duration timer(s), or SL retransmission timers associated with any SL HARQ process are running, or, at any specific resources in which a (e.g., RX) WTRU (e.g., WTRU 102) is expecting a retransmission for a particular HARQ process as per a previous SCI and/or the HARQ process has not been successfully decoded. Specifically, a (e.g., RX) WTRU (e.g., WTRU 102) may be expecting a retransmission as per previous SCI (e.g., for a specific SL HARQ process) if the SCI indicates a next retransmission resource, and/or the (e.g., RX) WTRU (e.g., WTRU 102) determined NACK from decoding the current data received at the current transmission/retransmission associated with the same SCI/HARQ process. In this case, the (e.g., RX) WTRU (e.g., WTRU 102) may determine to be active at that retransmission resource indicated by the SCI, in addition to activity based on the running of any additional timers. If the (e.g., RX) WTRU (e.g., WTRU 102) determines ACK from a transmission, the (e.g., RX) WTRU (e.g., WTRU 102) may wakeup according to (e.g., only) the timer-based activity.

b) Active Time Associated with Retransmissions Indicated by SCI May be Considered by Starting and/or Stopping the Retransmission Timer According to embodiments, the (e.g., RX) WTRU (e.g., WTRU 102) may define its active time based (e.g., only) on whether there are any timers associated with DRX running (as in Uu). In such case, monitoring on a retransmission resource indicated by SCI may be performed via the retransmission resource. Specifically, in the case where the (e.g., RX) WTRU (e.g., WTRU 102) monitors, for a specific HARQ process, (e.g., only) the resources associated with indicated/reserved time instances in SCI, the RX WTRU (e.g., WTRU 102) may:
- set the HARQ RTT timer to the amount of time until the next reserved retransmission resource, not including that resource;
- in a case where (e.g., when) the HARQ RTT timer expires and/or the PDU for the HARQ process has not been successfully decoded, the RX WTRU (e.g., WTRU 102) starts the retransmission timer for the HARQ process;
- as long as the SCI for the HARQ process is not received, the (e.g., RX) WTRU (e.g., WTRU 102) continues to run the retransmission timer, until expiry of the retransmission timer; and/or
- as soon as the (e.g., RX) WTRU (e.g., WTRU 102) decodes SCI for the HARQ process, the (e.g., RX) WTRU (e.g., WTRU 102) stops the retransmission timer.

c) A RX WTRU (e.g., WTRU 102) can Set the Retransmission Value to a Different Value According to embodiments, a RX WTRU (e.g., WTRU 102) can set the retransmission timer to different values. Specifically, the RX WTRU (e.g., WTRU 102) can set the retransmission timer for a HARQ process to any of the following:
- A (pre) configured value, or a value indicated by the TX WTRU (e.g., WTRU 102) (e.g., in RRC signaling, SCI, or in the MAC layer):
- A (e.g., RX) WTRU (e.g., WTRU 102) may further be (pre) configured with different retransmission timer values.
- A value of 0 (e.g., the (e.g., RX) WTRU (e.g., WTRU 102) does not use a retransmission timer).
- A value equivalent to a single slot:
  For example, under certain conditions described herein (e.g., TX WTRU (e.g., WTRU 102) uses mode 1, and/or the SCI does not contain any retransmission resources), the RX WTRU (e.g., WTRU 102) may set the retransmission timer to the equivalent of a single slot. Specifically, the RX WTRU (e.g., WTRU 102) may run the retransmission timer during the slot associated with the retransmission resource in the SCI.
- A value which is derived from the timing of the retransmission resources indicated in SCI:
  For example, a TX WTRU (e.g., WTRU 102) may set the value of the retransmission timer to the amount of time remaining (from the start of the retransmission timer) until the time location of the next retransmission resource indicated in a previous SCI.
  For example, a TX WTRU (e.g., WTRU 102) may set the value of the retransmission timer to the amount of time remaining (from the start of the retransmission timer) until the time location of the retransmission resource after the next retransmission resource.
- A value which is derived from the PDB or remaining PDB of the PDU and/or derived from the priority of the PDU:
  For example, the RX WTRU (e.g., WTRU 102) may be provided with a PDB or remaining PDB for a PDU (e.g., in SCI or MAC control element (CE) by the TX WTRU (e.g., WTRU 102). Alternatively, the RX WTRU (e.g., WTRU 102) may be configured with a mapping between the priority of a PDU and/or a maximum expected PDB (e.g., measured from the reception of the initial transmission).
  The RX WTRU (e.g., WTRU 102) may set a retransmission timer at any time following reception of such PDB. The RX WTRU (e.g., WTRU 102) may set the retransmission timer to the remaining time (from the start of the retransmission timer) until the expiry of the PDB.
  For example, the RX WTRU (e.g., WTRU 102) may set the retransmission timer to the minimum of another value (e.g., a (pre) configured value) and/or the remaining time until the expiry of the PDB.
- A value which depends on the measured or indicated (from the TX WTRU (e.g., WTRU 102) CBR:
  For example, the RX WTRU (e.g., WTRU 102) may be (pre) configured with different values of the retransmission timer depending on CBR/channel occupancy ratio (CR).
- A value which depends on the retransmission number (since the initial transmission for the HARQ process
  For example, the RX WTRU (e.g., WTRU 102) may be (pre) configured with a different value of the retransmission timer for each retransmission number, or with an offset/change in the value of the retransmission timer to be applied for each retransmission (e.g., following an initial transmission)

d) A RX WTRU (e.g., WTRU 102) May Decide/Determine Between a First HARQ RTT/Retransmission Timer and/or a Second HARQ RTT/Retransmission Timer Based on Characteristics of the Control/Data Transmission (e.g., SCI Transmission)

According to embodiments, a (e.g., RX) WTRU (e.g., WTRU 102) may determine a microsleep/DRX time for a HARQ process, or the value of a HARQ RTT timer and/or a retransmission timer based on information in the transmission by the TX WTRU (e.g., WTRU 102), which could include information in the SCI, information in the physical sidelink shared channel (PSSCH) (e.g., MAC CE), information in PC5-RRC, etc. For example, a (e.g., RX) WTRU (e.g., WTRU 102) may determine the HARQ RTT timer and/or retransmission timer based on whether there are retransmission resources in the SCI and/or the timing of such retransmission resources. Such determination may include the (e.g., RX) WTRU (e.g., WTRU 102) selecting between a first timer and a second timer. Such determination may include the (e.g., RX) WTRU (e.g., WTRU 102) selecting between a time derived from the SCI, and/or another time provided in another message (e.g., an RRC configuration or preconfiguration). Specifically, a (e.g., RX) WTRU (e.g., WTRU 102) may determine whether to use a first microsleep/DRX time or a second microsleep/DRX time and/or whether to use a first retransmission timer or a second retransmission timer based on any or a combination (and/or) of the following:
- Whether the SCI indicates one or more retransmission resources.
- Whether pre-emption is enabled/disabled for transmissions in the pool:
  Specifically, the RX WTRU (e.g., WTRU 102) may determine whether pre-emption by the TX WTRU (e.g., WTRU 102) is disabled based on pool configuration, or based on explicit indication from the TX WTRU (e.g., WTRU 102) (e.g., in PC5-RRC, MAC CE, sidelink radio bearers (SLRB) configuration, or in the SCI transmission itself).

The QoS (e.g., the priority) in the SCI.

The coverage (in coverage or out of coverage) of the RX WTRU (e.g., WTRU 102) or its peer (TX WTRU (e.g., WTRU 102)).

The RRC state of the RX WTRU (e.g., WTRU 102) or its peer (e.g., TX WTRU (e.g., WTRU 102).

Whether the RX WTRU (e.g., WTRU 102) is receiving data from a (e.g., TX) WTRU (e.g., WTRU 102) transmitting in mode 1 or mode 2 (where such information may further be provided to the RX WTRU (e.g., WTRU 102) by the TX WTRU (e.g., WTRU 102).

Whether the RX WTRU (e.g., WTRU 102) is receiving data from a (e.g., TX) WTRU (e.g., WTRU 102) that is reporting (e.g., transmitting information indicating) SL ACK/NACK to the network or not (in a case where (e.g., when) such TX WTRU (e.g., WTRU 102) is using mode 1 transmission) (where such information may further be provided to the RX WTRU (e.g., WTRU 102) by the TX WTRU (e.g., WTRU 102).

Whether the transmission is associated with blind or HARQ-based retransmissions (e.g., HARQ enabled/disable).

Whether the HARQ RTT timer expires (or is stopped) before or after the next planned transmission.

Whether or not the HARQ RTT timer/retransmission timer is started after the last transmission/retransmission resource indicated in a previous SCI.

Whether the RX WTRU (e.g., WTRU 102) successfully receives an SCI at a reserved time instant indicated by a previous SCI for the same HARQ process.

The timing of the resources (e.g., for retransmission) indicated in the SCI for the HARQ process:

For example, the (e.g., RX) WTRU (e.g., WTRU 102) may perform microsleep/DRX up to the retransmission resource indicated in SCI.

For example, the (e.g., RX) WTRU (e.g., WTRU 102) may perform DRX up to a number of slots prior/after the retransmission resource indicated in SCI, where the number of slots may be:

(Pre) configured by the network.

Provided by the peer (e.g., TX) WTRU (e.g., WTRU 102).

Depend on one or more other factors associated with the decision between a first and second HARQ RTT behavior (e.g., QoS, CBR, other indication by the TX WTRU (e.g., WTRU 102)):

For example, the (e.g., RX) WTRU (e.g., WTRU 102) may be (pre) configured with a number of slots for each priority of data associated with the HARQ process.

For example, the (e.g., RX) WTRU (e.g., WTRU 102) may be (pre) configured with a number of slots for each indication of CBR/congestion measured by the RX WTRU (e.g., WTRU 102) itself, or indicated by the TX WTRU (e.g., WTRU 102).

Indication from the TX WTRU (e.g., WTRU 102) about whether additional retransmission resources (using a new resource reservation) can be expected or not, or PDB is exceeded or not.

Some other implicit or explicit indication information provided by the TX WTRU (e.g., WTRU 102) (e.g., in the transmission itself, or in PC5-RRC before the transmission) as described herein.

Indication from the TX WTRU (e.g., WTRU 102) about whether the TX WTRU (e.g., WTRU 102) is expecting to perform reselection (e.g., following prioritization of UL by the TX WTRU (e.g., WTRU 102) which cases missed TX transmission by the TX WTRU (e.g., WTRU 102))—as described further herein.

e) A (e.g., RX) WTRU (e.g., WTRU 102) Determines Whether to Use a Value Provided by the TX WTRU (e.g., WTRU 102) (e.g., in SCI), or a Preconfigured Value for HARQ RTT According to embodiments, a (e.g., RX) WTRU (e.g., WTRU 102) may determine whether to define the HARQ RTT based on a (pre) configured timer, or whether to define the HARQ RTT based on an explicit time indication in the SCI (e.g., the retransmission resource) based on the above-mentioned information in the SCI. In one example, the (e.g., RX) WTRU (e.g., WTRU 102) may set the HARQ RTT timer (or microsleep/DRX time) to be the time until the next retransmission resource indicated in SCI. Specifically, the (e.g., RX) WTRU (e.g., WTRU 102) may be allowed to perform microsleep for a specific SL HARQ process starting at some time described herein for the start of the HARQ RTT timer, and/or may continue to perform DRX until the timing of the next expected retransmission resource indicated in the SCI. The (e.g., RX) WTRU (e.g., WTRU 102) may then start the retransmission timer or perform explicit monitoring of the resource associated with this next retransmission resource.

The (e.g., RX) WTRU (e.g., WTRU 102) may set the HARQ RTT to the timing of the next expected retransmission resource indicated in the SCI if any of the following of:

The SCI indicates at least one retransmission resource.

The next retransmission resource (e.g., following the transmission/retransmission resource for which the (e.g., RX) WTRU (e.g., WTRU 102) is determining a HARQ RTT) was provided in the SCI.

The transmission is a mode 1 transmission.

The transmission is a mode 2 transmission with pre-emption disabled.

On the other hand, the (e.g., RX) WTRU (e.g., WTRU 102) may set the HARQ RTT timer to 0, to some pre-configured value, or not use a HARQ RTT timer (e.g., immediately start a retransmission timer, or not perform microsleep/DRX), if:

the transmission/retransmission is associated with the last/only resource indicated in the SCI (e.g., there are no further retransmission resources indicated in SCI following this one); and/or the transmission is a mode 2 transmission with pre-emption enabled.

For example, the (e.g., RX) WTRU (e.g., WTRU 102) may set the HARQ RTT timer to the timing of the expected retransmission resource indicated in the SCI retransmission resource if:

the next retransmission resource is indicated in SCI and/or the TX WTRU (e.g., WTRU 102) uses mode 1; and/or the next retransmission resource is indicated in SCI and/or the TX WTRU (e.g., WTRU 102) uses mode 2 with pre-emption disabled.

On the other hand, the (e.g., RX) WTRU (e.g., WTRU 102) may set the HARQ RTT timer to a pre-configured value (where such preconfigured value may further depend on which of the below cases is considered) if:

the next retransmission resource is not indicated in SCI; and/or the next retransmission resource is indicated in SCI and/or the TX WTRU (e.g., WTRU 102) uses mode 2 with pre-emption enabled.

f) A (e.g., RX) WTRU (e.g., WTRU 102) Determines a Number of Resources Prior to the Planned Retransmission Time for Wakeup According to embodiments, a (e.g., RX) WTRU (e.g., WTRU 102) may determine a HARQ RTT as a time from the start of the HARQ RTT time or timer, to a specific instant of time prior to a planned retransmission resource indicated in SCI. The number of resources prior to the indicated retransmission or the explicit instance in time may be determined by the RX WTRU (e.g., WTRU 102) using any of the following:
Indicated by the TX WTRU (e.g., WTRU 102):
  For example, the TX WTRU (e.g., WTRU 102) could provide a time instant, or a number or slots prior to the planned retransmission resource to the RX WTRU (e.g., WTRU 102). This can be provided in a PC5-RRC message (e.g., as a configuration parameter) and/or applied semi-statically to all transmissions by the TX WTRU (e.g., WTRU 102). Alternatively, the RX WTRU (e.g., WTRU 102) can provide an indication in SCI or MAC CE, or in the MAC header which represents this number of slots (e.g., as an index to a table or an explicit value).
Based on the priority of the transmission:
  For example, the RX WTRU (e.g., WTRU 102) can determine a number of slots prior to the planned retransmission based on the priority indicated in the SCI. For example, the RX WTRU (e.g., WTRU 102) could be configured with a number of slots for a given priority, and/or may determine the HARQ RTT timer by subtracting the number of slots associated with that priority from the planned retransmission to determine the length of the HARQ RTT time.
Based on the retransmission number:
  For example, the RX WTRU (e.g., WTRU 102) can determine a number of slots prior to the planned retransmission time or the value of the HARQ RTT time based on the retransmission number associated with the HARQ process. For example, the (e.g., RX) WTRU (e.g., WTRU 102) may be (pre) configured with a first number of slots for a first (initial) transmission, a second number of slots for a first retransmission, a third number of slots for a second retransmission and/or so on.
Based on the CBR:
  For example, the RX WTRU (e.g., WTRU 102) can determine a first number of slots for a first range of CBR, and/or a second number of slots for a second range (e.g., lower) of CBR, and/or so on. The RX WTRU (e.g., WTRU 102) may use its own measured CBR. Alternatively, the RX WTRU (e.g., WTRU 102) can use a value of CBR provided by the TX WTRU (e.g., WTRU 102).
Preference (e.g., power-related) at the RX WTRU (e.g., WTRU 102):
  For example, the RX WTRU (e.g., WTRU 102) can determine the number of slots based on the current power savings status or preference at the RX WTRU (e.g., WTRU 102), indicated from upper layers. Such may be configured as a combination of a (e.g., RX) WTRU (e.g., WTRU 102) capability and/or the current power savings preference at the RX WTRU (e.g., WTRU 102).

g) A TX WTRU (e.g., WTRU 102) May Use the Same/Similar Conditions to Define Restrictions on Reselection Following Preemption According to embodiments, a TX WTRU (e.g., WTRU 102) may restrict the allowed re-selection resources (e.g., following preemption, skipped transmissions, etc.), for example for the retransmission resources, to the active time associated with the RX WTRU (e.g., WTRU 102) where such active time may be defined by the maintenance at the TX WTRU (e.g., WTRU 102) of a set of timers and/or fixed/(pre) configured resources. A TX WTRU (e.g., WTRU 102) may restrict the allowed re-selection resources for retransmission based on similar criteria as the above embodiments. The TX WTRU (e.g., WTRU 102) may further impose such restrictions for the case where the RX WTRU (e.g., WTRU 102) is expected to be in DRX. A TX WTRU (e.g., WTRU 102), after (e.g., upon) pre-emption associated to a resource, may limit the selected resources for retransmission based on priority, CBR, retransmission number, preference from the RX WTRU (e.g., WTRU 102), etc. For example, for a first value/range of priority of transmission, the TX WTRU (e.g., WTRU 102) may select resources which are limited to a first window of resources before and/or after the retransmission resource initially indicated in the SCI. For a second priority or priority range, the TX WTRU (e.g., WTRU 102) may select resources which are limited to a second window or resources before and/or after the retransmission resource initially indicated in SCI. Without loss of generality, such window may further be restricted to a (pre) configured pattern of resources. In such case, the RX WTRU (e.g., WTRU 102) will monitor (e.g., only) the preconfigured pattern of resources for a HARQ process when in DRX. For example, a WTRU may apply such restrictions for the case of pre-emption (e.g., only), in a case where (e.g., when) communicating with an RX WTRU (e.g., WTRU 102) configured with DRX. Specifically, the TX WTRU (e.g., WTRU 102) may restrict reselection of retransmission resources to ensure that the new retransmission resource (e.g., always) may occur after the planned retransmission resource timing (indicated by the previous SCI). As discussed with the conditions herein, this may be to ensure that the RX WTRU (e.g., WTRU 102) (which may operate with (e.g., assume that) pre-emption may not select a resource before the next planned retransmission resource), may use the timing of the next planned SCI as HARQ RTT timer.

h) A (e.g., RX) WTRU (e.g., WTRU 102) Determines Whether it Set the HARQ RTT Time Based on the SCI Retransmissions Based on Priority and/or CBR According to embodiments, a (e.g., RX) WTRU (e.g., WTRU 102) may determine whether to use the timing of the SCI retransmission resource or a (pre) configured value (which would for example expire prior to such retransmission resource) based on the priority of the PDU and/or measured/indicated CBR. For example, whether a TX WTRU (e.g., WTRU 102) can select resources (as a result of pre-emption) which occur prior to the planned retransmission resource in SCI, or whether (e.g., only) after, can depend on the priority of the PDU and/or CBR. For example, if the priority of the PDU is above a threshold (higher priority than the priority indicated by the threshold), and/or for a specific range of CBR, the (e.g., RX) WTRU (e.g., WTRU 102) may use a first (shorter) HARQ RTT timer selected from (pre) configuration. In such case, the TX WTRU (e.g., WTRU 102) can perform reselection as a result of pre-emption from a set of resources, where some of those resources may occur prior to the planned retransmission in the SCI. On the other hand, if the priority of the PDU is below a threshold (lower than the priority indicated by the threshold), and/or for a second (e.g., lower) range of CBR, the RX WTRU (e.g., WTRU 102) may determine the value of the HARQ RTT to be the time until the next expected retransmission resource indicated in the SCI (either the retransmission resource or the slot following it). In this case, for the TX WTRU (e.g., WTRU 102), in a case where (e.g., when) the TX WTRU (e.g., WTRU 102) performs resource reselection following pre-emption, the TX WTRU (e.g., WTRU 102) can (e.g., only) select resources which occur after the initial retransmission resource.

Such selection may further use (e.g., depend on) the retransmission number. Specifically, the priority threshold may use (e.g., depend on) the retransmission resource. Whether such selection is possible or not may depend on which retransmission resource is considered.

i) A (e.g., RX) WTRU (e.g., WTRU 102) Determines Whether to Use a First or a Second Value (Pre)Configured Value for HARQ RTT According to embodiments, a (e.g., RX) WTRU (e.g., WTRU 102) can determine whether to select between a first (pre) configured value or a second (pre) configured value based on one of the conditions defined above for selecting between two different timer values. Such determination may further be combined with the solution of determining whether to use a value in SCI or a preconfigured value, such that the (e.g., RX) WTRU (e.g., WTRU 102) may determine based on a first set of conditions to use a (pre) configured value (rather than a value in SCI), and/or may determine which (pre) configured value to use based on a second set of conditions.

Without loss of generality, selecting a first/second (pre) configured value may imply combining (e.g., via addition) two (pre) configured values to determine the overall HARQ RTT. For example, the (e.g., RX) WTRU (e.g., WTRU 102), under a first condition, may set the HARQ RTT timer to a value of X+Y, and/or under a second condition, may set the HARQ RTT timer to a value of X+Z, where X, Y, and/or Z are all (pre) configured values. The (e.g., RX) WTRU (e.g., WTRU 102) may obtain such (pre) configuration from the peer (e.g., TX) WTRU (e.g., WTRU 102) and/or from the network. A (e.g., RX) WTRU (e.g., WTRU 102) may further determine such value of X/Y/Z implicitly based on the configuration of sidelink signals/channels (e.g., PSFCH). For example, the (e.g., RX) WTRU (e.g., WTRU 102) may determine the value of any component of HARQ RTT to be associated with the time between SCI reception and/or PSFCH. For example, the (e.g., RX) WTRU (e.g., WTRU 102) may determine the value of any component of HARQ RTT to be associated with the time between PSFCH and/or some explicit resource indicated by the TX WTRU (e.g., WTRU 102). For example, the (e.g., RX) WTRU (e.g., WTRU 102) may determine the value of any component of HARQ RTT as a specified value (e.g., in specifications).

For example:
- a (e.g., RX) WTRU (e.g., WTRU 102) may select a first (pre) configured timer for HARQ enabled transmissions for which the TX WTRU (e.g., WTRU 102) reports (e.g., transmits information indicating) SL HARQ feedback to the network. Such first timer may be determined by combining two values provided by the TX WTRU (e.g., WTRU 102) in PC5-RRC signaling, where the first value corresponds to a PSFCH to PUCCH delay at the TX WTRU (e.g., WTRU 102), and/or the second value corresponds to a PUCCH to DCI/SCI scheduling configured by the network (and sent by the TX WTRU (e.g., WTRU 102) to the RX WTRU (e.g., WTRU 102) in PC5-RRC signaling);
- a (e.g., RX) WTRU (e.g., WTRU 102) may select a second (pre) configured timer for HARQ disabled transmissions for which the TX WTRU (e.g., WTRU 102) reports (e.g., transmits information indicating) SL HARQ feedback to the network. Such second timer may be determined by combining an SCI to PUCCH minimum latency provided by the TX WTRU (e.g., WTRU 102), and/or a PUCCH to SCI/SCO scheduling configured by the network;
- a (e.g., RX) WTRU (e.g., WTRU 102) may select a third (pre) configured timer for HARQ enabled transmissions for which the TX WTRU (e.g., WTRU 102) does not report (e.g., transmit information indicating) SL HARQ feedback to the network. Such third timer may be determined as the value of the PSFCH to PSSCH latency at the TX WTRU (e.g., WTRU 102), which could be provided by the TX WTRU (e.g., WTRU 102); and/or
- a (e.g., RX) WTRU (e.g., WTRU 102) may select a third (pre) configured timer for HARQ disabled transmissions for which the (e.g., RX) WTRU (e.g., WTRU 102) does not report (e.g., transmit information indicating) SL HARQ feedback to the network. Such timer may be determined as the value of the minimum latency between SCI associated with a last retransmission resource, and/or a new SL resource scheduled for the same HARQ process by the network (as configured by the network and/or sent by the TX WTRU (e.g., WTRU 102) to the RX WTRU (e.g., WTRU 102).

Without loss of generality, the above embodiments also apply to the TX WTRU (e.g., WTRU 102) and/or the case where the TX WTRU (e.g., WTRU 102) computes the HARQ RTT and/or sends it to the RX WTRU (e.g., WTRU 102).

Without loss of generality, the above embodiments could be used in combination-specifically, the TX WTRU (e.g., WTRU 102) may compute a first portion of the HARQ RTT and/or send it to the RX WTRU (e.g., WTRU 102). The RX WTRU (e.g., WTRU 102) can compute the final value of the HARQ RTT by adding the received portion with its own determined portion. Any of the portions can be determined based on criteria discussed in the embodiments herein.

j) A DRX Timer May be a Function of the Configured Resource Pool

Resource Pools in V2X can have a different number of UL resources configured for sidelink transmission. This may affect the responsiveness of a (e.g., RX) WTRU (e.g., WTRU 102) in DRX.

According to embodiments, a (e.g., RX) WTRU (e.g., WTRU 102) may be configured with one or more timer values related to SL DRX operation (e.g., any of inactivity timer, HARQ RTT timer, retransmission timer, on-duration timer, etc.) per resource pool. Specifically, the timers for SL DRX may be configured along with the RX resource pool for the (e.g., RX) WTRU (e.g., WTRU 102).

According to embodiments, a (e.g., RX) WTRU (e.g., WTRU 102) may apply a compensation factor to a configured DRX timer (e.g., any of inactivity timer, HARQ RTT timer, retransmission timer, on-duration timer, etc.), where such compensation factor may be specific to the RX resource pool of the (e.g., RX) WTRU (e.g., WTRU 102). For example, the (e.g., RX) WTRU (e.g., WTRU 102) may be provided the compensation factor in the RX resource pool configuration. For example, the (e.g., RX) WTRU (e.g., WTRU 102) may determine the compensation factor using the amount/ratio of UL resources allowable for sidelink transmission on the SL resource pool. A (e.g., RX) WTRU (e.g., WTRU 102) may apply such compensation factor (e.g., multiply by the factor) to a configured timer to obtain the actual timer value to be used in DRX operation.

k) TX WTRU (e.g., WTRU 102) Provides Information to the RX WTRU (e.g., WTRU 102) for the RX WTRU (e.g., WTRU 102) to Compute HARQ RTT/Retransmission Timer As described here above, the RX WTRU (e.g., WTRU 102) may determine the HARQ RTT time/timer and/or retransmission time/timer from explicit determination by the TX WTRU (e.g., WTRU 102). The TX WTRU (e.g., WTRU 102) may signal such time/timer to the RX WTRU (e.g., WTRU 102). Such determination and/or indication may take place statically (e.g., during configuration of a unicast link), or dynamically at the occurrence of some event (e.g., change in CBR), for each HARQ process, for each SCI transmission, for each configured grant configured/reconfigured/activated, etc.

According to embodiments, the TX WTRU (e.g., WTRU 102) may provide information to the RX WTRU (e.g., WTRU 102) for the RX WTRU (e.g., WTRU 102) to compute the associated HARQ RTT and/or retransmission timers. This may include any of the following:
- Whether the TX WTRU (e.g., WTRU 102) is configured with mode 1 or mode 2.
- Whether the TX WTRU (e.g., WTRU 102) is configured to report (e.g., transmit information indicating) HARQ ACK/NACK to the network in mode 1.
- The measured CBR/CR.
- One or more network-configured values of the timers, or components of such timers.
- One or more WTRU-determined (e.g., based on capability) values of the timers, or components of such timers.
- An indication of whether the TX WTRU (e.g., WTRU 102) will take one or another specific behavior with respect to pre-emption and/or UL/SL prioritization occurring at a retransmission resource.

The TX WTRU (e.g., WTRU 102) can use any or a combination of PC5-RRC, MAC CE, MAC header, or a field in SCI to carry any of the above information. For example, the TX WTRU (e.g., WTRU 102) can use a field in the SCI, where each codepoint of that field represents a combination of mode 1/mode 2, HARQ ACK/NACK reporting (e.g., transmitting information indicating), measured CBR range, etc.

l) [TX WTRU (e.g., WTRU 102) Computes HARQ RTT and/or Sends to RX WTRU (e.g., WTRU 102)]

According to embodiments, the TX WTRU (e.g., WTRU 102) may compute the HARQ RTT, or a portion of the HARQ RTT, and/or send it to the RX WTRU (e.g., WTRU 102) to be used semi-statically and/or for a specific HARQ process, configured grant, or SCI transmission. The TX WTRU (e.g., WTRU 102) may send the HARQ RTT in a MAC CE, or in the SCI transmission.

m) [TX WTRU (e.g., WTRU 102) Indicates Whether/how it Performs Reselection Following Pre-Emption, UL/SL Prioritization, Etc.]

According to embodiments, a TX WTRU (e.g., WTRU 102) may indicate to the RX WTRU (e.g., WTRU 102) whether/how it performs reselection of resources following an event which may change the timing of planned transmissions to the RX WTRU (e.g., WTRU 102). Specifically, the TX WTRU (e.g., WTRU 102) may inform the RX WTRU (e.g., WTRU 102) any of that:
- Whenever TX WTRU (e.g., WTRU 102) prioritizes UL over SL during a planned retransmission, whether the TX WTRU (e.g., WTRU 102) will always perform reselection, or not perform retransmission (e.g., always wait for retransmission in the next retransmission resource if one was indicated, or drop the retransmission).
- Whenever TX WTRU (e.g., WTRU 102) prioritizes UL over SL during a planned retransmission, the conditions under which the TX WTRU (e.g., WTRU 102) will perform reselection, where such conditions may be based on a specific parameter being above/below a specific threshold, where such parameter may be any of the following:
  Priority.
  CBR.
  Retransmission number.
  Number of remaining retransmissions.
  Remaining PDB.
  Time elapsed following the initial transmission.
- Whenever a TX WTRU (e.g., WTRU 102) performs pre-emption on a retransmission resource, whether the TX WTRU (e.g., WTRU 102) performs reselection or simply drops transmission on the re-transmission resource.
- Whenever a TX WTRU (e.g., WTRU 102) performs pre-emption on a retransmission resource, what are the conditions for the TX WTRU (e.g., WTRU 102) to perform reselection on a retransmission resource, where such conditions could be based on a specific parameter being above/below a specific threshold, where such parameter may be any of the following:
  Priority.
  CBR.
  Retransmission number.
  Number of remaining retransmissions.
  Remaining PDB.
  Time elapsed following the initial transmission.
- Whenever the TX WTRU (e.g., WTRU 102) performs pre-emption on a retransmission resource, which subset of resources (or window) the TX WTRU (e.g., WTRU 102) considers for reselection of the retransmission resource (for example such resources being defined relative to the timing of the retransmission resource), or the conditions for determining such resources such as based on any of the following:

Priority.
CBR.
Retransmission number.
Number of remaining retransmissions.
Remaining PDB.
Time elapsed following the initial transmission.

Whenever the TX WTRU (e.g., WTRU 102) performs pre-emption on a retransmission resource, whether the TX WTRU (e.g., WTRU 102) can select from resources that occur prior to the retransmission resource previously indicated by SCI, and/or if based on the condition, what such conditions are such as based on any of the following:
Priority.
CBR.
Retransmission number.
Number of remaining retransmissions.
Remaining PDB.
Time elapsed following the initial transmission.

The RX WTRU (e.g., WTRU 102) may determine the HARQ RTT timer value based on such information provided by the TX WTRU (e.g., WTRU 102) based as further described herein.

(Mode 1 Case)

A (e.g., TX) WTRU (e.g., WTRU 102) configured to transmit using mode 1 may compute a HARQ RTT timer based on one of the mechanisms described below.

n) [TX WTRU (e.g., WTRU 102) Computes HARQ RTT Sent to RX WTRU (e.g., WTRU 102) Based on Timing of the SL HARQ Feedback to the gNB]

According to embodiments, a TX WTRU (e.g., WTRU 102) may determine the HARQ RTT to be sent to the RX WTRU (e.g., WTRU 102) based on the timing of PUCCH resource configured by the network. For example, the TX WTRU (e.g., WTRU 102) may compute the HARQ RTT, or a component of the HARQ RTT, based on any of the following:

The time difference between a PSFCH resource carrying HARQ feedback for the HARQ process, and/or a PUCCH resource configured (e.g., in RRC for cell group (CG), or in DCI for dynamic grant) for providing SL HARQ feedback.

This may correspond to, or be derived from, the maximum value of PSFCH to PUCCH provided to the WTRU in DCI or in RRC (e.g., for CG type 1).

This may correspond to the earliest PUCCH occasion for transmission computed from the PUCCH resource indicator field in the DCI.

The time difference between an SCI transmission/retransmission for a HARQ process, and/or the PUCCH resource configured for providing SL HARQ feedback.

The time difference between a PSFCH resource carrying HARQ feedback for the HARQ process, and/or a physical uplink shared channel (PUSCH) resource in which the TX WTRU (e.g., WTRU 102) can send/decides to send SL HARQ feedback.

The time difference between an SCI transmission/retransmission for a HARQ process, and/or the PUCCH resource configured for providing the SL HARQ feedback.

For example, the TX WTRU (e.g., WTRU 102) may combine such value with a network (NW) configured value (e.g., by adding the values together).

For example, the TX WTRU (e.g., WTRU 102) may compute a component of the HARQ RTT based on the value of PSFCH to PUCCH delay provided by the network, if such value is configured (e.g., in DCI or RRC). Otherwise, the TX WTRU (e.g., WTRU 102) may compute the HARQ RTT to be any of the following:

The value of a specified minimum time between a PSFCH resource and/or PUSCH/PUCCH resource for reporting (e.g., transmitting information indicating) HARQ ACK.

A default value (e.g., 0).

The earliest PUSCH resource configured for transmitting HARQ feedback for a corresponding PSFCH.

o) TX WTRU (e.g., WTRU 102) Computes HARQ RTT by Selecting/Combining Values

According to embodiments, a TX WTRU (e.g., WTRU 102) may select/combine HARQ RTT or components of the HARQ RTT based on any of the following:
mode (mode 1 or mode 2);
whether configured to report (e.g., transmit information indicating) PUCCH/PUSCH; and/or
whether HARQ enabled/disabled.

The behavior in such embodiments is similar to that of the RX WTRU (e.g., WTRU 102) combining such timers when receiving the information of these factors from the TX WTRU (e.g., WTRU 102).

(Mode 2 Case)

A (e.g., TX) WTRU (e.g., WTRU 102) configured to transmit using mode 2 may compute a HARQ RTT timer based on one of the mechanisms described below.

p) TX WTRU (e.g., WTRU 102) Computes HARQ RTT Based on the Expected Pre-Emption Checking Time According to embodiments, a TX WTRU (e.g., WTRU 102) may compute the HARQ RTT based on the expected pre-emption checking time (e.g., as defined in the ETSI standard). For example, a TX WTRU (e.g., WTRU 102) may determine an earliest/latest/expected time in which the TX WTRU (e.g., WTRU 102) will perform pre-emption check for a reserved resource for retransmission. The TX WTRU (e.g., WTRU 102) may provide this time to the RX WTRU (e.g., WTRU 102).

A (e.g., TX) WTRU (e.g., WTRU 102) may further determine such time based on any of the following:
Priority of the PDU transmitted in the initial transmission. For example, the TX WTRU (e.g., WTRU 102) may determine a first pre-emption checking time for a first priority of packet, a second pre-emption checking time for a second priority of packet, etc.
A preference indication (e.g., based on power-savings status) from the RX WTRU (e.g., WTRU 102). For example, the TX WTRU (e.g., WTRU 102) may obtain power savings assistance information from the RX WTRU (e.g., WTRU 102). For example, such information may be in the form of a power savings level (low power mode, medium power mode, high power mode). For example, the TX WTRU (e.g., WTRU 102) may select a first pre-emption time for low power mode, a second pre-emption time for medium power mode, etc.
The measured CBR.
A configured (e.g., TX or RX) WTRU capability.

According to embodiments, a TX WTRU (e.g., WTRU 102) may be configured to select the pre-emption checking time from a combination of the above (for example, a first pre-emption checking time for a specific combination if power preference indication, and/or CBR, and/or priority.

According to embodiments, a (e.g., TX) WTRU (e.g., WTRU 102) may determine the HARQ RTT as the time until the expected pre-emption checking (starting from the initial transmission/retransmission). The (e.g., TX) WTRU (e.g., WTRU 102) may determine the HARQ RTT by adding some (pre) configured/specified value of time to the expected pre-emption checking time. The TX WTRU (e.g., WTRU 102) may send the computed HARQ RTT to the RX WTRU (e.g., WTRU 102).

1.4 TX WTRU (e.g., WTRU 102) Behavior in Support of HARQ RTT and/or Retransmission Timers a) TX WTRU (e.g., WTRU 102) Determines Whether to Perform Reselection Following Pre-Emption/Prioritization According to embodiments, a TX WTRU (e.g., WTRU 102) may be configured with conditions on whether pre-emption and/or prioritization (e.g., UL prioritization over SL transmission) can trigger (re) selection or not. Specifically, a TX WTRU (e.g., WTRU 102) may not perform resource reselection following pre-emption if the RX WTRU (e.g., WTRU 102) is configured with SL DRX. Specifically, a TX WTRU (e.g., WTRU 102) may not perform resource reselection following a missed transmission of SCI/data (e.g., at a planned or announced resource) in a case where (e.g., when) the TX WTRU (e.g., WTRU 102) performed UL transmission instead of SL transmission, if the RX WTRU (e.g., WTRU 102) is configured in DRX. Such may be done to avoid transmission by the TX WTRU (e.g., WTRU 102) on a resource in which the RX WTRU (e.g., WTRU 102) is known to be in DRX (not monitoring SL). According to embodiments, a TX WTRU (e.g., WTRU 102) may be configured with specific conditions or a combination (and/or) of conditions on when such reselection should be performed, for example in a case where (e.g., when) the RX WTRU (e.g., WTRU 102) is in DRX, related to any of:

Priority/QoS:
  For example, a TX WTRU (e.g., WTRU 102) may perform reselection of a retransmission resource if the priority of the transmission/PDU is above a threshold (where such threshold may further depend on CBR).

Remaining Retransmission resources:
  For example, a TX WTRU (e.g., WTRU 102) may perform reselection of a retransmission resource depending on the presence/number of remaining retransmission resources for the same HARQ process that have already be reserved (e.g., for example which are not affected by the preemption).
  For example, a TX WTRU (e.g., WTRU 102) may perform reselection of a retransmission resource if at least x additional retransmission resources are remaining following the missed/preempted retransmission (where x may further depend on any other condition such as priority, CBR, etc.).

CBR:
  For example, a TX WTRU (e.g., WTRU 102) may perform reselection of a retransmission resource if the CBR is below a threshold.

According to embodiments, a TX WTRU (e.g., WTRU 102) which may decide/determine to not perform reselection following a skipped retransmission may use the remaining resource(s) indicated in SCI, in a case were (e.g., assuming) such resources were not preempted. Alternatively, the TX WTRU (e.g., WTRU 102) may choose to drop the resources. Whether the TX WTRU (e.g., WTRU 102) decides to use the resources or drop them may further depend on any of the following:

The number of retransmissions performed for a PDU already.
The QoS associated with the PDU.
The number of remaining retransmissions for the HARQ process which were previously announced. and/or which can still be performed by the TX WTRU (e.g., WTRU 102).
The power level/preference of the RX WTRU (e.g., WTRU 102).
A combination thereof.

For example, a TX WTRU (e.g., WTRU 102) may be configured with a minimum number of performed retransmissions for a HARQ process for a specific priority and/or power preference level of the RX WTRU (e.g., WTRU 102). If the (e.g., TX) WTRU (e.g., WTRU 102) cannot perform transmission associated with a specific planned retransmission resource, the TX WTRU (e.g., WTRU 102) may drop all subsequent reserved retransmission resources for that HARQ process if the minimum number of retransmissions have been performed. Otherwise, the TX WTRU (e.g., WTRU 102) may perform retransmission in the remaining reserved retransmission resources and/or perform resource selection for a new set of resources associated with the same HARQ process if the minimum number of retransmissions has not been reached.

Similar behavior may be expected at the RX WTRU (e.g., WTRU 102) for setting the retransmission timer for a HARQ process. Specifically, the RX WTRU (e.g., WTRU 102) may be configured with the same minimum number of retransmissions for a HARQ process of a specific priority and/or power preference level. If the RX WTRU (e.g., WTRU 102) is not able to decode SCI at a planned/reserved resource and/or the RX WTRU (e.g., WTRU 102) is configured with DRX, the RX WTRU (e.g., WTRU 102) may:
  start the retransmission timer if the minimum number of retransmissions for the HARQ process is not reached;
  not start the retransmission timer (e.g., move to sleep for that HARQ process) if the minimum number of retransmissions for the HARQ process is reached.

b) TX WTRU (e.g., WTRU 102) can Indicate a Last Retransmission for a HARQ Process Ambiguity can exist at the RX WTRU (e.g., WTRU 102) about whether the TX WTRU (e.g., WTRU 102) does not indicate additional reserved retransmission resources in SCI due to the fact that the number of retransmissions (for a specific priority/CBR) is exceeded or the PDB is exceeded, compared to the case where the TX WTRU (e.g., WTRU 102) is not able to find sufficient retransmission resources at the time of resource selection (and may later perform separate resource selection for additional transmission resources).

According to embodiments, the TX WTRU (e.g., WTRU 102) may include an indication to the RX WTRU (e.g., WTRU 102) about whether additional retransmissions are to be expected for a specific HARQ process. The TX WTRU (e.g., WTRU 102) may provide such indication in the last reserved resource associated with a set of reserved resources in SCI. The TX WTRU (e.g., WTRU 102) may provide such indication using a field in the SCI itself, or using information at the MAC layer (e.g., the MAC header or a special MAC CE included with the transmission).

For example, the TX WTRU (e.g., WTRU 102) may indicate that no additional retransmission resources are expected in a case where (e.g., when) the PDB is exceeded. For example, the TX WTRU (e.g., WTRU 102) may indicate that no additional retransmission resources are expected in a case where (e.g., when) the maximum number of retransmissions for a PDU based on priority/CBR is exceeded. For example, the TX WTRU (e.g., WTRU 102) may indicate that additional retransmission resources are expected in a case where (e.g., when) the WTRU is unable to select a retransmission resource during resource selection, but there is at least x ms between the last reserved (re) transmission for PDU, and/or the expiry of the PDB of the PDU. For example, the TX WTRU (e.g., WTRU 102) may indicate that additional retransmission resources are expected in a case where (e.g., when) the maximum number of retransmission resources is not exceeded, the WTRU fails to select a retransmission resource for the retransmission, and/or the WTRU may decide/expect/determine to include the retransmission of the PDU in a newly selected resource/grant.

c) Resource (Re)Selection at the TX WTRU (e.g., WTRU 102) can Depend on Activity Timers Maintained by the TX WTRU (e.g., WTRU 102)

A TX WTRU (e.g., WTRU 102) can maintain a set of similar timers (HARQ RTT timer, retransmission timer, etc.) for each HARQ process associated with a given RX WTRU (e.g., WTRU 102). A TX WTRU (e.g., WTRU 102) can start/stop/reset such timers and/or set the value of such timers using the same rules defined herein for the RX WTRU (e.g., WTRU 102).

According to embodiments, a TX WTRU (e.g., WTRU 102) which performs resource (re) selection to obtain resources for retransmission of a PDU may select the resources from a period of time in which any of:
the HARQ RTT timer for the specific HARQ process is not running;
the retransmission timer for the specific HARQ process is running;
at least one of the retransmission timers for any HARQ process associated with that RX WTRU (e.g., WTRU 102) is expected to be running;
the inactivity timer associated with the RX WTRU (e.g., WTRU 102) is expected to be running; and/or
the on-duration timer associated with the RX WTRU (e.g., WTRU 102) is expected to be running.

For example, a TX WTRU (e.g., WTRU 102) may perform resource reselection for the (re) transmission resources associated with a specific HARQ process. The TX WTRU (e.g., WTRU 102) may select resources for the (re) transmission resources to be limited to the time(s) in a case where (e.g., when) any of the above timers is running associated with the RX WTRU (e.g., WTRU 102).

For example, a TX WTRU (e.g., WTRU 102) may perform resource reselection of a (re) transmission resource associated with a specific HARQ process considering pre-emption is possible. The TX WTRU (e.g., WTRU 102) may perform reselection within the set of resources associated with the retransmission timer running at the RX WTRU (e.g., WTRU 102), taking into account pre-emption.

d) Handling HARQ-based SL RLF in Presence of DRX

ACK to NACK error may result in the TX WTRU (e.g., WTRU 102) incorrectly triggering SL-RLF (Side Link-Radio Link Failure). Specifically, if the RX WTRU (e.g., WTRU 102) sends ACK and/or is interpreted as NACK by the TX WTRU (e.g., WTRU 102), the TX WTRU (e.g., WTRU 102) may perform retransmission during the times in which the retransmission timer may operate by (e.g., be assumed to be) running at the RX WTRU (e.g., WTRU 102). However, since the RX WTRU (e.g., WTRU 102) may have decoded correctly (and transmitted ACK), the retransmission timer may have been never started in this case. This may result in the DTX counter for triggering RLF being incremented incorrectly.

According to embodiments, DTX may refer to the case where the TX WTRU (e.g., WTRU 102) may not receive SL HARQ feedback from the RX WTRU (e.g., WTRU 102) following a HARQ enabled transmission, at the expect time (e.g., the PSFCH timing).

According to embodiments, the TX WTRU (e.g., WTRU 102) may disable counting of DTX in a case where (e.g., when) the RX WTRU (e.g., WTRU 102) is configured with DRX. Specifically, the TX WTRU (e.g., WTRU 102) may not count some/all HARQ DTX occurrences in a case where (e.g., when) transmitting to one or more RX WTRU (e.g., WTRU 102) s which are configured with SL DRX. The TX WTRU (e.g., WTRU 102) may disable counting, for example always, for example at certain times (e.g., only when a specific timer is not running). For example:
The TX WTRU (e.g., WTRU 102) may not count HARQ DTX for all HARQ-based transmissions in a case where (e.g., when) at least one RX WTRU (e.g., WTRU 102) is configured with SL DRX.
The TX WTRU (e.g., WTRU 102) may not count HARQ DTX for HARQ-based transmission intended to RX WTRU(s) (e.g., WTRU(s) 102) configured with SL DRX.
The TX WTRU (e.g., WTRU 102) may not count HARQ DTX for HARQ-based transmissions intended to one or more RX WTRU(s) (e.g., WTRU(s) 102) configured with SL DRX in a case where (e.g., when) the corresponding transmission (for which DTX was observed) was performed in a case where (e.g., when) any of the following:
The on-duration timer associated with the RX WTRU (e.g., WTRU 102) was not running.
The inactivity timer associated with the RX WTRU (e.g., WTRU 102) was not running.
The HARQ RTT associated with the RX WTRU (e.g., WTRU 102) was started/not started.
The TX WTRU (e.g., WTRU 102) may not count HARQ DTX following the first HARQ DTX received by the TX WTRU (e.g., WTRU 102), for example associated with one or more of the other conditions in the previous example.

According to embodiments, the TX WTRU (e.g., WTRU 102) may perform a limited number of retransmissions (for example associated with the same transport block (TB)), where such maximum number of retransmissions is (pre) configured by the NW to the WTRU to be used specifically for transmission to an RX WTRU (e.g., WTRU 102) in DRX. Specifically, such maximum number of retransmissions may be configured differently than a maximum number of retransmissions configured for other purposes. A TX WTRU (e.g., WTRU 102) may also derive the maximum number of retransmissions from the maximum number of HARQ DTX to trigger SL RLF. For example, the TX WTRU (e.g., WTRU 102) may use a (for example configured) percentage of the configured max HARQ DRX to derive the maximum number of retransmissions. The maximum number of retransmissions performed by the TX WTRU (e.g., WTRU 102) for a TB (to avoid possible false SL RLF) may further be limited to retransmissions occurring (e.g., only) in a case where (e.g., when) on duration timer and/or inactivity timer are not running for the RX WTRU (e.g., WTRU 102).

According to embodiments, which can be combined with the previous solution(s), the TX WTRU (e.g., WTRU 102) may adapt its transmission time for a TB following one or more HARQ based transmissions which result in DTX. Specifically, the TX WTRU (e.g., WTRU 102) may stop retransmissions, for example associated with a specific TB, after one or more (or a (pre) configured) number of failed (re) transmissions which generate HARQ DTX, and/or HARQ NACK. The TX WTRU (e.g., WTRU 102) may resume such retransmissions at one or any of the following times:

The on-duration timer for the RX WTRU (e.g., WTRU 102) is running.
The inactivity timer for the RX WTRU (e.g., WTRU 102) is running.
The retransmission timer for the RX WTRU (e.g., WTRU 102) is running (for example associated with another HARQ process), and/or for example the RX WTRU (e.g., WTRU 102) has transmitted HARQ feedback (ACK or NACK) successfully.

According to embodiments, the TX WTRU (e.g., WTRU 102) may be configured by the NW with different thresholds/conditions (e.g., maximum number of consecutive HARQ DTX) for triggering SL RLF to be used for transmissions with one or more RX WTRU (e.g., WTRU 102) configured with SL DRX. Specifically, the TX WTRU (e.g., WTRU 102) may receive two configurations of maximum number of consecutive HARQ RTX for triggering SL RLF. The TX WTRU (e.g., WTRU 102) may use a first configuration in a case where (e.g., when) it performs transmissions to one or more RX WTRU (e.g., WTRU 102) which are not configured with SL DRX, and/or may use a second configuration in a case where (e.g., when) it performs transmissions in which at least one or a number of RX WTRU (e.g., WTRU 102) s are configured with SL DRX.

1.5 Example Embodiments at the RX WTRU (e.g., WTRU 102)

FIG. 4A to 4C illustrates a timing diagrams for the HARQ RTT timer and/or retransmission timer (e.g., ReTx Timer) for the scenario of a (e.g., resource allocation) mode 2 TX WTRU (e.g., WTRU 102). Referring to FIG. 4A to 4C an initial transmission TR0 (e.g., associated with a SCI), is performed with an indication of two SCI retransmissions (e.g., associated with the SCI) (a first retransmission TR1, and/or a second retransmission TR2). Specifically:

Referring to FIG. 4A, in case 1, pre-emption may be disabled, and/or the TX WTRU (e.g., WTRU 102) may not skip the SCI associated with the first retransmission TR1. The HARQ RTT timer may be set to the time until the next retransmission resource TR2. The retransmission timer (e.g., ReTx Timer) may be started (e.g., only) following the last planned retransmission. The TX WTRU (e.g., WTRU 102) may perform resource selection for a new SCI transmission associated with the same HARQ process within the time of this retransmission timer.

Referring to FIG. 4B, in case 2, pre-emption may be disabled, and/or the TX WTRU (e.g., WTRU 102) may skip the SCI associated with the first retransmission TR1 due to UL/SL prioritization. Alternatively, the TX WTRU (e.g., WTRU 102) may have pre-emption enabled, but may ensure that reselection of the retransmission resources for preemption occurs after the planned retransmission resource (as discussed herein on restricting the retransmission resources for preemption). The RX WTRU (e.g., WTRU 102) may start the retransmission timer (e.g., ReTx Timer) following the location of this planned (and unreceived) retransmission TR1 (or following expiry of the HARQ RTT timer set based on the timing of the retransmission resource in SCI). The TX WTRU (e.g., WTRU 102) can perform resource reselection for transmission of the first retransmission TR1 resource within the time associated with the retransmission timer (e.g., ReTx Timer). The retransmission timer (e.g., ReTx Timer) may be started following the last planned retransmission TR2. The TX WTRU (e.g., WTRU 102) may perform resource selection for a new SCI transmission associated with the same HARQ process within the time of this retransmission timer (e.g., ReTx Timer).

Referring to FIG. 4C, in case 3, pre-emption may be enabled, and/or the TX WTRU (e.g., WTRU 102) may skip the SCI associated with the first retransmission TR1 due to pre-emption (without any restrictions, which may mean reselected retransmission resource may occur before the planned timing of the retransmission based on the information in the SCI). The TX WTRU (e.g., WTRU 102) may set the HARQ RTT timer to a value less than the next planned retransmission TR2 resource, and/or the retransmission timer (e.g., ReTx Timer) may be started (e.g., immediately) following this. The TX WTRU (e.g., WTRU 102) reselection window associated with pre-emption is determined based on the retransmission timer (e.g., ReTx Timer).

a) HARQ RTT and/or Retransmission Timer Handling for HARQ Feedback Enabled

In a first example embodiment of handling the HARQ RTT timer and/or retransmission timer, the RX WTRU (e.g., WTRU 102) may be first informed of the resource allocation mode (mode 1 or mode 2), or a similar indication from the TX WTRU (e.g., WTRU 102) which may determine the timer handling behavior at the RX WTRU (e.g., WTRU 102), from a TX WTRU (e.g., WTRU 102) in PC5-RRC signaling. The RX WTRU (e.g., WTRU 102), after (e.g., upon) reception of a first SCI with an unoccupied HARQ process number or indicating that the first SCI represents an initial transmission, may assign a reception HARQ process to the new transmission/PDU. The RX WTRU (e.g., WTRU 102) may determine that HARQ feedback is enabled, which results in using the behavior associated with this embodiment. The RX WTRU (e.g., WTRU 102) may store the location/timing of the initial transmission and/or possible retransmissions indicated in the first SCI representing the initial transmission.

The RX WTRU (e.g., WTRU 102), following decoding (successful or not successful) of the initial transmission, may transmit PSFCH with HARQ feedback. The RX WTRU (e.g., WTRU 102) may start the HARQ RTT timer at the first symbol/slot following transmission of PSFCH. The RX WTRU (e.g., WTRU 102) may start the HARQ RTT timer at the first symbol/slot following a PSFCH that is skipped and/or meant for transmission of the HARQ feedback if the RX WTRU (e.g., WTRU 102) prioritizes UL transmission over SL transmission and/or skips PSFCH as a result.

Figure 5:
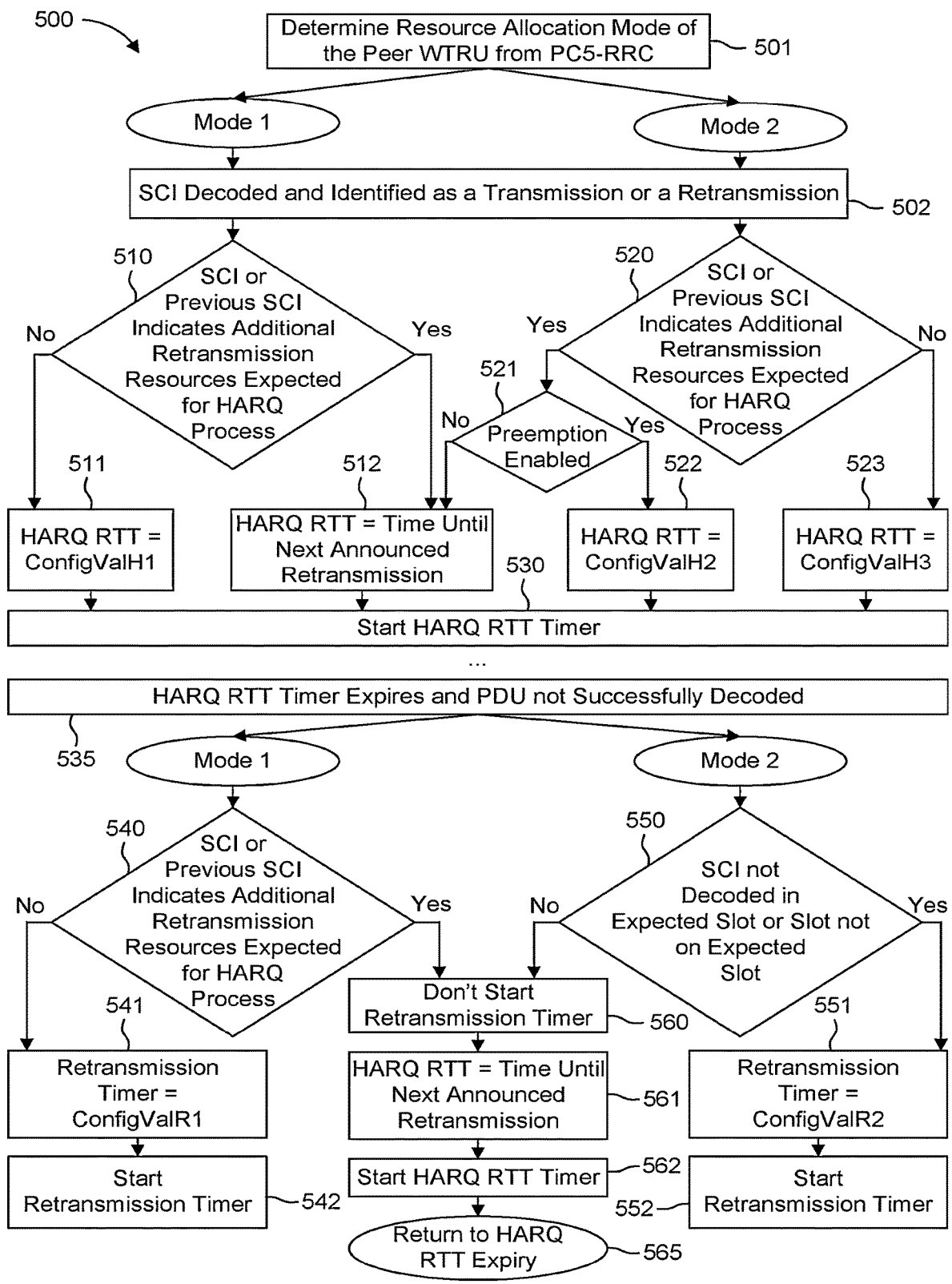
FIG. 5 is a flow diagram for a procedure involving determining a sidelink monitoring time for a WTRU.

FIG. 5 depicts an overall method 500 of handling/configuring the HARQ RTT timer and/or retransmission timer. At step 501, the RX WTRU (e.g., WTRU 102) may determine a resource allocation mode of the peer (e.g., TX) WTRU (e.g., WTRU 102) from PC5-RRC. At step 502, the RX WTRU (e.g., WTRU 102), after (e.g., upon) reception of a first SCI, may decode the first SCI and/or determine that the first SCI represents an initial transmission or a retransmission. At steps 510 and/or 520, the RX WTRU (e.g., WTRU 102) may determine if there are additional retransmission resource reserved for the HARQ process from an SCI.

The RX WTRU (e.g., WTRU 102) may set the HARQ RTT timer as follows:

If resource allocation mode is mode 1 (or the TX WTRU (e.g., WTRU 102) indication indicates to use such HARQ behavior):
  At step 512, if there are additional retransmission resource reserved for the HARQ process from an SCI, the RX WTRU (e.g., WTRU 102) may set the HARQ RTT to the time until the next retransmission resource for the HARQ process indicated in SCI.
  As a variant to this embodiment, the RX WTRU (e.g., WTRU 102) may not start the HARQ RTT timer. Instead, the RX WTRU (e.g., WTRU 102) may rely on determining whether or not to start the retransmission timer at the time of the next retransmission resource. In such variant, (e.g., it may be assumed that) the active time may be associated with the timing of the retransmission resources and/or the retransmission timer running.
  At step 511, if there are no additional retransmission resources reserved for the HARQ process from an SCI, the RX WTRU (e.g., WTRU 102) may set the HARQ RTT to a (pre) configured (from the NW or other WTRU) or predefined value (also referred as "ConfigValH1"), where such value is associated with mode 1.
    Additionally, the RX WTRU (e.g., WTRU 102) may further select a specific HARQ RTT timer for mode 1 associated with the specific mode 1 case being considered, for example from a list of (pre) configured values, for example provided by the TX WTRU (e.g., WTRU 102), based on additional information provided by the TX WTRU (e.g., WTRU 102) of the mode 1 case being considered, such as:
      Whether the TX WTRU (e.g., WTRU 102) has PUCCH resources configured or not.
      Whether the TX WTRU (e.g., WTRU 102) reports (e.g., transmits information indicating) HARQ feedback to the network.
    In a variant to this embodiment, the RX WTRU (e.g., WTRU 102) may not start the HARQ RTT timer at all, and/or may immediately start the retransmission timer at this time, or some (pre) configured or predefined time after this time.

If the resource allocation mode is mode 2:
  At step 521, if there is an additional retransmission resource reserved for the HARQ process from an SCI, the RX WTRU (e.g., WTRU 102) may set the HARQ RTT timer to a (pre) configured (from NW or other (e.g., RX) WTRU (e.g., WTRU 102) or predefined value associated with mode 2 resource reselection based on pre-emption (also referred as "ConfigValH2"). Such timer may further depend on the priority/CBR. Such timer may further depend on the priority/CBR. The (e.g., RX) WTRU (e.g., WTRU 102) may do so if pre-emption is enabled, at step 522. Alternatively, if pre-emption is disabled, the (e.g., RX) WTRU (e.g., WTRU 102) may set the HARQ RTT timer to the time until the next planned retransmission (step 512).
  At step 523, if there are no additional retransmissions expected for the HARQ process, the (e.g., RX) WTRU (e.g., WTRU 102) may set the HARQ RTT timer to a (pre) configured (from the NW or other WTRU) or predefined value associated with mode 2 resource selection based on selection of a new resource (also referred as "ConfigValH3").

At step 530, the RX WTRU (e.g., WTRU 102) may start/run the HARQ RTT timer.

Following expiry of the HARQ RTT timer, at step 535, the RX WTRU (e.g., WTRU 102) may determine if the PDU for the HARQ process was successfully decoded. At step 540, the RX WTRU (e.g., WTRU 102) may determine if the last received transmission of the HARQ process was not associated with the last retransmission resource in an indicated SCI for the HARQ process.

According to embodiments, the RX WTRU (e.g., WTRU 102) may perform the following related to the retransmission timer:

If the resource allocation mode is mode 1:
  At step 542, if the last received transmission of the HARQ process was associated with the last retransmission resource in an indicated SCI for that HARQ process, and/or the PDU for the HARQ process was not successfully decoded, the RX WTRU (e.g., WTRU 102) may start the retransmission timer and/or set it to a (pre) configured value (also referred as "ConfigValR1") associated with mode 1 retransmissions in a new SCI (step 541).
  At step 560, if the last received transmission of the HARQ process was not associated with the last retransmission resource in an indicated SCI for the HARQ process (e.g., mode retransmissions to come), the (e.g., RX) WTRU (e.g., WTRU 102) may not start the retransmission timer. At step 561, the (e.g., RX) WTRU (e.g., WTRU 102) may further set the HARQ RTT time, for example, at the time of the next retransmission resource, and/or start the HARQ RTT timer (step 562).

If the resource allocation mode is mode 2:
  At step 550, the (e.g., RX) WTRU (e.g., WTRU 102) may first determine whether the slot in which the HARQ RTT timer expires is associated with a reserved resource of not.
    If it is, and/or the SCI is not successfully decoded in the slot, the RX WTRU (e.g., WTRU 102) may start the retransmission timer if the PDU associated with the HARQ process is not successfully decoded. If it is and/or the SCI is successfully decoded, at step 560, the RX WTRU (e.g., WTRU 102) may not start the retransmission timer in this case, and/or continue to normal decoding of a (re) transmission associated with the HARQ process. At step 561, the (e.g., RX) WTRU (e.g., WTRU 102) may further set the HARQ RTT time, for example, at the time of the next retransmission resource, and/or start the HARQ RTT timer (step 562).

At step 550, if the slot is not associated with a reserved resource in an SCI, and/or the (e.g., RX) WTRU (e.g., WTRU 102) has not successfully decoded the PDU associated with the HARQ process, the RX WTRU (e.g., WTRU 102) may start the HARQ retransmission timer, at step 552, and/or set it to a (pre) configured or specified value (also referred as "ConfigValR2") at step 551.

Different values of the retransmission timer may be used by the (e.g., RX) WTRU (e.g., WTRU 102) for the different cases.

Alternatively, for the case/alternative where the HARQ RTT timer is not started above (e.g., mode 1 and/or additional retransmissions, or mode 2 and/or pre-emption disabled) the RX WTRU (e.g., WTRU 102) may separately consider the expiry of the HARQ RTT timer (step 565) and/or the slot associated to decoding of a retransmission resource indicated with a previous SCI. Specifically:

If the PDU associated with a HARQ process is not successfully decoded, the RX WTRU (e.g., WTRU 102) monitors SCI at all resources associated with retransmissions indicated in a previous SCI for that HARQ process. At a time instance associated with a retransmission resource for a non-decoded PDU, the RX WTRU (e.g., WTRU 102) starts a retransmission timer if the SCI is not decoded (for example also if the TX WTRU (e.g., WTRU 102) is in mode 2). Otherwise the RX WTRU (e.g., WTRU 102) does not start the retransmission timer.

If the HARQ RTT timer expires and/or the PDU for the HARQ process is not successfully decoded, start the retransmission timer for the HARQ process The RX WTRU (e.g., WTRU 102) may monitor SL as long as one of the following:

one or more on duration timer, inactivity timer, or retransmission timer at the RX WTRU (e.g., WTRU 102) is running; and/or the time slot is associated with a reserved retransmission resource associated with a HARQ process for which the PDU associated with the HARQ process has not been decoded.

b) HARQ RTT and/or Retransmission Timer Handling for HARQ Feedback Disabled

In a second example embodiment of handling the HARQ RTT timer and/or retransmission timer, the RX WTRU (e.g., WTRU 102) may be first informed of the resource allocation mode (mode 1 or mode 2) from a TX WTRU (e.g., WTRU 102) in PC5-RRC signaling. The RX WTRU (e.g., WTRU 102), after (e.g., upon) reception of a first SCI with an unoccupied HARQ process number or indicating that the first SCI represents an initial transmission, may assign a reception HARQ process to the new transmission/PDU. The RX WTRU (e.g., WTRU 102) may determine that HARQ feedback is disabled from the SCI, which results in using the behavior associated with this embodiment. Specifically, the RX WTRU (e.g., WTRU 102) may be configured with a different set of (pre) configured or specified timers for the HARQ process in a case where (e.g., when) HARQ feedback is disabled (compared to the previous embodiment where HARQ feedback is enabled). The RX WTRU (e.g., WTRU 102) may store the location/timing of the initial transmission and/or possible retransmissions indicated in the first SCI representing the initial transmission.

The RX WTRU (e.g., WTRU 102), after (e.g., upon) reception of SCI with HARQ feedback disabled, may start the HARQ RTT timer immediately at reception of the SCI.

The RX WTRU (e.g., WTRU 102) may set the HARQ RTT timer similar to the previous embodiment, except that a different set of (pre) configured timers may be used.

The RX WTRU (e.g., WTRU 102) may set the retransmission timer similar to the previous embodiment, for example with the exception that different (pre) configured timer values may be used.

The RX WTRU (e.g., WTRU 102) may monitor SL as long as one of the following:

one or more on duration timer, inactivity timer, or retransmission timer at the RX WTRU (e.g., WTRU 102) is running; and/or the time slot is associated with a reserved retransmission resource associated with a HARQ process for which the PDU associated with the HARQ process has not been decoded.

2. Methods for Defining the Active Time Relative to Initial Transmissions (Inactivity Timer)

2.1 Modeling the Inactivity Timer for Unicast

The described embodiments may be defined for example for unicast, but may be applicable also for groupcast and/or broadcast.

a) Conditions for Starting/Using an Inactivity Timer

According to embodiments, a WTRU (TX WTRU (e.g., WTRU 102) or RX WTRU (e.g., WTRU 102)) can be configured to start/use an inactivity timer based on certain conditions. Such conditions may be related to any or a combination (and/or) of the following:

HARQ feedback enabled

For example, a RX WTRU (e.g., WTRU 102) may start an inactivity timer if the transmission/retransmission received is associated with HARQ enabled transmissions. Otherwise, if HARQ disabled transmission/retransmission is received, the RX WTRU (e.g., WTRU 102) may not start the inactivity timer.

For example, a TX WTRU (e.g., WTRU 102) may start an inactivity timer if a transmission performed by the (e.g., RX) WTRU (e.g., WTRU 102) indicates HARQ enabled. Otherwise, if the transmission indicates HARQ disabled, the TX WTRU (e.g., WTRU 102) may not start the inactivity timer CR/CBR at the RX WTRU (e.g., WTRU 102)

For example, the RX WTRU (e.g., WTRU 102) may send a measure of the CR/CBR at the RX WTRU (e.g., WTRU 102) to the TX WTRU (e.g., WTRU 102). The RX WTRU (e.g., WTRU 102) may send such measure in a case where (e.g., when) it changes from one range to another, or in a case where (e.g., when) it changes by a certain amount.

For example, if the CR/CBR is below a threshold, the RX WTRU (e.g., WTRU 102) may start the inactivity timer after (e.g., upon) reception of a new transmission or retransmission. Otherwise, the RX WTRU (e.g., WTRU 102) may not start/restart the inactivity timer.

For example, if the CR/CBR indicated by the RX WTRU (e.g., WTRU 102) is below a threshold, the TX WTRU (e.g., WTRU 102) may start the inactivity timer for a transmission. Otherwise, the TX WTRU (e.g., WTRU 102) may not start/restart the inactivity timer.

b) Use of the Inactivity Timer at the TX WTRU (e.g., WTRU 102)

According to embodiments, a TX WTRU (e.g., WTRU 102) may maintain an inactivity timer associated with the RX WTRU(s) (e.g., WTRU(s) 102) it is transmitting to, if such RX WTRU (e.g., WTRU 102) s are configured in DRX. A TX WTRU (e.g., WTRU 102) may use the inactivity timer (in addition to other timers such as on duration timer or retransmission timer) to determine whether it can perform a new transmission and/or a retransmission to that specific RX WTRU(s) (e.g., WTRU(s) 102). For example, a TX WTRU (e.g., WTRU 102) may (e.g., only) perform a new transmission and/or a retransmission to a RX WTRU (e.g., WTRU 102) in a case where (e.g., when) one of the inactivity timer, on duration timer, or retransmission timer(s) are running.

c) Starting of the Inactivity Timer by the TX WTRU (e.g., WTRU 102) May be Done at Different Times According to embodiments, a TX WTRU (e.g., WTRU 102) may start an inactivity timer to any of the following times:
After (e.g., upon) initial transmission of a new TB (e.g., resource):
For example, the TX WTRU (e.g., WTRU 102) may start the inactivity timer in the first slot after the transmission of the SCI associated with the new transmission.
For example, the TX WTRU (e.g., WTRU 102) may start the inactivity timer in the first slot following a (pre) configured number of slots after the transmission of the SCI associated with the new transmission.
After (e.g., upon) reception of HARQ feedback, where such may further depend on the type of HARQ feedback:
For example, if the TX WTRU (e.g., WTRU 102) receives HARQ ACK or NACK, the TX WTRU (e.g., WTRU 102) may start the inactivity timer. However, of the TX WTRU (e.g., WTRU 102) decodes DTX on a PSFCH resource, the TX WTRU (e.g., WTRU 102) may not start the inactivity timer.
For example, if the TX WTRU (e.g., WTRU 102) receives HARQ ACK the TX WTRU (e.g., WTRU 102) may start the inactivity timer. However, of the TX WTRU (e.g., WTRU 102) decodes DTX or NACK on a PSFCH resource, the TX WTRU (e.g., WTRU 102) may not start the inactivity timer.
After the last indicated retransmission of a new TB in the SCI:
For example, the TX WTRU (e.g., WTRU 102) may start the inactivity timer in the first slot after the transmission of the SCI associated with the last retransmission indicated in a previous SCI.
For example, the TX WTRU (e.g., WTRU 102) may start the inactivity timer a number of (pre) configured slots after the transmission of the SCI associated with the last retransmission indicated in a previous SCI.
After the Nth indicated retransmission of a new TB in the SCI, where N may be (pre) configured or predefined:
N may further depend on QoS (e.g., priority) for example.
According to embodiments, a TX WTRU (e.g., WTRU 102) may start an inactivity timer at different times (any of the times indicated above) depending on any of the specific factors:
Whether HARQ feedback is enabled/disabled in the new transmission that should start the inactivity timer.
Depending on the CBR/CR measured and/or reported by the RX WTRU (e.g., WTRU 102).
QoS (e.g., priority) of the transmission.
For example, the TX WTRU (e.g., WTRU 102) may start the inactivity timer in a case where (e.g., when) it receives HARQ ACK or NACK in a case where (e.g., when) HARQ feedback is enabled for a transmission, but it may start the inactivity timer following an initial transmission of the TB if HARQ feedback is not enabled.

d) TX WTRU (e.g., WTRU 102) Determines the Duration of the Inactivity Timer to be Used According to embodiments, the inactivity timer started by the TX WTRU (e.g., WTRU 102) may have the same value as the value configured at the RX WTRU (e.g., WTRU 102). According to embodiments, the inactivity timer started by the TX WTRU (e.g., WTRU 102) may have a value which is shorter than the value configured at the RX WTRU (e.g., WTRU 102). For example, the TX WTRU (e.g., WTRU 102) may be (pre) configured with a different inactivity timer to use. According to embodiments, the TX WTRU (e.g., WTRU 102) may shorten the configured inactivity timer used at the RX WTRU (e.g., WTRU 102) to take into account different starting times for the inactivity timer. Specifically, if the TX WTRU (e.g., WTRU 102) starts the inactivity timer after (e.g., upon) reception of HARQ feedback:
The TX WTRU (e.g., WTRU 102) may shorten the inactivity timer (compared to the value used at the RX WTRU (e.g., WTRU 102)) by the time between the initial transmission (or the (e.g., assumed) start time relative to the initial transmission received at the RX WTRU (e.g., WTRU 102) and/or the first ACK or NACK received by the TX WTRU (e.g., WTRU 102) to a transmission/retransmission of that TB (or any other TB).

e) RX WTRU (e.g., WTRU 102) Configured with a Single Inactivity Timer, or Multiple Inactivity Timers for Each Peer (e.g., TX) WTRU (e.g., WTRU 102)/L2 ID Different embodiments are possible for maintenance of the inactivity timer at the RX WTRU (e.g., WTRU 102) in the presence of multiple unicast links and/or multiple interested L2 destination IDs corresponding to unicast/groupcast.
According to embodiments, a WTRU (e.g., TX WTRU (e.g., WTRU 102) or RX WTRU (e.g., WTRU 102) may maintain an inactivity timer for each ID or set of IDs, such as a WTRU ID, logical channel (LCH) ID, L2 ID, etc. For example, a WTRU may maintain an inactivity timer for each unicast link (pair of source/destination L2 IDs) and/or interested L2 IDs for groupcast/broadcast. A WTRU (e.g., TX WTRU (e.g., WTRU 102) or RX WTRU (e.g., WTRU 102)) may set/reset the inactivity timer associated to the source/destination L2 ID whenever the WTRU receives a transmission associated with the source/destination L2 ID.

According to embodiments, a WTRU (e.g., TX WTRU (e.g., WTRU 102) or RX WTRU (e.g., WTRU 102) may maintain a single inactivity timer for all unicast link (pair of source/destination IDs), and/or for example for all L2 IDs associated with groupcast/broadcast communications. Specifically, a WTRU (e.g., TX WTRU (e.g., WTRU 102) or RX WTRU (e.g., WTRU 102) may set/reset an inactivity timer after (e.g., upon) reception of any sidelink transmission. To account for different DRX configuration for example associated with the different unicast links and/or groupcast L2 source/destination IDs, the WTRU may:

set the value of the inactivity timer (in a case where (e.g., when) the inactivity timer is set/reset) to a different value depending on which L2 source/destination ID the transmission (which caused the timer to be reset) was received;
    specifically, a WTRU (e.g., TX WTRU (e.g., WTRU 102) or RX WTRU (e.g., WTRU 102)) may be (pre) configured with different values of the inactivity timer for each source/destination L2 ID (e.g., via any of PC5-RRC, Uu RRC, preconfiguration, SIB, etc.). After (e.g., upon) reception of a transmission associated with a specific source/destination L2, the RX WTRU (e.g., WTRU 102) may set the value of the inactivity timer to the value configured for that source/destination L2 ID; and/or
determine the behavior during decoding of the inactivity timer differently based on the source/destination L2 ID whose transmission started the inactivity timer, which could include any of the following:
    monitor a different set of SL resources;
    use a different rule/priority for determining whether to monitor SL or UL; and/or
    determine whether a transmission can be performed or not during the running of the timer.

The embodiments described herein, related to inactivity timer may be applicable to either of the above embodiments.

f) RX/TX WTRU (e.g., WTRU 102) Handle the Uncertainty of MAC PDU Decoding for Starting the Inactivity Timer Inactivity timer is typically restarted (e.g., only) for a new transmission, while retransmissions are handled by the HARQ RTT/Retransmission timers (as in Uu). However, determining a whether a transmission is associated with a new transmission may require/use decoding of the MAC PDU (which has some variable latency associated to such).

DRX-related timers (e.g., the inactivity timer, HARQ RTT timers, or retransmission timers) may be started after (e.g., upon) reception of SCI, and/or whether such timer is started may be conditioned on information carried (e.g., only) in the SCI (e.g., HARQ process ID, new data indicator (NDI), L1 ID). Alternatively, such timers may be started after (e.g., upon) decoding of the MAC PDU, and/or conditioned on information in the MAC PDU (e.g., L2 IDs, LCH ID). Alternatively, the starting of such timers may be conditioned on information in both the MAC PDU and/or the SCI, but the timer may represent the time elapsed following the reception of the SCI. A WTRU (e.g., TX WTRU (e.g., WTRU 102) or RX WTRU (e.g., WTRU 102)) may furthermore have a different behavior for different timers.

g) RX WTRU (e.g., WTRU 102) Starts the Inactivity Timer at the PHY Layer and/or May Stop it After Decoding PDU According to embodiments, a RX WTRU (e.g., WTRU 102) may start the inactivity timer based on conditions related to decoding SCI at the PHY layer. Following the start of the inactivity timer by the PHY layer, the MAC layer may perform MAC PDU decoding, and/or may stop the inactivity timer, or continue to run the inactivity timer depending on the decoding results. For example:

The (e.g., RX) WTRU (e.g., WTRU 102) (PHY layer) may start the inactivity timer in a case where (e.g., when) it receives SCI where any of the following are satisfied:
    The received transmission corresponds to a unicast transmission and/or the source and/or destination L1 IDs match the source/destination L1 IDs of a currently configured unicast link at the WTRU.
    The received transmission corresponds to a groupcast transmission and/or the L1 destination ID in the SCI matches the L1 destination ID of any interested groupcast/broadcast service.
    The NDI (in the SCI) is toggled and/or the HARQ process (in the SCI) is associated with a currently allocated HARQ process (e.g., a new transmission is being indicated for this HARQ process).
    The HARQ in the SCI is not currently allocated at the WTRU (indicating a new transmission for a new HARQ process).
    The received transmission corresponds to a new transmission (e.g., NDI is toggled).
    The received transmission corresponds to a retransmission (e.g., NDI not toggled), but the RX WTRU (e.g., WTRU 102) did not receive/decode the initial transmission associated with this retransmission.
The (e.g., RX) WTRU (e.g., WTRU 102) (MAC layer) may stop the inactivity timer if any of the following occurs:
    The PDU is associated with unicast and/or the L2 source/destination ID obtained by decoding the MAC PDU does not match the L2 source/destination ID of any established unicast link at the WTRU.
    The PDU is associated with broadcast/groupcast and/or the L2 destination ID obtained by decoding the MAC PDU does not match the L2 destination ID of any established unicast link at the WTRU.
    The MAC layer is unable to decode the MAC PDU.
    The MAC layer decodes the MAC PDU, but the MAC PDU contains (e.g., only) a CSI report MAC CE
    The PDU corresponds to the SCI which started the inactivity timer to begin with (e.g., the inactivity timer was not running at the time in a case where (e.g., when) the PHY layer started the inactivity timer).
    The inactivity timer was not (re) started by another PDU while decoding of the current PDU was ongoing.

For example, the RX WTRU (e.g., WTRU 102) may stop the inactivity timer at decoding of a PDU in a case where (e.g., when) the L2 source/destination ID in the MAC header does not match any of the interested source/destination ID at the WTRU, and/or the inactivity timer is running because it was started (and not restarted) by reception of the SCI corresponding to this PDU. Specifically, the RX WTRU (e.g., WTRU 102) may stop the inactivity timer in a case where (e.g., when) the L2 source/destination ID in the MAC header does not match any of the interested source/destination ID at the WTRU and/or the inactivity timer had not previously been running in a case where (e.g., when) it was started by reception of the PDU. For example, the RX WTRU (e.g., WTRU 102) may stop the inactivity timer at decoding of a PDU in a case where (e.g., when) the L2 source/destination ID in the MAC header does not match any of the interested source/destination ID at the WTRU, and/or the inactivity timer has not been (re) started between the time it was started by the PDU currently being decoded, and/or the time in which the WTRU determines that the L2 source/destination ID in the MAC header does not match any of the interested source/destination ID at the WTRU.

According to embodiments, the TX WTRU (e.g., WTRU 102) may start its own inactivity timer (associated with the RX WTRU (e.g., WTRU 102) at the first slot following transmission of SCI. In particular, a TX WTRU (e.g., WTRU 102) may transmit a first new TB to a (E.G., RX) WTRU at timeslot N, and/or may be allowed to transmit a second new TB to the same (E.G., RX) WTRU already at timeslot N+1. Specifically, the TX WTRU (e.g., WTRU 102) may not place any restrictions on the inter-transmission times of two new transmissions, particularly in the case where the first transmission occurs at the end of the on duration, or at the end of the duration associated with a previous inactivity timer.

h) Multiple Concurrent Inactivity Timers May be Run/Stopped for Each New Transmission while Determining Whether Successful Decoding According to embodiments, which may be used in addition to another embodiment, the (e.g., RX) WTRU (e.g., WTRU 102) (PHY layer) may start multiple concurrent inactivity timers, one for each new transmission identified by the WTRU based on SCI decoding (e.g., only) (e.g., HARQ process, L1 ID, NDI). Following the start of each such timer, the MAC layer may stop the corresponding timer in a case where (e.g., when) any of the conditions associated with the stopping the timer in the previous solution are satisfied. For example, a (e.g., RX) WTRU (e.g., WTRU 102) may behave according to any or a combination (and/or) of the following example:
  Start a first inactivity timer in a case where (e.g., when) receiving SCI associated with a new transmission. Such new transmission may not be successfully decoded by the MAC layer. The first inactivity timer may be kept running following the failed MAC decoding.
  Start a second inactivity timer in a case where (e.g., when) receiving an SCI associated with a different new transmission. Such new transmission may not be successfully decoded by the MAC layer. The first inactivity timer may be kept running following the failed MAC decoding.
  Following reception of SCI for the same HARQ process as the first new transmission, the MAC PDU may be successfully decoded, but the L2 IDs may not match the expected L2 IDs at the WTRU. The (e.g., RX) WTRU (e.g., WTRU 102) (MAC) may stop the inactivity timer associated with the first new transmission but keep the inactivity timer associated with the second retransmission.
  Following reception of SCI for the same HARQ process as the second new transmission, the MAC PDU may be successfully decoded, and/or the (e.g., RX) WTRU (e.g., WTRU 102) may repeat the same procedure for determining whether to stop or continue the inactivity timer associated with the second new transmission.

A RX WTRU (e.g., WTRU 102) may be active with respect to sidelink monitoring as long as at least any of the inactivity timers (the first inactivity timer or the second inactivity timer is running).

i) RX WTRU (e.g., WTRU 102) Starts the Inactivity Timer at the MAC Layer but May Compensate for Decoding Delay According to embodiments, a RX WTRU (e.g., WTRU 102) may start the inactivity timer based on conditions related to decoding SCI and/or conditions related to decoding the MAC PDU.

For example, the RX WTRU (e.g., WTRU 102) may start the inactivity timer if any of the conditions associated with the SCI (described in other embodiments) are satisfied, the PDU is successfully decoded, and/or also conditions associated with the decoded MAC PDU are satisfied. Conditions associated with the decoded MAC PDU may comprise any or a combination (and/or) of the following:
  The PDU is associated with unicast and/or the L2 source/destination ID obtained by decoding the MAC PDU matches the L2 source/destination ID of any established unicast link at the WTRU.
  The PDU is associated with broadcast/groupcast and/or the L2 destination ID obtained by decoding the MAC PDU matches the L2 destination ID of any established unicast link at the WTRU.
  The MAC layer decodes the MAC PDU, and/or the MAC PDU does not contain (e.g., only) a CSI report MAC CE (e.g., there is at least one LCH in the MAC PDU associated with data).

For example, the RX WTRU (e.g., WTRU 102) may start the inactivity timer (e.g., only) following successful decoding of the MAC PDU, which may occur following multiple retransmissions associated with that MAC PDU. The RX WTRU (e.g., WTRU 102) may start the inactivity timer at any of the following time instants:
  Transmission of HARQ ACK on PSFCH in a case where (e.g., when) the conditions defined above indicate a successfully decoded new transmission.
  A number of symbols/slots (e.g., (pre) configured or predefined) following the reception of SCI associated with the transmission/retransmission in which the new transmission was successfully decoded by the MAC layer.
  The number of symbols/slots may be zero. In such case, the MAC layer may start the timer and/or compensate for (e.g., add the value of the time elapsed) the time between SCI reception and/or MAC PDU decoding.
  Time instance of SCI reception may be indicated by the PHY layer to the MAC layer.
  A number of symbols/slots (e.g., (pre) configured or predefined) following the last retransmission resource used by the TX WTRU (e.g., WTRU 102) to transmit the PDU or reserved as a retransmission resource in the SCI used to transmit the initial transmission.

According to embodiments, the TX WTRU (e.g., WTRU 102) may start its own inactivity timer (associated with the RX WTRU (e.g., WTRU 102) at any of the following time:
  at the reception of HARQ ACK following new transmission, if HARQ feedback is enabled;
  a number of slots (e.g., (pre) configured or predefined) following the first transmission by the TX WTRU (e.g., WTRU 102) of PDU; and/or
  a number of slots (e.g., (pre) configured or predefined) following the last retransmission resource used by the TX WTRU (e.g., WTRU 102) to transmit the PDU or reserved as a retransmission resource in the SCI used to transmit the initial transmission.

Specifically, if the on-duration timer is no longer running following the initial transmission of a PDU by the TX WTRU (e.g., WTRU 102), the TX WTRU (e.g., WTRU 102) may delay transmission of other PDUs to a time instant associated with a retransmission resource for the PDU, or indication of HARQ ACK associated with the new transmission.

2.2 Maintenance of Inactivity Timer at the RX and/or TX WTRU (e.g., WTRU 102)s Applicable to Groupcast The described embodiments may be defined for example for groupcast but may be applicable also for unicast and/or broadcast.

a) RX/TX WTRU (e.g., WTRU 102) Start/Use Inactivity Timer (e.g., Only) Based on Certain Related to Groupcast According to embodiments, an RX and/or TX WTRU (e.g., WTRU 102) in groupcast may start/assume/use an inactivity timer associated with DRX (e.g., only) in certain conditions. Specifically, a TX WTRU (e.g., WTRU 102) may maintain an inactivity timer associated with transmissions any of the following conditions are met:
  Conditions based on cast type:
    For example, the TX/RX WTRU (e.g., WTRU 102) may start/use an inactivity timer (e.g., only) for transmission associated with a specific case (e.g., unicast (e.g., only) or unicast and/or groupcast).
    For example, the TX/RX WTRU (e.g., WTRU 102) may combine other conditions with (e.g., only) certain cast types:
      For example, the TX/RX WTRU (e.g., WTRU 102) may start/use an inactivity timer for unicast, or for groupcast as long as the groupcast transmissions are associated with a type of HARQ feedback for groupcast as below.
  Conditions based on QoS:
    For example, the TX/RX WTRU (e.g., WTRU 102) may start/use an inactivity timer (e.g., only) for transmissions in which the priority of the transmission is below a threshold.
  Conditions based on whether HARQ is enabled/disabled, and/or what type of HARQ feedback reporting for groupcast (ACK/NACK reporting or NACK (e.g., only)) is enabled/disabled:
    For example, the TX WTRU (e.g., WTRU 102) may start/use an inactivity timer (e.g., only) in a case where (e.g., when) a transmission by the TX WTRU (e.g., WTRU 102) is HARQ enabled.
    For example, the TX WTRU (e.g., WTRU 102) may start/use an inactivity timer (e.g., only) in a case where (e.g., when) a transmission is associated with HARQ enabled, and/or positive-negative acknowledgement groupcast HARQ type is used.
    For example, the RX WTRU (e.g., WTRU 102) may start an inactivity timer, for example associated with an L2 ID, (e.g., only) in a case where (e.g., when) the received transmission is HARQ enabled.
    For example, the RX WTRU (e.g., WTRU 102) may start an inactivity timer, for example associated with an L2 ID, (e.g., only) in a case where (e.g., when) the received transmission is HARQ enabled with groupcast positive-negative acknowledgement type.
  Condition based on member ID configured by upper layers:
    For example, the TX WTRU (e.g., WTRU 102) and/or RX WTRU (e.g., WTRU 102) may use an inactivity timer for a specific groupcast transmission (e.g., associated with a groupcast L2 ID) if the TX WTRU (e.g., WTRU 102) and/or RX WTRU (e.g., WTRU 102) is configured with a member ID associated with such groupcast transmission.
  Condition based on the group size:
    For example, the TX WTRU (e.g., WTRU 102) and/or RX WTRU (e.g., WTRU 102) may use the inactivity timer for a specific groupcast transmission (e.g., associated with a groupcast L2 ID) if the group number is not larger than the configured number of PSFCH resources.
  Condition based on MCR (minimum communication range):
    For example, the TX WTRU (e.g., WTRU 102) and/or RX WTRU (e.g., WTRU 102) may use an inactivity timer for a specific groupcast transmission if the transmission is configured with an MCR:
      Specifically, if at least one of the SLRBs for transmission is configured with an MCR, the TX WTRU (e.g., WTRU 102) may operate with (e.g., assume) an inactivity timer associated with transmissions to the L2 ID. Specifically, following a transmission while any of the timers associated with active time of the L2 ID is running, the TX WTRU (e.g., WTRU 102) may start an inactivity timer each time the TX WTRU (e.g., WTRU 102) performs transmission to the L2 ID (or receives acknowledgement for a transmission). Otherwise, if MCR is not configured, the TX WTRU (e.g., WTRU 102) may not start an inactivity timer under such conditions and/or may not maintain a condition for activity based on inactivity timer (e.g., transmission may be allowed (e.g., only) in a case where (e.g., when) on duration timer is running, or retransmission timer is running).
      Similarly, the RX WTRU (e.g., WTRU 102) may define its active time for a L2 ID if it receives at least one packet associated with an MCR for that L2 ID, or if it is configured with an SLRB for transmission to that L2 ID that is configured with MCR.
    For example, the TX WTRU (e.g., WTRU 102) and/or RX WTRU (e.g., WTRU 102) may use an inactivity timer for a specific groupcast if the MCR configured for any SLRBs is below a threshold
    Similar behavior to the above example would then be expected.
  Condition based on MCR and/or HARQ feedback enabled:
    For example, the RX and/or RX WTRU (e.g., WTRU 102) may use an inactivity timer for a specific groupcast transmission configured with MCR as long as HARQ feedback is enabled.
      For example, if at least one SLRB for transmission to a L2 ID is configured with MCR and/or HARQ enabled, the TX WTRU (e.g., WTRU 102) may use an inactivity timer.
      For example, if all SLRBs for transmission to a groupcast L2 ID are configured with MCR and/or HARQ enabled, the TX WTRU (e.g., WTRU 102) may use an inactivity timer for that L2 ID, otherwise, it would not.
According to embodiments, a TX/RX WTRU (e.g., WTRU 102) may stop a currently running inactivity timer if one of the conditions or parameters for supporting the inactivity timer change. For example, the TX/RX WTRU (e.g., WTRU 102) may stop an already running inactivity timer if the group size and/or member ID indicated by the higher layers changes at the at the WTRU.

b) RX WTRU (e.g., WTRU 102) Resets an Inactivity Timer Depending on the MCR of the Received Transmissions According to embodiments, a RX WTRU (e.g., WTRU 102) may determine whether or not to reset the inactivity timer, for example associated with groupcast transmissions, based on the RX WTRU (e.g., WTRU 102)'s location and/or the MCR associated with the transmission. Specifically, a RX WTRU (e.g., WTRU 102) may reset the inactivity timer (e.g., only) after (e.g., upon) reception of a new transmission in a case where (e.g., when) such new transmission has an MCR which satisfies any of the following conditions:
MCR is not present.
MCR is present.
Determined distance between the transmitter and/or the receiver is smaller than (smaller than or equal to) the MCR.
Determined distance between the transmitter and/or the receiver is smaller than (smaller than or equal to) the MCR plus or minus a (pre)configured delta
Such delta may further depend on any of:
Priority, WTRU speed, CBR, number of WTRUs in the group, power savings preference at the RX WTRU (e.g., WTRU 102), WTRU capability associated with the RX WTRU (e.g., WTRU 102), for example.
Consideration of the distance relative to the MCR may further be based on the change of the distance with respect to the MCR observed by the RX WTRU (e.g., WTRU 102) from previous transmissions. Specifically, if the distance between the two WTRUs, or the difference of such distance compared to MCR is decreasing with each subsequent transmission intended for the L2 ID, the RX WTRU (e.g., WTRU 102) may restart the inactivity timer.

c) TX WTRU (e.g., WTRU 102) Maintains a Related Set of Timers as the TX WTRU (e.g., WTRU 102) for Each RX WTRU (e.g., WTRU 102)

According to embodiments, the TX WTRU (e.g., WTRU 102) may determine whether or not to transmit to a specific WTRU (unicast) or to a group of WTRUs (e.g., groupcast L2 ID) based on the maintenance of similar timers as the RX WTRU (e.g., WTRU 102). Specifically, the TX WTRU (e.g., WTRU 102) may transmit to a specific group if at least one of the inactivity timers associated to that group of WTRUs is running.
According to embodiments, the TX WTRU (e.g., WTRU 102) may maintain a set of timers which correspond to the timers for the RX WTRU (e.g., WTRU 102). Specifically, the TX WTRU (e.g., WTRU 102) may maintain an inactivity timer for each L2 source/destination ID (for unicast), L2 destination ID (for groupcast) and/or for example per priority/QoS level for each address. The TX WTRU (e.g., WTRU 102) may use a related (but different) value of such timers to compensate for the delay in performing transmission, and/or performing reliable transmission. The TX WTRU (e.g., WTRU 102) may start/stop such timers earlier/later than the TX WTRU (e.g., WTRU 102). For example:

the TX WTRU (e.g., WTRU 102) may be configured with an on-duration timer, a HARQ RTT timer, or a retransmission timer which is shorter than the RX WTRU (e.g., WTRU 102); and/or
the TX WTRU (e.g., WTRU 102) may be configured to start the on-duration timer earlier in the DRX cycle compared to the RX WTRU (e.g., WTRU 102).

d) TX WTRU (e.g., WTRU 102) (Re)Starts Inactivity Timer at Reception of HARQ Feedback from One or Multiple WTRUs in a Group According to embodiments, a TX WTRU (e.g., WTRU 102) may (re) start an inactivity timer based on the reception of HARQ feedback from one or multiple WTRUs.
According to embodiments, the TX WTRU (e.g., WTRU 102) may maintain a single inactivity timer for all of the RX WTRU (e.g., WTRU 102) s in the group (with respect to its own transmissions to that group). The TX WTRU (e.g., WTRU 102) may start the inactivity timer at any of the following conditions:
in a case where (e.g., when) it receives HARQ feedback (e.g., ACK or NACK) from a first (E.G., RX) WTRU;
in a case where (e.g., when) it receives HARQ feedback (e.g., ACK or NACK) from a majority of the WTRUs in the group (e.g., number or percentage of WTRUs above a threshold);
in a case where (e.g., when) it receives HARQ feedback from all of the WTRUs in the group;
in a case where (e.g., when) it receives HARQ feedback from a specific subset of WTRUs in the group, for example associated with a preconfigured pattern or set of member IDs (e.g., IDs which are closest to its own ID, or IDs 1-x);
in a case where (e.g., when) it receives HARQ feedback within a time period of the initial transmission; and/or
in a case where (e.g., when) it receives HARQ feedback at the latest following the x (re)transmission of the PDU.
For example, the TX WTRU (e.g., WTRU 102) may start the inactivity timer in a case where (e.g., when) it receives HARQ feedback (either ACK or NACK) from all of the RX WTRU (e.g., WTRU 102) s in the group.
For example, the TX WTRU (e.g., WTRU 102) may start the inactivity timer in a case where (e.g., when) it receives HARQ feedback from all of the RX WTRU (e.g., WTRU 102) s in the group, as long as the HARQ feedback is receives within the first x ms following the initial transmission, or within the first y retransmissions of the PDU by the TX WTRU (e.g., WTRU 102).
According to embodiments, the TX WTRU (e.g., WTRU 102) may maintain an inactivity timer associated with each of the RX WTRU (e.g., WTRU 102)s in the group. The TX WTRU (e.g., WTRU 102) may start the RX WTRU (e.g., WTRU 102)-specific inactivity timer for a specific (e.g., RX) WTRU (e.g., WTRU 102) in a case where (e.g., when) it receives HARQ feedback from that (e.g., RX) WTRU (e.g., WTRU 102). In this solution, the TX WTRU (e.g., WTRU 102) may transmit subsequent new transmissions for that L2 ID (or to that group) as long as any of the following conditions:
the inactivity timer associated with each RX WTRU (e.g., WTRU 102) is running;
the inactivity timer associated with a majority of WTRUs in the group is running (e.g., number or percentage of WTRUs above a threshold);

the inactivity timer associated with at least one WTRU in the group is running; and/or the inactivity timer associated with a specific subset of WTRUs in the group is running, where such subset may correspond to a preconfigured pattern or set of member IDs.

e) TX WTRU (e.g., WTRU 102) Starts Inactivity Timer at Different Times for Groups/Transmissions Where Feedback is Possible Compared to Not Possible According to embodiments, a TX WTRU (e.g., WTRU 102) may have different criteria for starting the inactivity timer based on transmission for a group. Such criteria may depend on any of:

HARQ feedback enabled/disabled.
Cast type.
HARQ feedback type (positive-negative feedback vs negative (e.g., only) feedback).
MCR presence and/or value.
Whether PSFCH resources are configured or not in the resource pool.

For example, a TX WTRU (e.g., WTRU 102) may start the inactivity timer after (e.g., upon) reception of HARQ feedback (as per previous embodiments) in a case where (e.g., when) a transmission is associated with groupcast with positive-negative acknowledgement and/or may start the inactivity timer after (e.g., upon) initial transmission (for example to a WTRU or a group) otherwise.

f) TX WTRU (e.g., WTRU 102) Uses Mechanisms to Improve the Reliability of Transmissions (e.g., Only) when Feedback is Not Possible According to embodiments, a TX WTRU (e.g., WTRU 102) may use different values of inactivity timer for the different start criteria of the inactivity timer. Additionally, a TX WTRU (e.g., WTRU 102) may employ mechanism for improving the reliability of a transmission within the inactivity time, or towards the end of the on-duration time such as any of the following:

increasing transmission power;
for example, the (e.g., TX) WTRU (e.g., WTRU 102) may increase the transmission power for transmissions which occur outside of the on duration, or for which some of the retransmissions will fall outside of the on-duration;
increasing number of retransmissions;
for example, the (e.g., TX) WTRU (e.g., WTRU 102) may increase the number of retransmissions for transmissions in which the transmissions occur outside of the on duration, or where some of the retransmissions may fall outside of the on-duration;
ensuring retransmissions fall within the on duration or a subset of resources in the on-duration;
for example, the (e.g., TX) WTRU (e.g., WTRU 102) may perform resource selection such that a number of retransmission resources fall within the on duration, for example where this number of resources may further depend on QoS and/or CBR. For example, the (e.g., TX) WTRU (e.g., WTRU 102) may be configured with a number of (e.g., required) retransmission resources to be performed within the on duration based on the priority and/or CBR. For example, the (e.g., TX) WTRU (e.g., WTRU 102) may be configured with a number of retransmission resources to be performed in a case where (e.g., when) the TX WTRU (e.g., WTRU 102) inactivity timer is running which is based on QoS and/or CBR, where such number of retransmissions may be different depending on:

in a general example, a (e.g., TX) WTRU (e.g., WTRU 102) may be configured with a different number of allowed/minimum/required retransmissions to be performed which is different depending on which timer is running:
  e.g., in a case where (e.g., when) the on-duration timer at the TX WTRU (e.g., WTRU 102) is running compared to in a case where (e.g., when) the on-duration timer is not running;
  e.g., in a case where (e.g., when) the inactivity timer at the TX WTRU (e.g., WTRU 102) is running compared to in a case where (e.g., when) the inactivity timer is not running;

increase the modulation and/or coding scheme (MCS) of a transmission.

The (e.g., TX) WTRU (e.g., WTRU 102) may use such mechanisms (e.g., only) for transmissions that have certain criteria for starting the inactivity timer. Specifically, the TX WTRU (e.g., WTRU 102) may not use the reliability mechanisms for groupcast transmissions with positive-negative acknowledgements but use it for other groupcast transmissions.

The TX WTRU (e.g., WTRU 102) may use such mechanisms, for example, in a case where (e.g., when) PSFCH is not configured. If PSFCH is configured, the TX WTRU (e.g., WTRU 102) may always enable HARQ feedback, or set the HARQ feedback mode to positive/negative acknowledgement to ensure reliability.

Furthermore, whether to apply a mechanism, and/or the parameters/thresholds/increase/etc. (e.g., the number of retransmissions, the increase in number of retransmissions, the increase in transmission power, MCS, etc.) may further depend on the congestion in the link. For example, it may be higher or lower for higher CBR.

In the case of unicast, a (e.g., TX) WTRU (e.g., WTRU 102) may use such mechanisms (e.g., only) for transmissions which have HARQ disabled and/or use other mechanisms herein for HARQ enabled transmissions.

g) TX WTRU (e.g., WTRU 102) Performs Transmissions within the Active Time

According to embodiments, for example for transmissions associated with HARQ feedback (e.g., unicast transmissions with HARQ enabled), the TX WTRU (e.g., WTRU 102) may perform transmissions at least K slots before the expiry of an inactivity timer, on-duration timer, retransmission timer (or any timer at the RX WTRU (e.g., WTRU 102) associated with active transmission). K may be associated with the latency associated with the HARQ feedback. Specifically, K may be any of the following:

the time difference between the transmission and/or one (or more, or all, —for groupcast) PSFCH resources for HARQ feedback associated with that transmission;
a (pre) configured value which allows the (e.g., TX) WTRU (e.g., WTRU 102) to schedule a retransmission (in case of DTX) prior to the expiry of such timer;
the time between the initial transmission and/or the first retransmission;
the time between the initial transmission and/or the Nth retransmission, where N may depend on CBR, QoS, etc.;

the time between the initial transmission and/or the last retransmission indicated in the SCI for the initial transmission; and/or the time between the initial transmission in the SCI, and/or the PSFCH resource associated with the last retransmission indicated in the SCI.

h) TX WTRU (e.g., WTRU 102) Forces/Enables HARQ Feedback for Certain Transmissions to a RX WTRU(s) (e.g., WTRU(s) 102) in DRX According to embodiments, a TX WTRU (e.g., WTRU 102) may enable HARQ feedback to a RX WTRU (e.g., WTRU 102) in DRX, regardless of the LCH HARQ feedback enabled configuration. This may ensure that the TX WTRU (e.g., WTRU 102) can accurately start the inactivity timer based on reception of HARQ feedback from the TX WTRU (e.g., WTRU 102).

A TX WTRU (e.g., WTRU 102) may enable HARQ feedback to a RX WTRU(s) (e.g., WTRU(s) 102) for all transmissions to that RX WTRU(s) (e.g., WTRU(s) 102). Alternatively, a TX WTRU (e.g., WTRU 102) may enable HARQ feedback to a RX WTRU(s) (e.g., WTRU(s) 102) in any of the following conditions:

Transmissions in which the on-duration timer is not running.
Transmissions in which the inactivity timer is running.
Transmissions in which the (e.g., TX) WTRU (e.g., WTRU 102) still has data in its buffers which it plans/is configured to transmit before the next on duration of the RX WTRU (e.g., WTRU 102).
Transmissions associated with the last grant in the on duration associated with the RX WTRU (e.g., WTRU 102).
Transmissions associated with the last grant in the inactivity timer associated with the RX WTRU (e.g., WTRU 102).
Transmissions in which the (e.g., TX) WTRU still has data in its buffers, where the data may be of high priority (e.g., the priority is above a threshold).
Transmissions in which the (e.g., TX) WTRU still has data in its buffers in which the PDB is smaller than the time until the next on duration.
Transmissions in which the (e.g., TX) WTRU still has data in its buffers, in which the LCHs for which there is data available is configured to ensure that HARQ feedback enabled transmissions are enabled prior to transmission of these LCHs.

2.3 Handling Inactivity Timer for the Cases of UL Prioritization or Half Duplex a) RX WTRU (e.g., WTRU 102) May Start an Inactivity Timer Under Conditions not Related to Data Reception According to embodiments, a RX WTRU (e.g., WTRU 102) may start/restart an inactivity timer without having received transmissions. Specifically, a RX WTRU (e.g., WTRU 102) may start/restart an inactivity timer after (e.g., upon) performing one or more transmissions (either UL transmissions, or SL transmissions) or after (e.g., upon) decoding another interface (Uu or SL on a different carrier) that would make such (e.g., RX) WTRU (e.g., WTRU 102) unable to decode on sidelink at the instances of transmissions.

According to embodiments, the RX WTRU (e.g., WTRU 102) may start/restart the inactivity timer at the time instance where it performs a transmission/reception which would make the (e.g., RX) WTRU (e.g., WTRU 102) unable to decode on sidelink. This may occur during the (e.g., RX) WTRU (e.g., WTRU 102)'s active monitoring time/period, which could be while any of the on-duration timer is running, the inactivity timer is running, or any other timer that defines active sidelink monitoring is running. Alternatively, the (e.g., RX) WTRU (e.g., WTRU 102) may start the inactivity timer, based on one of the conditions below, at a (pre) configured, or predefined time instance within any of the on duration (defined by the on-duration timer), inactivity timer duration, etc. For example, the RX WTRU (e.g., WTRU 102), after (e.g., upon) satisfying one of the conditions below, may start/restart the inactivity timer at any of the following conditions:

at a (pre) configured or pre-defined slot within the on duration, or inactivity timer duration;
at the last slot associated to the on duration or inactivity timer duration; and/or
a number (preconfigured or defined) of slots before the end of the last slot associated to the on duration or inactivity timer duration.

According to embodiments, a (e.g., RX) WTRU (e.g., WTRU 102) may start/restart an inactivity timer without having receiving transmissions (in order to proactively extend the activity timer) associated with conditions which relate to sidelink. Such conditions may be related to any of:

Conditions related to CBR:
For example, a (e.g., RX) WTRU (e.g., WTRU 102) may start/restart the inactivity timer if the CBR is larger than a configured threshold.
Conditions related to the number/amount/percentage of missed sidelink decoding opportunities during an active time:
For example, a (e.g., RX) WTRU (e.g., WTRU 102) may start/restart the inactivity timer if it misses decoding of sidelink for at least N slots or at least X % slots during the on duration, or currently running inactivity timer, where N and/or X % can be (pre) configured.
Conditions related to QoS of the expected data, which can be determined based on the PC5 QoS identifier (PQI) of one or more established QoS flows, the configuration or one or more SLRBs (e.g., for reception), the priority of one or more recent transmissions (e.g., the transmission which started the currently running inactivity timer), etc.:
For example, a (e.g., RX) WTRU (e.g., WTRU 102) may determine whether or not to start/restart the inactivity timer based on the QoS of the expected data (e.g., start/restart the inactivity timer if the QoS of the expected data is higher than a threshold QoS).
For example, a (e.g., RX) WTRU (e.g., WTRU 102) may determine one of N or X % in the above examples based on the QoS of the expected data.
Conditions related to the (e.g., RX) WTRU (e.g., WTRU 102) type or power savings preference:
For example, a (e.g., RX) WTRU (e.g., WTRU 102) may start/restart the inactivity timer if it is of a specific WTRU type or has a specific power savings preference in effect at the time of the trigger of another of the above conditions.

Figure 6:
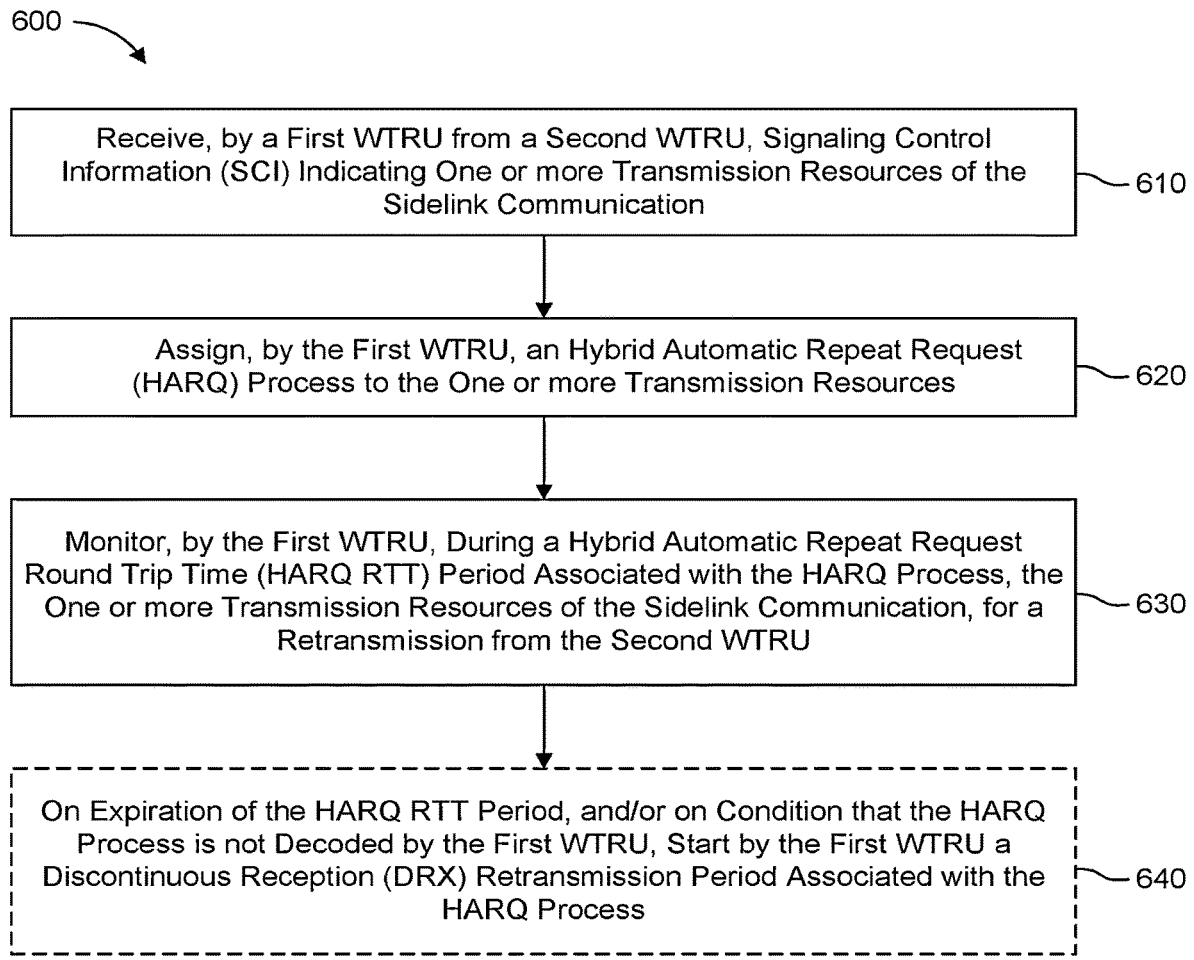
FIG. 6 is a diagram illustrating an example of a method, implemented by a first WTRU, for a sidelink (e.g., D2D) communication between the first WTRU and a second WTRU.

FIG. 6 is a diagram illustrating an example of a method 600, implemented by a first WTRU (e.g., RX WTRU), for a sidelink communication between the first WTRU (e.g., RX WTRU) and/or a second WTRU (e.g., TX WTRU).

According to embodiments, in a step 610, the first WTRU (e.g., RX WTRU) may be configured to receive, from the second WTRU (e.g., TX WTRU), SCI indicating one or more transmission resources of the sidelink communication.

According to embodiments, in a step 620, the first WTRU (e.g., RX WTRU) may be configured to assign, by the first WTRU (e.g., RX WTRU), a HARQ process to the one or more transmission resources.

According to embodiments, in a step 630, the first WTRU (e.g., RX WTRU) may be configured to monitor, by the first WTRU (e.g., RX WTRU), during a hybrid automatic repeat request round trip time (HARQ RTT) period associated with the HARQ process, the one or more transmission resources of the sidelink communication, for a retransmission from the second WTRU (e.g., TX WTRU).

According to embodiments, in a step 640, on expiration of the HARQ RTT period, and/or on condition that the HARQ process is not decoded by the first WTRU (e.g., RX WTRU), the first WTRU (e.g., RX WTRU) may be configured start a DRX retransmission period associated with the HARQ process.

For example, the first WTRU (e.g., RX WTRU) may be configured to monitor, based on the DRX retransmission period, for the one or more transmission resources of the sidelink communication for the retransmission from the second WTRU (e.g., TX WTRU).

For example, a HARQ RTT timer is started at a time slot following a transmission of sidelink feedback channel information associated with the one or more transmission resources.

For example, the first WTRU (e.g., RX WTRU) may be configured to receive, a resource allocation mode of the sidelink communication between the first WTRU (e.g., RX WTRU) and/or the second WTRU (e.g., TX WTRU).

For example, the first WTRU (e.g., RX WTRU) may be configured to determine, a value of the HARQ RTT timer based on any of: a resource allocation mode of the sidelink communication between the first WTRU (e.g., RX WTRU) and/or the second WTRU (e.g., TX WTRU); and/or an indication of additional retransmission resources reserved for the HARQ process by the received SCI or another SCI previously received.

For example, a DRX retransmission timer is started based on any of: a resource allocation mode of the sidelink communication between the first WTRU (e.g., RX WTRU) and/or the second WTRU (e.g., TX WTRU); an indication of additional retransmission resources reserved for the HARQ process by the received SCI or another SCI previously received; an expiration of the HARQ RTT period in a time slot associated with a reserved resource in the another SCI previously received; and/or a decoding of the received SCI in the time slot associated with a reserved resource in the another SCI previously received.

For example, the first WTRU (e.g., RX WTRU) may be configured to determine a value of the DRX retransmission timer based on any of: a resource allocation mode of the sidelink communication between the first WTRU (e.g., RX WTRU) and/or the second WTRU (e.g., TX WTRU); an indication of additional retransmission resources reserved for the HARQ process by the received SCI or another SCI previously received; and/or a decoding of the received SCI in the time slot associated with a reserved resource in the another SCI previously received.

For example, the sidelink communication is a unicast communication.

Figure 7:
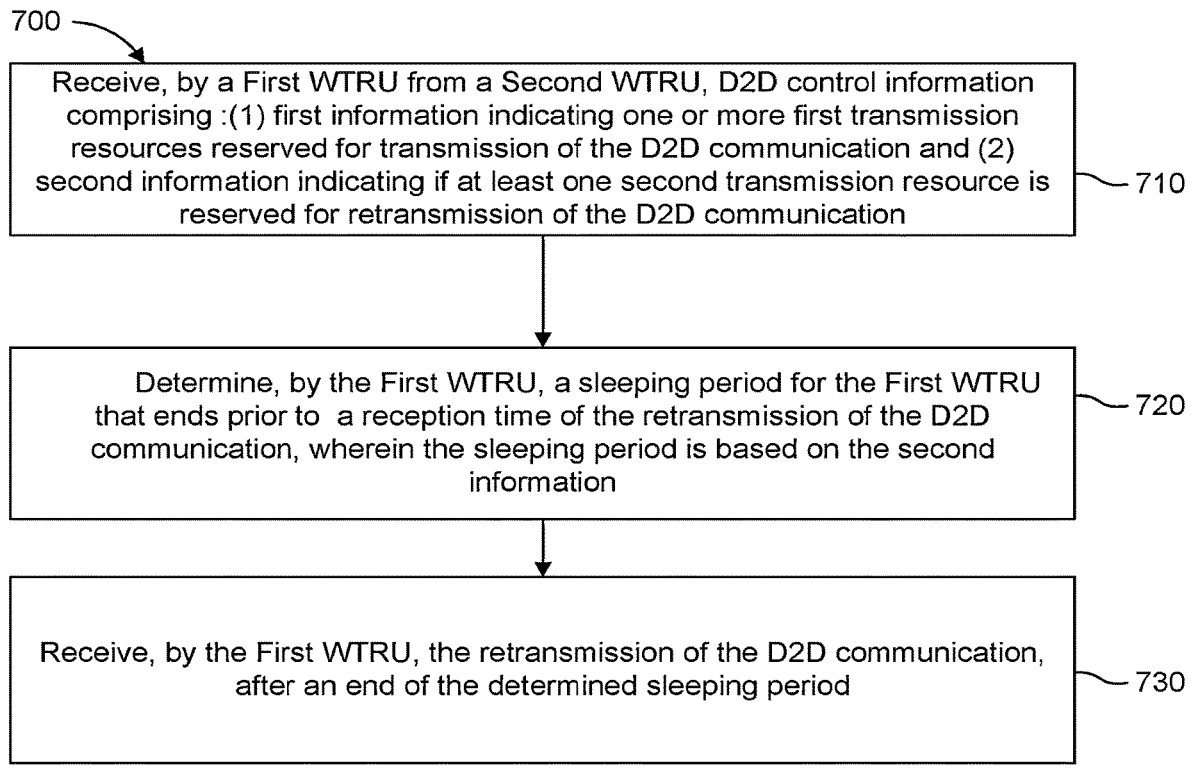
FIG. 7 is a diagram illustrating a further example of a method, implemented by a first WTRU, for a D2D communication between the first WTRU and a second WTRU.

FIG. 7 is a diagram illustrating an example of a method 700, implemented by a first WTRU (e.g., RX WTRU), for a sidelink communication between the first WTRU (e.g., RX WTRU) and a second WTRU (e.g., TX WTRU).

According to embodiments, in a step 710, the first WTRU (e.g., RX WTRU) may be configured to receive, from the second WTRU (e.g., TX WTRU), D2D control information comprising: (1) first information indicating one or more first transmission resources reserved for transmission of the D2D communication and (2) second information indicating if at least one second transmission resource is reserved for retransmission of the D2D communication.

According to embodiments, in a step 720, the first WTRU (e.g., RX WTRU) may be configured to determine a sleeping period for the first WTRU (e.g., RX WTRU) that ends prior to a reception time of the retransmission of the D2D communication, wherein the sleeping period is based on the second information.

According to embodiments, in a step 730, the first WTRU (e.g., RX WTRU) may be configured to receive the retransmission of the D2D communication, after an end of the determined sleeping period.

For example, on condition that the second information indicates that at least one second transmission resource is reserved for retransmission of the D2D communication, the determined sleeping period is based on timing information associated with the reserved at least one second transmission resource.

For example, the first WTRU (e.g., RX WTRU) may be further configured to obtain a sleeping period value, and wherein on condition that the second information does not indicate that at least one second transmission resource is reserved for retransmission of the D2D communication, the determined sleeping period is based on the sleeping period value obtained.

For example, the first WTRU (e.g., RX WTRU) may be further configured to obtain a sleeping period value by receiving network configuration information indicating the sleeping period value.

For example, obtaining a sleeping period value may be further configured to obtain a sleeping period value by determining the sleeping period value based on a preconfigured value.

For example, the D2D control information further comprises information indicating if transmission of D2D feedback information associated with the first transmission resource is enabled.

For example, the determined sleeping period is started at a time slot following the reception of the D2D control information.

For example, on condition that the transmission of the D2D feedback information is enabled, the determined sleeping period is started at a time slot following the transmission of the D2D feedback information.

For example, on condition that the transmission of the D2D feedback information is disabled, the determined sleeping period is started is started at a time slot following the reception of the D2D control information.

For example, the determined sleeping period is started at a predetermined time instance or at a time instance indicated in the received D2D control information.

For example, the determined sleeping period is started a time instance based on a cast type of the D2D communication.

For example, the D2D communication is a sidelink communication.

Figure 8:
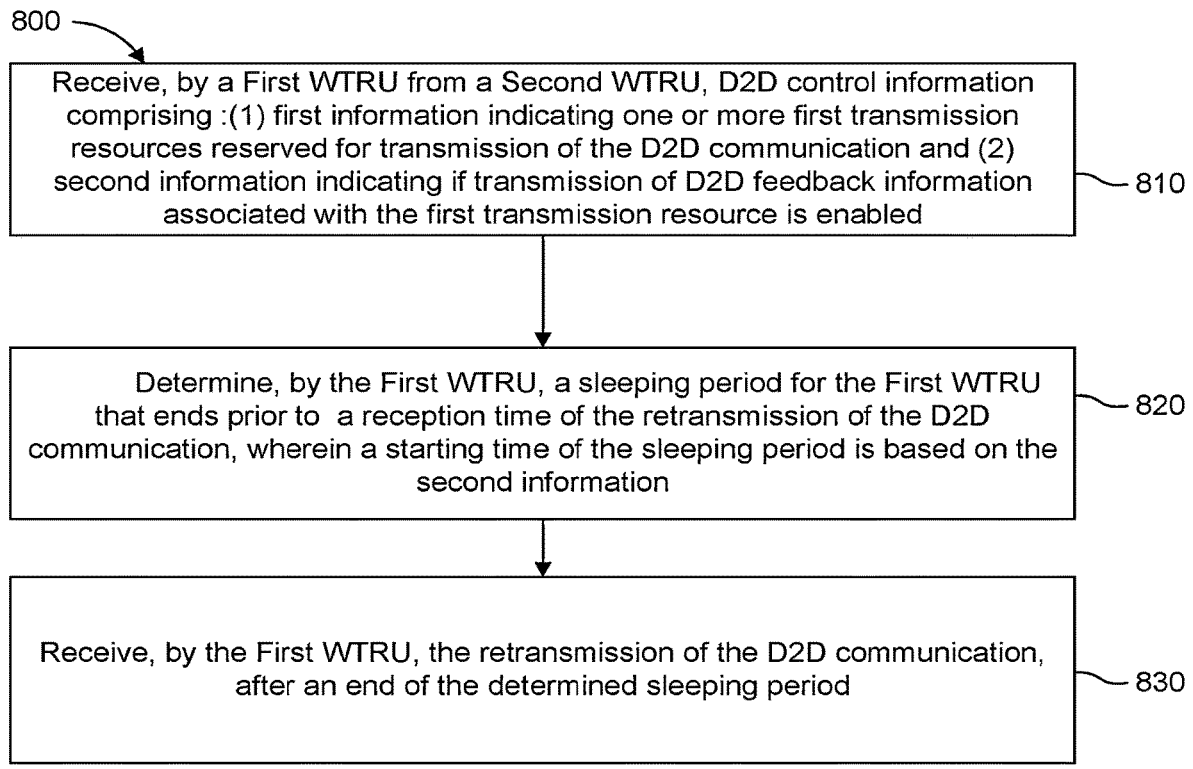
FIG. 8 is a diagram illustrating a further example of a method, implemented by a first WTRU, for a D2D communication between the first WTRU and a second WTRU.

FIG. 8 is a diagram illustrating an example of a method 800, implemented by a first WTRU (e.g., RX WTRU), for a sidelink communication between the first WTRU (e.g., RX WTRU) and a second WTRU (e.g., TX WTRU).

According to embodiments, in a step 810, the first WTRU (e.g., RX WTRU) may be configured to receive, from the second WTRU (e.g., TX WTRU), D2D control information comprising: (1) first information indicating one or more first transmission resources reserved for transmission of the D2D communication and (2) second information indicating if transmission of D2D feedback information associated with the first transmission resource is enabled.

According to embodiments, in a step 820, the first WTRU (e.g., RX WTRU) may be configured to determine a sleeping period for the first WTRU (e.g., RX WTRU) that ends prior to a reception time of a retransmission of the D2D communication, wherein a starting time of the sleeping period is based on the second information.

According to embodiments, in a step 830, the first WTRU (e.g., RX WTRU) may be configured to receive the retransmission of the D2D communication, after an end of the determined sleeping period.

For example, on condition that the transmission of the D2D feedback information is enabled, the determined sleeping period is started at a time slot following the transmission of the D2D feedback information.

For example, on condition that the transmission of the D2D feedback information is disabled, the determined sleeping period is started is started at a time slot following the reception of the D2D control information.

Figure 9:
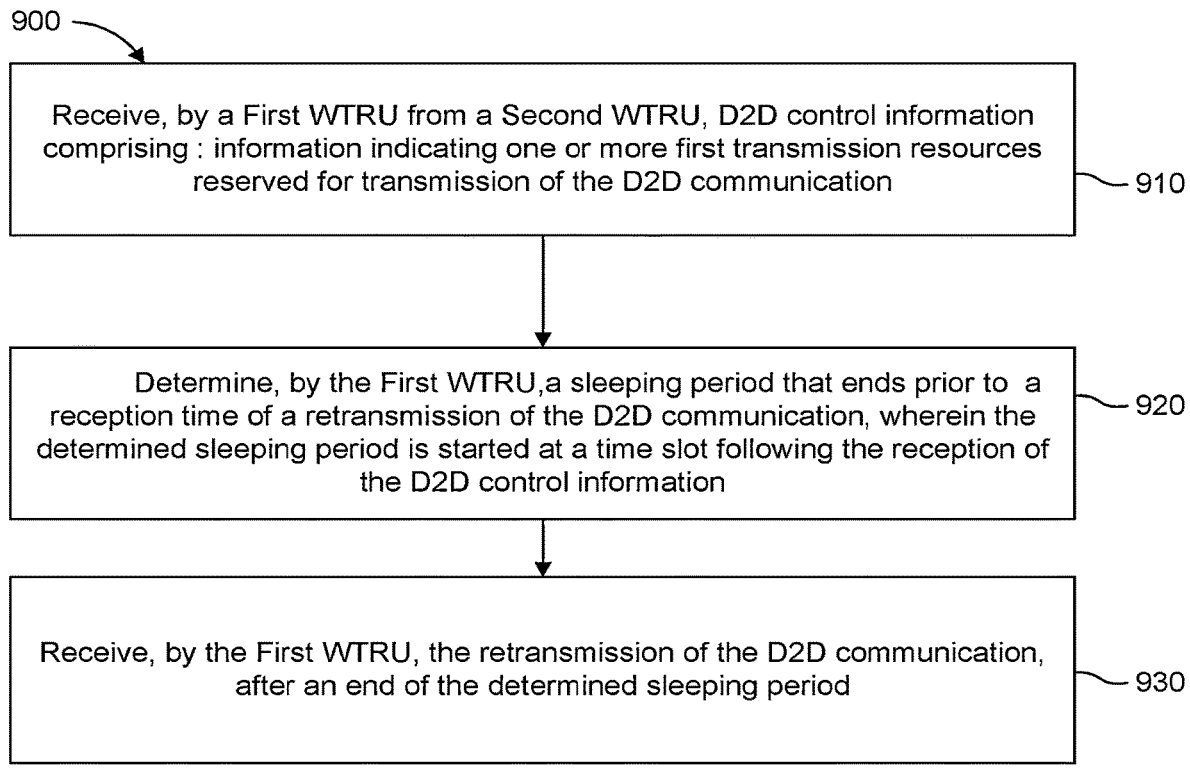
FIG. 9 is a diagram illustrating a further example of a method, implemented by a first WTRU, for a D2D communication between the first WTRU and a second WTRU.

FIG. 9 is a diagram illustrating an example of a method 900, implemented by a first WTRU (e.g., RX WTRU), for a sidelink communication between the first WTRU (e.g., RX WTRU) and a second WTRU (e.g., TX WTRU).

According to embodiments, in a step 910, the first WTRU (e.g., RX WTRU) may be configured to receive, from the second WTRU (e.g., TX WTRU), D2D control information comprising: information indicating one or more first transmission resources reserved for transmission of the D2D communication.

According to embodiments, in a step 920, the first WTRU (e.g., RX WTRU) may be configured to determine a sleeping period that ends prior to a reception time of a retransmission of the D2D communication, wherein the determined sleeping period is started at a time slot following the reception of the D2D control information.

According to embodiments, in a step 930, the first WTRU (e.g., RX WTRU) may be configured to receive the retransmission of the D2D communication, after an end of the determined sleeping period.

Figure 10:
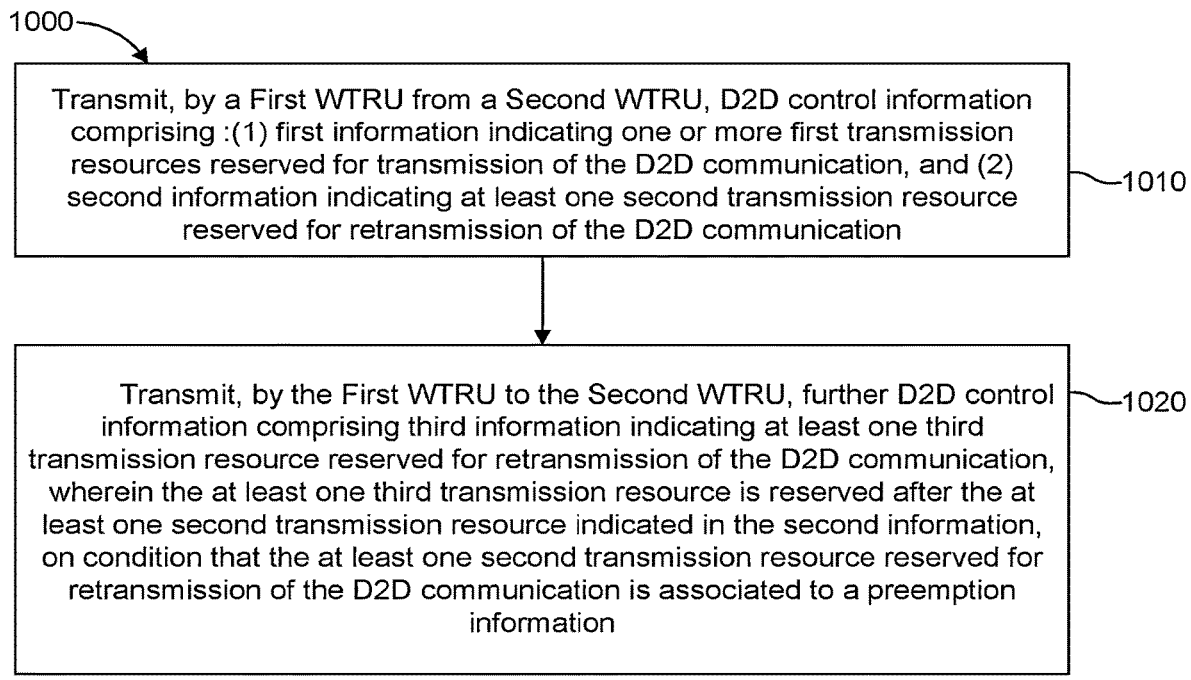
FIG. 10 is a diagram illustrating a further example of a method, implemented by a first WTRU, for a D2D communication between the first WTRU and a second WTRU

FIG. 10 is a diagram illustrating an example of a method 1000, implemented by a first WTRU (e.g., TX WTRU), for a sidelink communication between the first WTRU (e.g., TX WTRU) and a second WTRU (e.g., RX WTRU).

According to embodiments, in a step 1010, the first WTRU (e.g., TX WTRU) may be configured to transmit, to the second WTRU (e.g., RX WTRU), D2D control information comprising: (1) first information indicating one or more first transmission resources reserved for transmission of the D2D communication, and (2) second information indicating at least one second transmission resource reserved for retransmission of the D2D communication.

According to embodiments, in a step 1010, the first WTRU (e.g., TX WTRU) may be configured, on condition that the at least one second transmission resource reserved for retransmission of the D2D communication is associated to a preemption indication/information, to transmit, to the second WTRU (e.g., RX WTRU), further D2D control information comprising third information indicating at least one third transmission resource reserved for retransmission of the D2D communication, wherein the at least one third transmission resource is reserved after (e.g., in a first window of transmission resources after) the at least one second transmission resource indicated in the second information.

For example, the first WTRU (e.g., TX WTRU) may be configured to (re)select the least one third transmission resource reserved for retransmission of the D2D communication.

Besides, any characteristic, variant or embodiment described for a method is compatible with an apparatus device comprising means for processing the disclosed method, with a device comprising a processor configured to process the disclosed method, with a computer program product comprising program code instructions and with a non-transitory computer-readable storage medium storing program instructions.

Conclusion

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

The foregoing embodiments are discussed, for simplicity, with regard to the terminology and structure of infrared capable devices, i.e., infrared emitters and receivers. However, the embodiments discussed are not limited to these systems but may be applied to other systems that use other forms of electromagnetic waves or non-electromagnetic waves such as acoustic waves.

It is also to be understood that the terminology used herein is for the purpose of describing particular embodiments only, and is not intended to be limiting. As used herein, the term "video" or the term "imagery" may mean any of a snapshot, single image and/or multiple images displayed over a time basis. As another example, when referred to herein, the terms "user equipment" and its abbreviation "UE", the term "remote" and/or the terms "head mounted display" or its abbreviation "HMD" may mean or include (i) a wireless transmit and/or receive unit (WTRU); (ii) any of a number of embodiments of a WTRU; (iii) a wireless-capable and/or wired-capable (e.g., tetherable) device configured with, inter alia, some or all structures and functionality of a WTRU; (iii) a wireless-capable and/or wired-capable device configured with less than all structures and functionality of a WTRU; or (iv) the like. Details of an example WTRU, which may be representative of any WTRU recited herein, are provided herein with respect to FIGS. 1A-1D. As another example, various disclosed embodiments herein supra and infra are described as utilizing a head mounted display. Those skilled in the art will recognize that a device other than the head mounted display may be utilized and some or all of the disclosure and various disclosed embodiments can be modified accordingly without undue experimentation. Examples of such other device may include a drone or other device configured to stream information for providing the adapted reality experience.

In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Variations of the method, apparatus and system provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices that include processors are noted. These devices may include at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM)) or non-volatile (e.g., Read-Only Memory (ROM)) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost versus efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples include one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components included within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may include usage of the introductory phrases "at least one" and "one or more" to introduce claim recitations. However, the use of such phrases should not be construed to imply that the introduction of a claim recitation by the indefinite articles "a" or "an" limits any particular claim including such introduced claim recitation to embodiments including only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" is intended to include any number of items, including zero. Additionally, as used herein, the term "number" is intended to include any number, including zero. And the term "multiple", as used herein, is intended to be synonymous with "a plurality".

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, 1¶ 6 or means-plus-function claim format, and any claim without the terms "means for" is not so intended.

What is claimed:

1. A first wireless transmit/receive unit (WTRU), for a sidelink between the first WTRU and a second WTRU, the first WTRU comprising circuitry, including a transmitter, a receiver, a processor, and memory, configured to:
receive, from the second WTRU, sidelink control information comprising: (1) first information indicating at least a first transmission resource reserved for an initial transmission and (2) second information indicating if at least one second transmission resource is reserved for a sidelink retransmission of the initial transmission;
determine a timer value for a hybrid automatic repeat request (HARQ) round trip time (RTT) timer associated with a sidelink process, wherein
on condition that a HARQ feedback is enabled for an associated sidelink process, the timer value is determined to be a first value, and wherein
on condition that the HARQ feedback is disabled for the associated sidelink process, the timer value is determined to be a second value; and
start the HARQ RTT timer associated with the sidelink process, wherein
on condition that the second information indicates that at least one second transmission resource is reserved for the sidelink retransmission, the HARQ RTT timer is started in a first time slot, and wherein
on condition that the second information indicates that no second transmission resource is reserved for the sidelink retransmission, the HARQ RTT timer is started in a second time slot.

2. The WTRU according to claim 1, further configured to: receive network configuration information indicating the first value and the second value.

3. The WTRU according to claim 1, wherein, on condition that the HARQ feedback is enabled for the associated sidelink process, the first time slot follows a transmission of the HARQ feedback.

4. The WTRU according to claim 1, wherein on condition that the HARQ feedback is disabled for the associated sidelink process, and wherein on condition that the second information indicates that at least one second transmission resource is reserved for the sidelink retransmission, the second time slot follows the at least first transmission resource.

5. The WTRU according to claim 1, wherein on condition that the HARQ feedback is disabled for the associated sidelink process, and wherein on condition that the second information indicates that no second transmission resource is reserved for the sidelink retransmission, the second time slot follows a resource reserved for a transmission of the HARQ feedback.

6. The WTRU according to claim 1, wherein the HARQ RTT timer is started at a predetermined time instance, at a first time instance indicated in the sidelink control information, or at a second time instance based on a sidelink cast type.

7. The WTRU according to claim 1, further configured to: transmit the sidelink retransmission, after an expiry of the HARQ RTT timer.

8. The WTRU according to claim 1, wherein the sidelink control information further indicates an expected packet delay budget (PDB) and the first information further indicates a priority associated with the first transmission resource; and wherein the WTRU is further configured to:
determine, based on the priority associated with the first transmission resource, a maximum PDB; and
start the HARQ RTT timer, on a condition that the expected PDB is less than the determined maximum PDB.

9. A method implemented by a first wireless transmit/receive unit (WTRU), for a sidelink between the first WTRU and a second WTRU, the method comprising:
receiving, from the second WTRU, sidelink control information comprising: (1) first information indicating at least a first transmission resource reserved for an initial transmission and (2) second information indicating if at least one second transmission resource is reserved for a sidelink retransmission of the initial transmission;
determining a timer value for a hybrid automatic repeat request (HARQ) round trip time (RTT) timer associated with a sidelink process, wherein
on condition that a HARQ feedback is enabled for an associated sidelink process, the timer value is determined to be a first value, and wherein
on condition that the HARQ feedback is disabled for the associated sidelink process, the timer value is determined to be a second value; and
starting the HARQ RTT timer associated with the sidelink process, wherein
on condition that the second information indicates that at least one second transmission resource is reserved for the sidelink retransmission, the HARQ RTT timer is started in a first time slot, and wherein
on condition that the second information indicates that no second transmission resource is reserved for the sidelink retransmission, the HARQ RTT timer is started in a second time slot.

10. The method according to claim 9, further comprising: receiving network configuration information indicating the first value and the second value.

11. The method according to claim 9, wherein, on condition that the HARQ feedback is enabled for the associated sidelink process, the first time slot follows a transmission of the HARQ feedback.

12. The method according to claim 9, wherein on condition that the HARQ feedback is disabled for the associated sidelink process, and wherein on condition that the second information indicates that at least one second transmission resource is reserved for the sidelink retransmission, the second time slot follows the at least first transmission resource.

13. The method according to claim 9, wherein on condition that the HARQ feedback is disabled for the associated sidelink process, and wherein on condition that the second information indicates that no second transmission resource is reserved for the sidelink retransmission, the second time slot follows a resource reserved for a transmission of the HARQ feedback.

14. The method according to claim 9, wherein the HARQ RTT timer is started at a predetermined time instance, at a first time instance indicated in the sidelink control information, or at a second time instance based on a sidelink cast type.

15. The method according to claim 9, wherein the sidelink control information further indicates an expected packet delay budget (PDB) and the first information further indicates a priority associated with the first transmission resource; and further comprising:
- determining, based on the priority associated with the first transmission resource, a maximum PDB; and
- starting the HARQ RTT timer, on a condition that the expected PDB is less than the determined maximum PDB.

* * * * *